United States Patent [19]

Hibi et al.

[11] Patent Number: 5,113,248
[45] Date of Patent: May 12, 1992

[54] METHOD AND APPARATUS FOR COLOR REMOVAL IN A PICTURE FORMING APPARATUS

[75] Inventors: Yoshiharu Hibi; Masao Seki, both of Kanagawa, Japan

[73] Assignee: Fuji Xerox Co., Ltd., Tokyo, Japan

[21] Appl. No.: 427,706

[22] Filed: Oct. 27, 1989

[30] Foreign Application Priority Data

Oct. 28, 1988 [JP] Japan .................................. 63-273858

[51] Int. Cl.⁵ .................................................. H04N 1/46
[52] U.S. Cl. ............................................. 358/75; 358/80
[58] Field of Search ................................ 358/75, 80, 79

[56] References Cited

U.S. PATENT DOCUMENTS

| | | | |
|---|---|---|---|
| 4,335,398 | 6/1982 | Yamada | 358/80 |
| 4,481,532 | 11/1984 | Clark et al. | 358/80 |
| 4,656,505 | 4/1987 | Yamada et al. | 358/80 |
| 4,700,399 | 10/1987 | Yoshida | 358/79 X |
| 4,701,790 | 10/1987 | Yamada | 358/80 X |
| 4,763,190 | 8/1988 | Froelich | 358/79 |
| 4,774,567 | 9/1988 | Stansfield et al. | 358/80 |
| 4,878,125 | 10/1989 | Katayama et al. | 358/443 |
| 4,887,150 | 12/1989 | Chiba et al. | 358/80 |

*Primary Examiner*—Kenneth A. Wieder
*Assistant Examiner*—Glenn W. Brown
*Attorney, Agent, or Firm*—Finnegan, Henderson, Farabow, Garrett and Dunner

[57] ABSTRACT

In a picture forming apparatus for reproducing original images, an image processing device separates a signal corresponding to an original image into a plurality of separated color signals, an image converter converts the color signals into recording signals wherein each of the recording signals corresponds to a different color of coloring material used by the picture forming apparatus to reproduce the original image, a determining circuit determines the minimum value of the recording signals, and a color removal circuit performs under color removal on each of the recording signals in accordance with the determined minimum value.

15 Claims, 65 Drawing Sheets

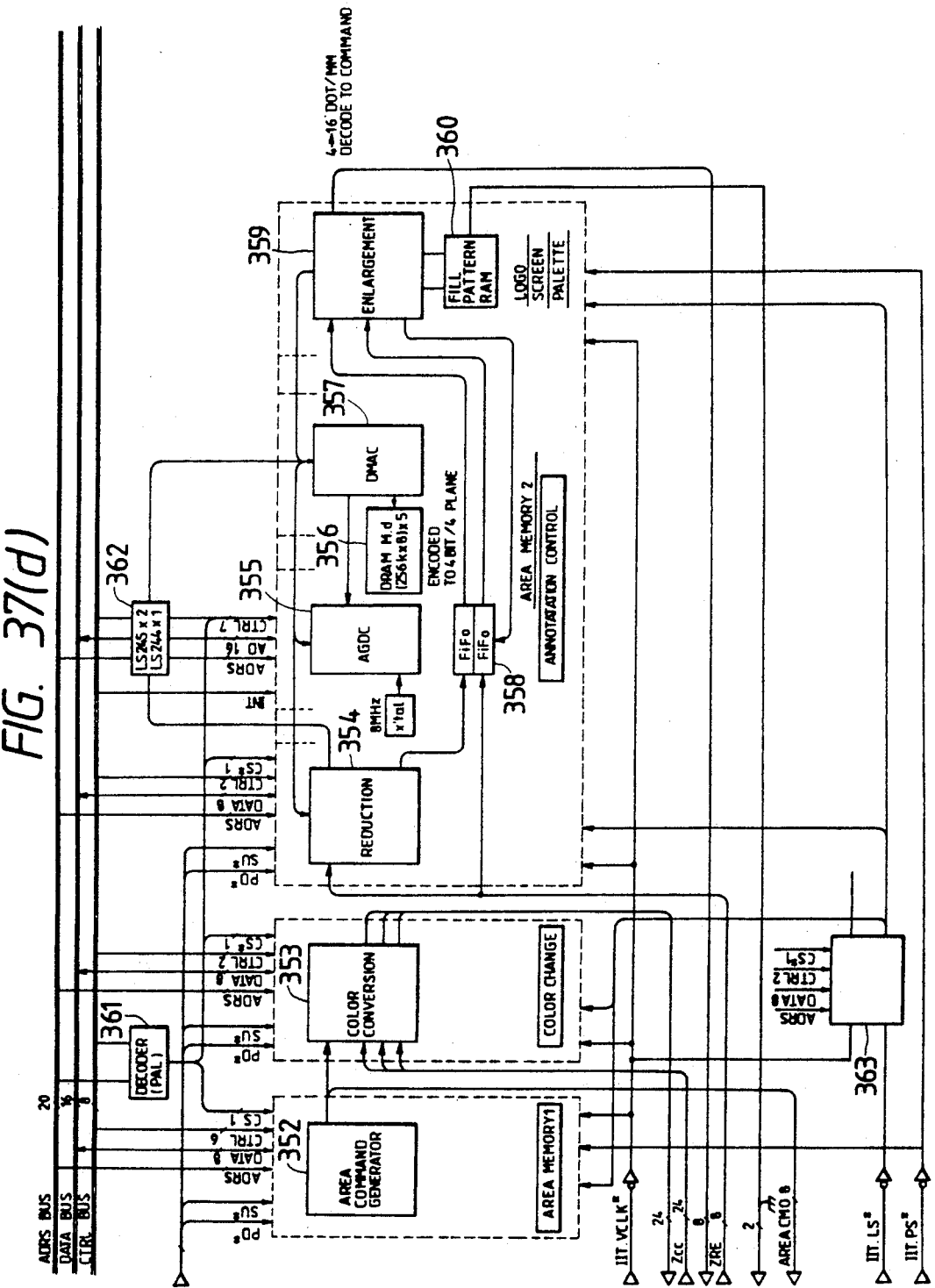

METHOD AND APPARATUS FOR COLOR REMOVAL IN A PICTURE FORMING APPARATUS

FIELD OF THE INVENTION

The present invention relates to a method and apparatus for color removal in a picture forming apparatus in which optical color separating signals that are read by means of a CCD line sensor, etc., are subjected to color correction to output recording signals of coloring materials, i.e., colorants.

BACKGROUND OF THE INVENTION

In an apparatus for recording color pictures of colored printed matter or a color copy machine, a colored document is optically read with its colors being separated and converted into color recording signals (e.g. a toner signal) for color toners, color inks, or ink donor films, etc., and are supplied to a memory. In color masking, the color separating signals B (blue), G (green), and R (red) are subjected to the matrix operation shown below and are converted into Y (yellow), M (magenta), and C (cyan), respectively.

$$\begin{pmatrix} Y \\ M \\ C \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} B \\ G \\ R \end{pmatrix}$$

By performing the above process, the color tone is controlled and the saturation of the colors is enhanced during the color reproducing process while the color balance is maintained.

With devices for forming and processing the color pictures as well as copy machines for recording the color pictures, conventionally, the signals B, G, and R, and signals Y, M, and C are subjected to END (Equivalent Neutral Density) conversion so as to facilitate the process. The color signals indicative of gray have a relation $B=G=R$ (Equivalent Neutral Density), and supplying signals with the relation of $Y=M=C$ will also reproduce gray. The recording signals Y, M, and C, which are converted through color masking and represented in terms of END converted signals, are processed as the density signals of the coloring materials of the toner or ink for printing. Through black production and under color removal processes, the coloring materials Y, M, C, and K (black or india ink) are efficiently mixed, thereby improving color tone reproducibility and saving coloring materials.

The color separating signals are often influenced by the spectrum of the light source for lighting, characteristics of the photoelectric transducers, the color filters, and the lenses. Also, the recording unit has factors that since the coloring materials used for recording the color images have unwanted absorption in their spectral property, a variety of characteristics are necessary to be corrected if preferable pictures cannot be obtained due to deviations in saturation and hue.

Moreover, there are many other factors such as papers, the characteristics of the color inks, which influence the reproducibility of degradation. For this reason, it is extremely difficult to faithfully reproduce the hue of the documents by simply processing color conversion.

Thus, data processing for the color picture includes END conversion, TRC (Tone Correction Control), and other processes in addition to the described color masking and the UCR (Under Color Removal) so as to reproduce the color of the document accurately.

For example, the color separating signals are read in the form of signals B, G, and R from the document. When a gray document (non-saturated color) is read, the separated color signals B, G, and R may not be of the same value due to variations of various characteristics and other conditions of the color-reading apparatus. Therefore, END conversion is applied to convert the color signals B, G, and R into signals having gray density of the same value. In the meantime, although the gray signal in which Y, M, and C are of the same value is outputted, the gray may not be faithfully reproduced due to the characteristics of the coloring materials and environmental conditions of the recording unit. Thus, TRC is performed to reproduce the gray color corresponding to the density of the recording signals Y, M, and C when these signals are of the same value.

Color masking is performed to convert the color separating signals into the recording signals Y, M, and C. At that time, a problem arises in how the colors (hue, saturation, etc.) other than gray are to be reproduced. In other words, END conversion, the color masking, and the TRC play important roles in reproducing of the colors including gray of the document.

As mentioned above, with a color picture recording apparatus, the END conversion process is carried out to perform color correction as well as control of correction of the color tone while maintaining gray balance and degradation, thereby reproducing the color pictures that exhibit good characteristics of tone, fineness, and granularity of the colors. That is, color correction is carried out on the basis of gray and then the recording signals Y, M, and C of the same amount are subtracted (under color removal) from the recording signals obtained through the color correction so as to eliminate unnecessary consumption of the color materials as well as to enhance producibility of the color. However, in reality, reproducing gray and black and reproducing colors of high degrees of saturation are in conflict with each other; therefore there is a problem that simple UCR process is not enough to enhance reproducibility of the color. Moreover, if UCR is performed, the amount of coloring materials will become small, causing a loss of color depth in the entire color picture.

To compensate for the lack of color depth or to output gray, black or india ink (K) is produced in accordance with the amount of color materials that are subjected to under color removal. However, in this case too, K causes a problem of muddiness in the saturated color and unfavorably influences reproducibility of the color tone. Moreover, under color removal processing requires large scale processing circuits.

SUMMARY OF THE INVENTION

An object of the present invention is to enhance reproducibility of all the colors including gray.

Another object of the present invention is to reduce muddiness in pigmentation.

Still another object of the present invention is to enhance reproducibility of black images.

Yet another object of the present invention is to simplify processing circuits and to increase processing rate.

Another object of the present invention is to make possible the setting of data conversion characteristics in UCR at will.

Yet another object of the present invention is to make use of signals produced through the UCR circuits for other signal processing purposes for the picture forming apparatus.

These and other objects are accomplished by a picture forming apparatus for reproducing original images comprising means for separating a signal corresponding to an original image into a plurality of separated color signals, means for converting the color signals into corresponding recording signals wherein each of the recording signals corresponds to a different color of coloring material used by the picture forming apparatus to reproduce the original image, means for determining the minimum value of the recording signals, and means for performing under color removal on each of the recording signals in accordance with the determined minimum value.

BRIEF DESCRIPTION OF THE DRAWINGS

The manner by which the above objects and other objects, features and advantages of the present invention are attained will be fully apparent from the following detailed description when it is considered in view of the drawings, wherein:

FIGS. 15(a) through 15(e) show diagrams for explaining a control system of a stepping motor;

FIGS. 37(a) to 37(d) show a hardware configuration of the IPS;

DETAILED DESCRIPTION

Figure 1:
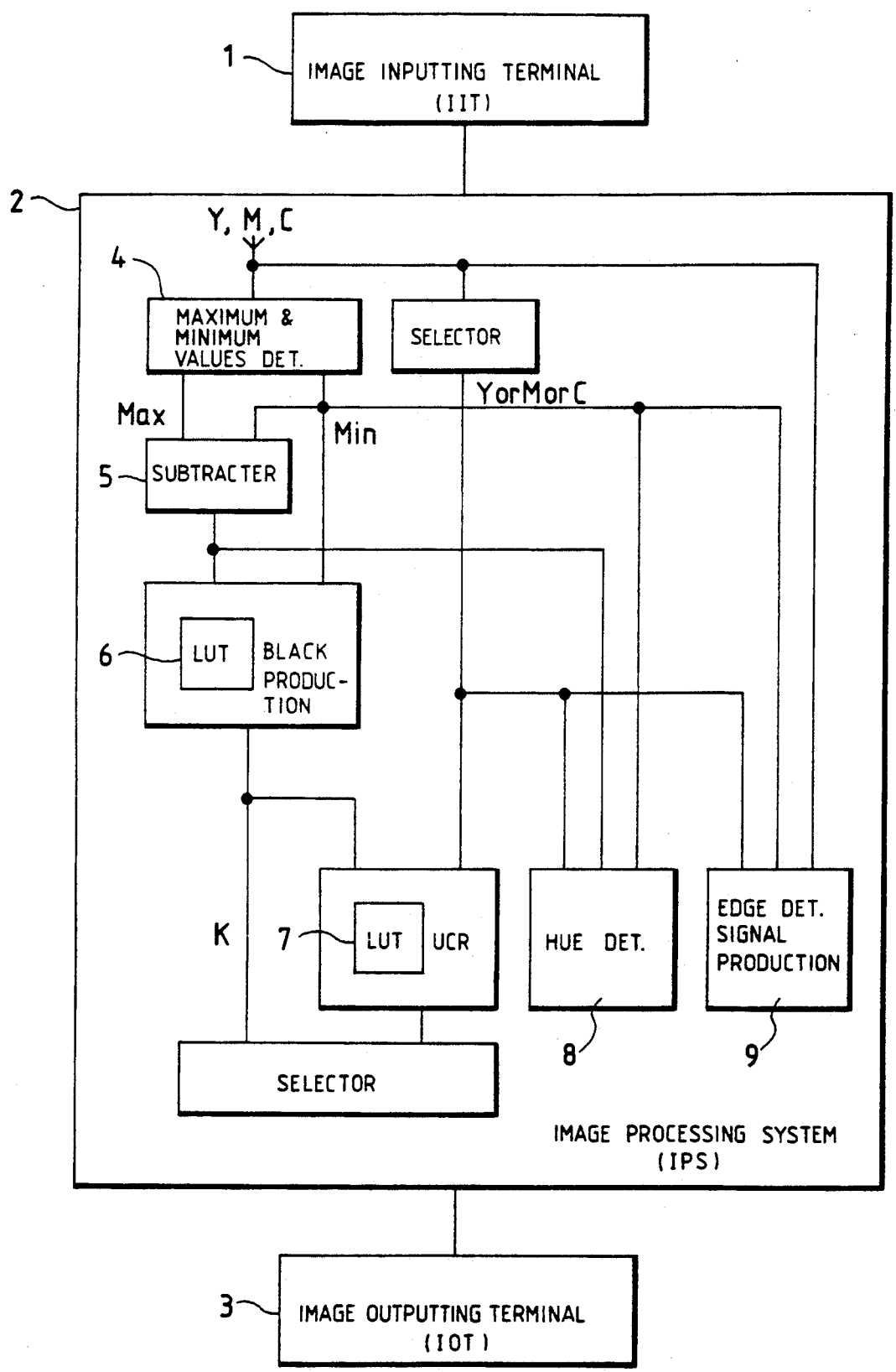
FIG. 1 is a block diagram showing a configuration of an example of a gray balance control system employed in an image forming apparatus according to the present invention.

A picture forming apparatus according to a preferred embodiment of the present invention is, as shown in FIG. 1, one in which optically separated color signals are read from a document at an image input terminal (ILT) 1 and are subjected to color correction at an image processing system (IPS) 2 to be converted into the recording signals of the coloring materials. The UCR procedure is applied to the minimum value of the respective recording signals made up of yellow, magenta, and cyan. The apparatus is provided with a maximum and minimum values detection circuit 4, a subtraction circuit 5, and conversion tables 6 and 7, to produce the black recording signal from the minimum value to determine the extent of UCR in accordance with the black signal.

The black recording signal is reduced in accordance with values in the conversion table 6 which correspond to the difference between the maximum and minimum values. The value for UCR is obtained from the conversion table 7 on the basis of the black recording signal. A conversion curve in the table 7 is set in such a way that the value of UCR increases with an increase in the black recording signal and decreases in a high degradation region.

Generally, the colors having small differences between the maximum and the minimum values will be gray and colors having large differences will have high saturation. Thus, the conversion table 6 is employed and is set to reduce muddiness of the colors having high saturation. The conversion table 7 can be set to superimpose not only the black toner, but also toners of other colors, thereby stressing black.

Further, the differences between the maximum and minimum values are obtained at the same time as the recording signals of developing colors are selected, thus producing the black recording signal to perform UCR. Further, the signals from this circuit are used for a color detection circuit 8 and an edge detection signals producing circuit 9. In this manner, the signals produced by the UCR circuit can be effectively utilized to detect color and to produce an edge detection signal, thus simplifying the entire circuit configuration of the apparatus.

Figure 2:
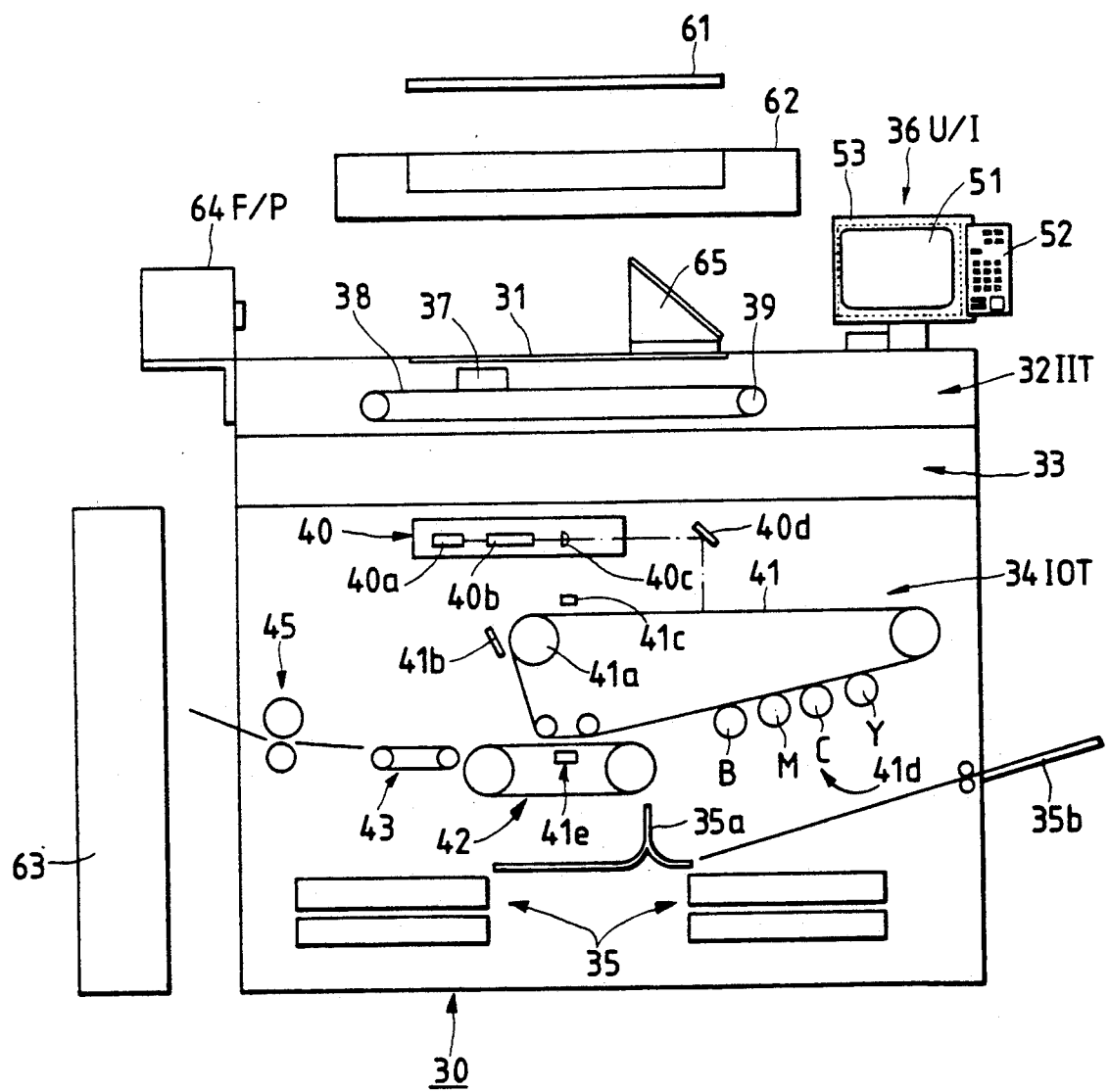
FIG. 2 is a longitudinal sectional view showing an overall structure of a color copying machine incorporating the present invention.

FIG. 2 shows a configuration of a color copying machine as a specific embodiment of the present invention.

In the color copying machine incorporating the present invention, a base machine 30 is made up of a platen glass 31, image input terminal (IIT) 32, electric control housing 33, image output terminal (IOT) 34, tray 35, and user interface (U/I) 36. The base machine 30 optionally includes an edit pad 61, auto document feeder (ADF) 62, sorter 63, and film projector (F/P) 64.

Electrical hardware is required for controlling the IIT, IOT, U/I, etc. The electrical hardware is divided into a plurality of circuit sections with different signal/data processing functions, such as IIT, IPS for processing the output image signals of the IIT, U/I, and F/P. These circuit sections are assembled into circuit boards, respectively. Together with a SYS board for controlling the above circuit boards, and an MCB (machine control board) for controlling the IOT, ADF, sorter, etc., these circuit boards are housed in the electrical control housing 33.

The IIT 32 is made up of an imaging unit 37, and the combination of a wire 38 and a drive pulley 39, which is for driving the imaging unit 37. The imaging unit 37 reads a color image on an original in terms of image signals of the primary colors, blue (B), green (G), and red (R), by using a CCD sensor and color filters, and converts them into digital image signals, and sends the separated color image signals to an image processing system (IPS).

In the IPS, the B, G, and R signals from the IIT 32 are converted into toner primary colors yellow (Y), cyan (C), magenta (M), and black (K). The Y, C, M, and K signals are subjected to various processings for improving the reproducibility of color, gradation, definition, and the like. Further, the gradation toner signal of each process color is converted into an on/off or two-level toner signal, and the two-level signals are transferred to the IOT 34.

In the IOT 34 containing a scanner 40 and a photosensitive belt 41, a laser output unit 40a converts the image signals from the IPS into light signals. The light signals travel an optical path including a polygon mirror 40b, F/8 lens 40c, and reflecting mirror 40d, and reach the photosensitive belt 41, and forms a latent image corresponding to the original image on the surface of the belt. The photosensitive belt 41 is driven by a drive pulley 41a. A cleaner 41b, charger 41c, developing units 41d for the primary colors Y, M, C, and K, and a transfer unit 41e are disposed around the belt 41. A tow roll transfer loop 42 is disposed close to the transfer unit 41e, as shown. The tow roll transfer loop 42 picks up a sheet of paper as it is transported along a paper transfer path 35a from a tray 35, and in cooperation with the transfer unit, transfers color toners to the paper. In the case of the full color copy of the 4 pass color type, the tow roll loop is turned four times, and the color toners are transferred on the paper in the order of Y, M, C, and K. The paper bearing the transferred color toner image is transported through a vacuum transfer belt 43 to a fixing or fusing unit 45, and then is ejected outside the base machine. If necessary, a single sheet inserter (SSI) 35b may feed a sheet of paper to the paper transfer path 35a.

The U/I 36 is used by a user when selecting a desired function and sets up the conditions to exercise the function. The U/I 36 is provided with a color display 51, and a hard control panel 52 located by the display. In combination with an infrared-ray touch board 53, it enables the user to directly designate necessary functions by soft buttons on the display screen.

The option units available for the base machine follows. The first optional unit is an edit pad 61 as a coordinates input device, which is placed on the platen glass 31. The edit pad enables a user to variously edit images with the aid of a pen or by a memory card. Further, the ADF 62 and the sorter 63 may optionally be used.

A mirror unit (M/U) 65 may further be installed. In this instance, it is placed on the platen glass 31. In association with this, the F/P 64 is installed. A color image of a color film, for example, that is projected by the F/P 64, is read by the imaging unit 37 of the IIT 32. With the combination of the M/U 65 and F/P 64, the images of a color film can be copied directly from the color film. The object to be imaged may contain negative and positive films, and slides. Additionally, an auto focusing device and a correction-filter auto exchanging device are installed to the copying machine under discussion.

The color copying machine according to a preferred embodiment of the present invention has various types of functions meeting user's needs, and is operable in a complete automated manner, throughout the copying process. A display unit, for example, a CRT, that is used in the user interface, visually presents selection of various functions, of the conditions to exercise the selected functions, and other necessary menus. Because of the function of the user interface, both highly skilled persons and beginners alike will find it easy to access and use the copying machine.

One of the major functions of the color copying machine consists of control panel select operations of items that are out of operation flows, such as start, stop, all clear, ten keys, interrupt, information, and languages, and selective operations of the respective functions by touching soft buttons in a basic display. Touching a pathway tab of a pathway as a function select area allows an operator to select any of various types of edit functions, such as marker edit, business edit, and creative edit. With such functions, any operator can operate the color copying machine to make both monochromatic and full color copies in as simple and easy a way as operating a conventional copying machine.

The copying machine of the present invention features the full color or 4-pass color copying function, and is also operable in the 3-pass color or black copy mode, if necessary.

In respect to paper feed, an automatic paper size select and a paper size designation are possible.

Reduction/enlargement is possible in a broad range from 50% to 400% with steps of 1%. Additionally, horizontal and vertical magnification of an image may be independently and automatically selected.

Optimum copy density can be automatically set for a mono color original, and when a color original is copied, an auto color balance mode may be used, in which a user may designate a subtractive color.

A memory card storing job programs is used for accessing the job programs. A maximum of eight jobs can be stored in the memory card. The memory card has a memory capacity of 32K bytes. Jobs other than that of the film projector mode can be programed.

Additional functions relate to copy output, copy sharpness, copy contrast, copy position, film projector, page programming, and margin selection.

In the case of the copying machine or copier coupled to an optional sorter, when an uncollated mode is selected, the copy output function operates and hence a maximum adjusting function operates to set up a number of copies that the bin of the sorter can accommodate.

Copy sharpness to effect the edge emphasis, a manual sharpness adjustment mode of seven steps and a photo sharpness adjustment mode of photo, character, print, and photo/character are optionally provided. Copy position is for selecting a position on a sheet of paper where an image is to be copied. An auto centering function to set the center of a copied image at the center of the sheet is optionally used. The default is the auto centering.

The film projector enables images of various types of films to be copied. Any of the following modes can be selected: projections of 35 mm negative and positive films, 35 mm negative film platen placement, 6 cm×6 cm slide platen placement, and 4 in×4 in slide platen placement. In the film projector mode, paper of A4 size is automatically selected unless another paper size is designated. The film projector pop-up has a color balancer. When the color balancer is set to "reddish", the projected image is tinged with red. When it is set to "bluish", the image is tinged with blue. Particular auto and manual density controls are used.

The page programming function comes in four varieties: a covering function to attach a front/back cover or a front cover to the copies; an insert function to insert a white sheet or a color sheet into a stack of copies; a color mode in which a color mode is set up for every page; and a paper size select function in which a desired paper tray, together with the color mode, is selected every page. The margin function is for setting the margin of the copy in steps of 1 mm in the range of 0 to 30 mm. The margin can be set for only one side for one original.

Marker edit edits the image within an area enclosed by a marker. This function is directed to the editing of documents and treats the documents as black and white documents. In a black mode, a designated area on the document is painted the color of the palette on the CRT, while all areas other than the designated area are painted black. In a reddish black mode, an image on the document is painted red, while the remainder is painted reddish black. The marker edit has the functions of trim, mask, color mesh, and black-to-color. The specific area may be designated by depicting a closed loop on the document, or by using the ten keyboard or the edit pad. This is also applied to the area designation in the editing functions to be given later.

The trim function allows the image within a marked area to be copied in mono color, but prevents the image outside the marked area from being copied, viz., to erase the image outside the marked area.

The mask function cause the image within a marked area to be used and allows the image outside the marked area to be reproduced in mono color.

When the color mesh mode is exercised, a designated color mesh pattern is placed on a marked area and an image is copied in mono color. The color of the color mesh may be selected from among eight (8) standard colors (predetermined colors) and eight (8) registered colors (registered by a user, and up to eight different colors can be selected from 16,700,000 colors and simultaneously be registered). A mesh pattern can be selected from among four patterns.

In the black-to-color mode, the image within the marked area can be copied with a color selected from the 8 standard colors and the 8 registered colors.

Business edit is mainly applied for business documents and quickly edits high quality originals. In this mode, the originals are treated as full color originals. The area or point designation is required for all the functions. A plurality of different functions can be simultaneously set for a single original. In a black/mono color mode, the image outside the specified area is black or mono color, while the black image within the specified area is changed to the palette color on the CRT display. In a reddish black mode, the image outside the specified area is colored in reddish black, while the image within that area is colored in red. The business edit, like the marker edit, is exercised in a variety of modes, such as trim, mask, color mesh, black-to-color, and further logotype, line, paint 1, correction, and function clear.

The logotype mode is used to insert a logotype such as a symbol mark at a specified point on an image. Two types of logotypes may be vertically or horizontally inserted. In this case, one logotype is allowed to be used for one original. The logo patterns are prepared in accordance with the client's request and stored into a ROM.

The line mode is provided to depict lines in two-dot expression vertically and horizontally with respect to the x-distance. The color of the line may be selected from the 8 standard colors and the 8 registered colors.

An unlimited number of lines can be designated, and up to seven colors can be used simultaneously.

In the paint 1 mode, one point within an area defined by a closed loop is designated, and that area is entirely painted with one color selected from among the 8 standard colors and the 8 registered colors. When a plurality of loops are used, the painting is carried out for each area.

The mesh can be selected from four patterns for each area. The number of loops that can be designated is unlimited. Up to seven color mesh patterns can be used.

The correction function confirms, corrects, changes, and erases the matters concerning an area as specified, and executes these functions by using three operation modes, an area/point change mode, area/point correction, and area/point cancel mode. The area/point change mode confirms and changes the set functions for each area. The area/point correction mode changes the area size, and changes the point position in steps of 1 mm. The area/point cancel mode erases the specified area.

The creative edit is exercised by using many functions including an image composition, copy-on-copy, color composition, partial display change, multi-page enlargement, paint 1, color mesh, color change, negative/positive inversion, repeat, paint 2, density control, color balance, copy contrast, copy sharpness, color mode, trim, mask, mirror image, margin, line, shift, logotype, split scan, correction, function clear, and add function. In the creative edit mode, the original is treated as a color original. A plurality of functions can be set for one document. Different functions may be used for one area. The area may be specified in a rectangular by two-point designation and in a point by a one-point designation.

In the image composition mode, a base original is color copied through the 4-cycle color copying operation. The resultant copied paper is left on the transfer belt. Then, a trimmed original is superposed, copied through the 4-cycle copying operation, and outputted.

In the copy-on-copy mode, a first original is copied through the 4-cycle color copying operation. The resultant copied paper is left on the transfer belt. Then, a second original is superposed on the copied paper through the 4-cycle copying operation. Finally, the paper is outputted.

In the color composition mode, a first original is copied using magenta toner, and the copied paper is left on the transfer belt. A second original is superposed on the first copied paper, using cyan, and the copied paper is fixedly placed there. Finally, a third original is superposed on the second copied paper, using yellow. In a 4-color composition mode, a fourth original is superposed on the third copied paper using black.

In the partial display shift, after a color copy is obtained through the 4-cycle color copying operation, the color copied paper is left on the transfer belt. Subsequently, another copy is superposed on the first paper through the 4-cycle copying operation. Finally, the paper thus copied is outputted.

Of those color modes, the full color mode is based on the 4-cycle copying operation. The 3-pass color mode is based on the 3-cycle copying operation in other modes than the editing mode. The black mode is based on the 1-cycle copying operation in other modes than the editing mode. The plus-one mode is based on the 1-to 3-cycle copying operations.

The tool pathway mode is exercised by using many functions including an audiotron, machine setup, default selection, color registration, film type registration, color correction, preset, film projector scan area correction, audio tone, timer set, billing meter, diagnosis mode, max. adjustment, and a memory card formatting. In this pathway mode, a password is needed for making settings and changes. Accordingly, only key operators and customer engineers are permitted to make the settings/changes in this mode. Use of the diagnosis mode is permitted for customer engineers alone.

Color registration is used for registering colors in the register color button in the color palette. The CCD sensor reads the color to be registered from the color original. Color correction is used for fine correction of the colors registered in the registered color button.

The film type registration is for registering a register film type used in a film projector mode. When it is not registered, a register button cannot be selected on the film projector mode display.

The preset mode is for presetting reduction/enlargement values, 7 steps of copy density, 7 steps of copy sharpness, and 7 steps of copy contrast.

Film projector scan area correction is for adjusting a scan area in the film projector mode. Audio tone is for adjusting the volume of a select sound, for example. Timer is for setting a timer releasable to key operators.

Additional functions are provided for a trouble diagnosis system. A first function is used when the subsystem is placed in a clashing state. In such a situation, this function operates and redrives the subsystem to recover it from the clashing state. A second function is used when the subsystem is still in the clashing state even if the clash recovery is applied two times. In such a situation, this function operates to set up a fault mode in the subsystem. A third function operates when jamming occurs in the copying machine. In this case, the third function operates to stop the machine operation.

It is evident that the color copying machine of the present invention is operable with the basic copying function and a combination of additional functions, and the combination of the basic copying function/additional functions and marker edit, business edit, creative edit, and the like.

A copying system including the color copying machine with the above functions offers advantageous and convenient features as described hereinafter.

A high quality, clear and distinctive full color image of a color document is attained, with improvements of black image reproduction, light color reproduction, generation copy quality, OHP image quality, thin line reproduction, image quality reproduction of film copies, and copied image sustaining.

The cost of image forming materials and expendables such as a photosensitive drum, developing unit and toner is reduced. Service cost including UMR and parts cost is reduced. The color copying machine is operable as a mono color copying machine. The copying speed for mono color copies is increased about three times that of the conventional copying machine, and is 30 copies/A4. In this respect, the running cost is reduced.

Input/output devices such as an ADF and a sorter are optionally available, and hence a large number of documents can be copied. A magnification may be set in a broad range of 50% to 400%. The maximum size of document that can be copied is A3. Three stages of paper trays are used, the upper tray accommodates B5 to B4 size, the medium tray accommodates B5 to B4, and the lower tray accommodating B5 to A3 and SSIB5 to A3. The copy speed for the full color (4-pass color) copy is 4.5CPM for A4, 4.8CPM for B4, and 2.4CPM for A3. The copy speed for the mono color copy is 19.2CPM for A4, 19.2CPM for B4, and 9.6CPM for A3. The warmup time is within 8 minutes. FCOT is 28 seconds or less for the 4-color full color copy, and 7 seconds or less for the mono color copy. A continuous copy speed is 7.5 copies/A4 for the full color copy and 30 copies/A4 for the mono color copy.

Two types of operation buttons are used, hard buttons on the hard control panel and soft buttons on the soft panel of the CRT display screen. Use of these buttons provides an easy operation for beginners and simple operation for experts, and further enables operators to directly select desired functions. As for the layout of controls including these buttons, the controls are concentrated at one location for ease of operation. Effective use of colors correctly sends necessary information to operators.

A high fidelity copy can be obtained by using the operations on the hard control panel and the basic display. The hard button is used for the operations out of an operation flow, such as start, stop, all clear, and interrupt. The operations on the soft panel of the basic display are used for paper size select, reduction/enlargement, copy density, picture quality adjustment, color mode, color balance adjustment, and the like. The soft panel operations are easily accepted by users accustomed to mono color copying machine. To access the various edit functions, a passway is opened by merely touching a pathway tab in a pathway area on the soft panel, and an operator may readily access the edit modes. Storage of copy modes and conditions for exercising them in a memory card realizes an automation of relation manual operations.

A variety of editing functions can be used by touching a pathway tab in the pathway area on the soft panel to open the pathway. In the marker edit, mono color documents can be edited by using a tool of a marker. In the business edit, mainly business documents can be prepared quickly and in high quality. In the creative edit, various editing functions are available. In the full color, black and mono color copy modes, many choices are used to meet the needs of various expert operators, such as designers, copy service businesses, and professional key operators. The area specified when the editing functions are used is displayed in the form of bit map area, providing a visual confirmation of the specified area.

A high performance, full color copying machine (4-pass color) is realized by the present invention which is operable at 1.5 kVA. A control system realizing the 1.5 kVA specification in the respective operation modes is used, and a power distribution to the circuit systems for different functions is also used. An energy transmission system table for confirming energy transmission systems is prepared. The management and verification of power consumption are carried out by using the energy transmission system table.

The color copy machine of the preferred embodiment of present invention is operable as a full color copying machine and a mono color copying machine. The copying machine with a variety of useful functions is used not only as a mere copying machine, but also as a machine to aid creative work. Accordingly, the copying machine satisfies the requirements of professional operators and artists as well. Some examples of the use of the color copying machine will be given.

Posters, calendars, cards or invitations cards, and New Year's cards with photographs that have been made at a printing machine, may be formed at much lower cost than by the printing machine, if the number of each of these items is not large. If the editing functions are well used, original calendars, for example, may be made. Further, the calendars may be prepared for each division of a company.

As seen from recent marketing, the coloring of industrial products, e.g., electric appliances, and interiors greatly influences marketing success. The color copying machine of the present invention can be used for color selection at the manufacturing stage of products. Accordingly, a plurality of persons, including designers and persons relating to the manufacturing and selling of the products, can satisfactorily study and discuss the designs for producing products attractive to the market, by creating the colored design copies. In the apparel business, the present color copying machine is very useful in that the complete designs with the selected colors can be sent to the garment makers. Accordingly, the order is exactly understood and the manufacturing may be smoothly and effectively carried out.

The ability to produce both color copies and mono color copies of an original is convenient for students who are learning the chromatics in colleges and universities. When studying graphic design, they can copy the design in both the color and mono color copies, and comparatively study the design. Further, it can be seen how gray level and saturation affect the visual sensation.

This section will discuss hardware architecture, software, and state division in an electrical control system of the color copying machine according to the present invention.

A color CRT as an U/I, although it is used as the U/I in the color copying machine of the present invention, needs a larger amount of the data for color display than a monochromatic CRT. Implementation of a more user friendly UI by creating a layout of a display screen and display change also results in an increased quantity of data.

Use of a CPU with a large memory requires a large board. The large board creates additional problems. It is difficult to house a large board in the base machine. The large board makes it difficult to alter the design of the copying machine. Further, the large board increases the cost to manufacture.

Figure 3:
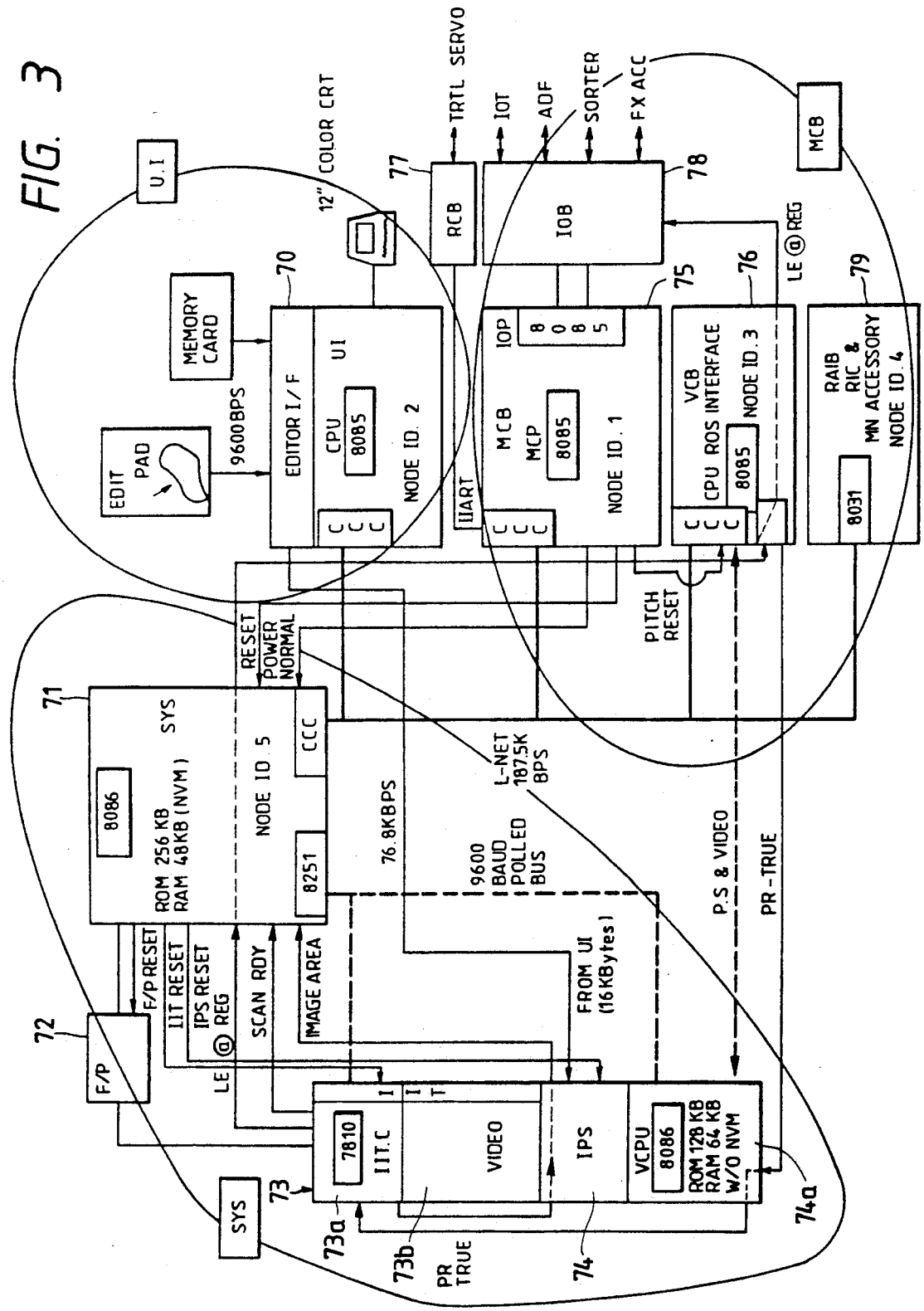
FIG. 3 shows a hardware architecture of the present invention.

To cope with the increase of data amount, the instant color copying machine of the preferred embodiment is arranged such that the data processing function (CPU) is decentralized. The hardware of the electrical system, as shown in FIG. 3, is composed of a UI system, SYS system and MCB system. The UI system contains a UI remote 70. In the SYS system, an F/P remote 72 controls the F/P, an IIT remote 73 reads an image of an original, and an IPS remote 74 for executing various image processings are contained and independently execute own their data processings. The IIT remote 73 includes an IIT controller 73a for controlling the imaging unit, and a VIDEO circuit 73b for digitizing the read image signals and sending the digitized image signals to the IPS remote 73b. The IIT remote 73 and the IPS remote 74, is controlled by a VCCPU 74a. An SYS (system) remote 71 is provided as a control unit to control the remotes as mentioned and to be given later.

The SYS remote 71 requires a large memory capacity, because a program to control the display changes of the UI, and others must be stored. The 8086 16-bit microprocessor is used for the SYS remote 71. If required, the 68000 microprocessor may be used.

The MCB system is composed of a VCB (video control board) remote 76, RCB remote 77, IOB remote 78, and an MCB (master control board) remote 75. The VCB remote 76, serving as a raster output scan (ROS) interface, receives from the IPS remote 74 a video signal to form a latent image on the photosensitive drum by a laser beam, and sends the video signal to the IOT. The RCB remote 77 is for the servo system of the transfer belt (turtle). The IOB remote 78 serves as an I/O port for the IOT, ADF, sorter, and accessory. The MCB remote 75 synthetically manages the decentralized accessory remote 79.

Each remote in the drawing of FIG. 3 is constructed with a single board. In the figure, a bold continuous line indicates a high speed communication network LNET of 187.5 kos; a bold broken line, a master slave type serial communication network of 9600 bps; and thin continuous lines, hot lines as transmission lines for control signals. A line 76.8 kbps indicates a dedicated line for transmitting graphic data depicted on the edit pad, copy mode data entered from the memory card, and graphic data in the edit area from the UI remote 70 to the IPS remote 74. CCC (communication control chip) indicates an IC for supporting a protocol of the high speed communication line LNET.

As described above, the hardware architecture is composed of the UI system, SYS system, and MCB system. The processings shared by those systems will be described with reference to software architecture of FIG. 4. Arrowheads indicate the directions of data transmission performed through the LNET high speed communication network and the master/slave type serial communication network and the directions of control signals flowing through the hot lines.

Figure 4:
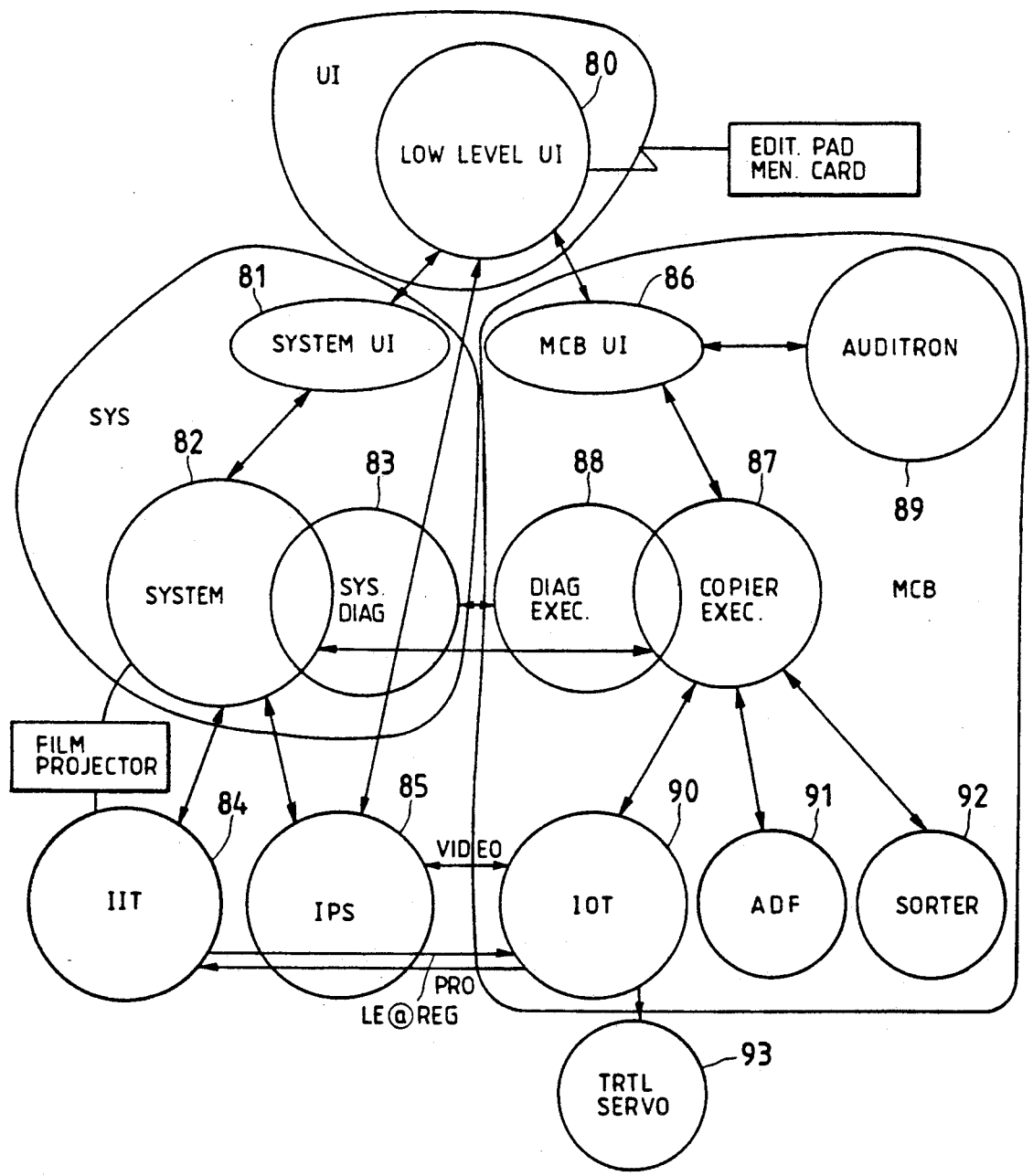
FIG. 4 shows a software architecture of the present invention.

As seen in FIG. 4, the UI remote 70 is made up of an LLUI (low level UI) module 80 and a module for processing the data of the edit pad and the memory card. The LLUI module 80, which is similar to a called CRT controller, is a software module for displaying an image on a color CRT screen. The displaying of images on the display screen is controlled by an SYSUI module 81 and an MCBUIT module 86. This suggests that the UI remote may be made common with another apparatus or device. The reason for this is that how to lay out the display screen and how to change the display depend on the type of the apparatus, but the CRT controller is used in combination with the CRT.

The SYS remote 71 is made up of three modules, SYSUI module 81, SYSTEM module 82, and SYS.-DIAG module 83.

The SYSUI module 81 is a software module for controlling the display change. The SYSTEM module 82 contains software for recognizing what coordinates are selected on the software panel and what display presents the software panel containing the selected coordinates, viz., what job is selected, software for finally checking the job as to whether or not a contradiction exists in the copy exercising conditions, and software for controlling the transfer of various types of data, such as F/F select, job recovery, and machine state, with other modules.

The SYS.DIAG module 83 operates in a customer simulation mode in which the copying operation is performed in a diagnostic state for self-test purposes. In the customer simulation mode, the color copying machine under discussion operates as it operates in a normal copying operation mode. Accordingly, the DIAG module 83 is substantially the same as the SYS.DIAG module 82. However, it is used in a special state, or the diagnostic state. For this reason, the DIAG module is depicted separately from the SYSTEM module 82, but they partially overlap.

An IIT module 84 for controlling a stepping motor used in the imaging unit is stored in the IIT remote 73. An IPS module 85 for executing various processing is stored in the IPS remote 74. These modules are controlled by the SYSTEM module 82.

The MCB remote 75 stores software modules, such as an MCBUI module 86 as software for controlling the display change when the color copying machine or color copier is in a fault state such as by diagnostic, auditron, and jamming, an IOT module 90 for executing the processing necessary for the copying operation, such as photosensitive belt control, developing unit control, and fuser control, ADF module 91 for controlling the ADF, and SORTER module 92, and a copier executive module 87 for managing the software modules, dia. executive module 88 for executing a variety of diagnostic routines, and an auditron module 89 for processing charge calculation by accessing an electronic counter with a password.

Figure 5A:
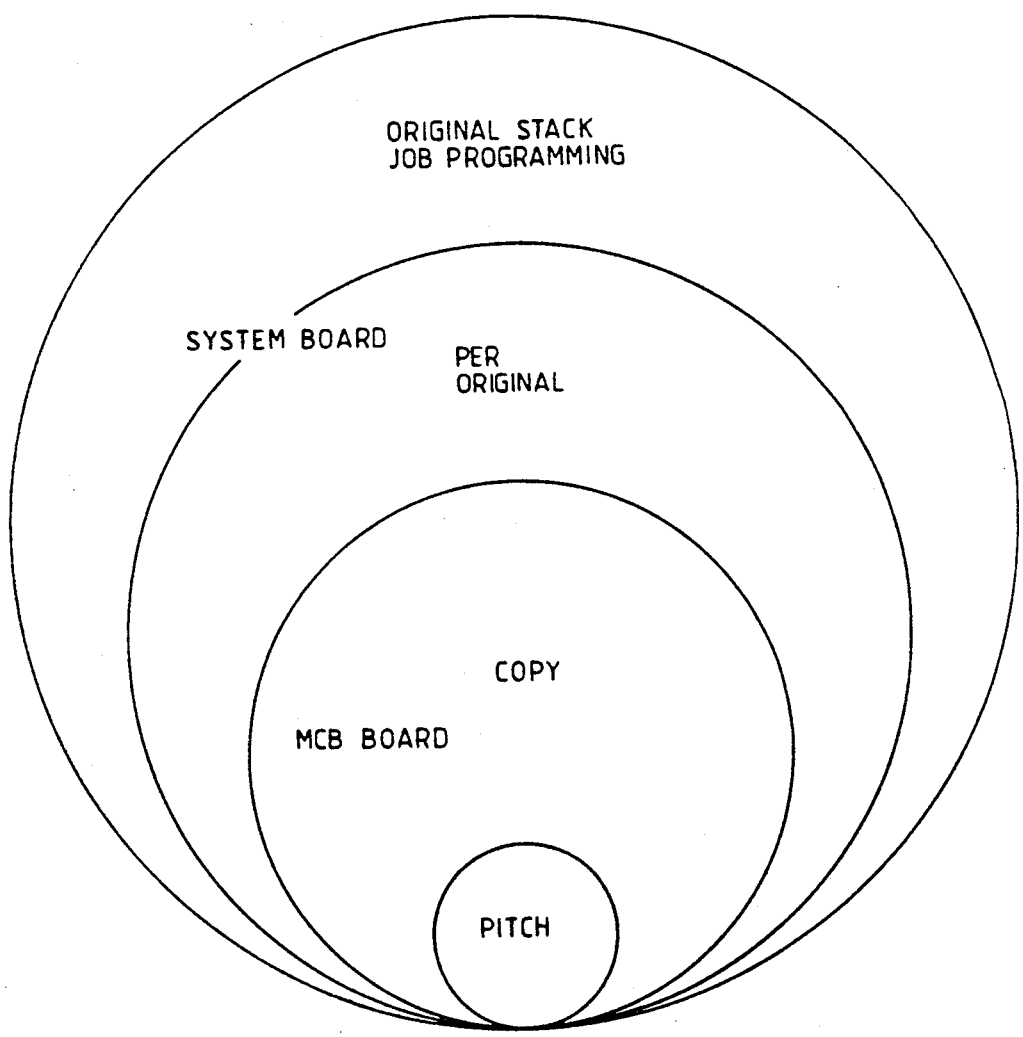
FIGS. 5(a) through 5(e) show copy layers.

The RCB remote 77 stores a turtle servo module 93 controlling the operation of the turtle. The module 93 is under control of the IOT module 90, in order to control the transfer process of the Xerography cycle. In FIG. 4, the copier executive module 87 and the dia. executive module 88 are depicted partially overlapping with each other to indicate shared processing. The shared processing will be described while tracing a sequence flow copying operation. The copying operation, except the difference of colors, consists of repetitive similar operations, and hence it may be divided into some layers, as shown in FIG. 5(a).

An operation unit, called pitch, is repeated to make a sheet of color copy. The operation for copying a mono color copy may consist of processings describing how to operate the developing unit, transfer unit, and the like, and how to detect jamming. The repetitive applications of a sequence of the pitch processings to three colors Y, M and C makes a three-pass color copy. When it is applied to four colors Y, M, C and K, a four-pass color copy is made. This sequence of copying operations forms a copy layer. In the copy layer, the toners of three colors are transferred to the paper, the transferred color toner image is fused, and the copy paper or the paper bearing the fused color image is delivered outside the base machine. The processing up to this point is managed by the copier executive module 87.

The IIT module 84 and the IPS module 85 in the SYS system are also used for pitch processing. To this end, the IOT module 90 communicates with the IIT module 84 by using two types of signals, a PR-TRUE signal and a LE-REG signal. More specifically, a PR (pitch reset) signal providing a reference timing for the control of the IOT is recursively generated by the MCB every time the photosensitive belt rotates by ½ or ⅓ of a turn. To attain an effective use and increase a copy speed, the motion pitch of the photosensitive belt is divided in accordance with the size of paper. For example, for A3 paper it is driven at the rate of 2 pitches, and for A4 paper it is driven at the rate of 3 pitches. The period of the PR signal generated every pitch is long. 3 sec. for the 2-pitch rate. and is short. 2 sec. for the 3-pitch rate.

The PR signal generated by the MCB is distributed to the necessary portions within the IOT. such as a VB remote for handling mainly the VIDEO signal, by way of the hot lines.

The VCB. containing gate circuitry. selects only the pitch signal to allow imaging within the IOT, viz.. allow the photosensitive belt to be exposed to an image light, and sends it to the IPS remote. This signal is a PRTRUE signal. The data to generate the PR-TRUE signal on the basis of the PR signal that is received through the hot line from the MCB, is applied from the MCB through the LNET.

During the period that the image cannot be projected on the photosensitive belt, an idle pitch of 1 pitch is involved in the photosensitive belt. No PR-TRUE signal is outputted for such an idle pitch. No PR-TRUE signal is generated during the period from the instant that the transfer unit has eliminated the transferred copy paper until the next paper reaches the transfer unit. In the case of a long paper (A3 size), for example. if it is eliminated from the transfer unit immediately after the toner image is transferred onto the paper, the leading end of the paper hits the entrance of the fuser. At this time. the paper is shocked and with the shock. the transferred toner image is possibly damaged. To avoid this problem, following completion of the image transfer on large paper, the paper is rotated by one turn at a constant speed while being held by a grip bar, and is then transferred to the next stage. It is for this reason that the skip of 1 pitch is required for the photosensitive belt motion.

No PR-TRUE signal is generated also during a period from the copy start by a start key until a cycle-up sequence is completed, because during this period, the reading of an original image is not yet carried out and hence the photosensitive belt cannot be exposed to an image light.

The PR-TRUE signal outputted from the VCB remote is received by the IPS remote, and is also applied to the IIT remote. In the IIT remote, it is used as a trigger signal for scan start of the IIT.

The pitch processing in the IIT remote and the IPS remote may be synchronized with the operation of the IOT. At this time. a video signal to modulate a laser beam that is used for forming a latent image on the photosensitive drum is transferred between the IPS remote and the VCB remote 76. The video signal received by the VCB remote 76, which is a parallel signal, is converted into a serial signal. Then, the serial signal is directly applied, as a VIDEO modulation signal, to the laser output section 40a through the ROS interface.

The above sequence of pitch operations is repeated four times, to form a 4-pass color copy, and one cycle of copying operations is completed.

Figure 5B:
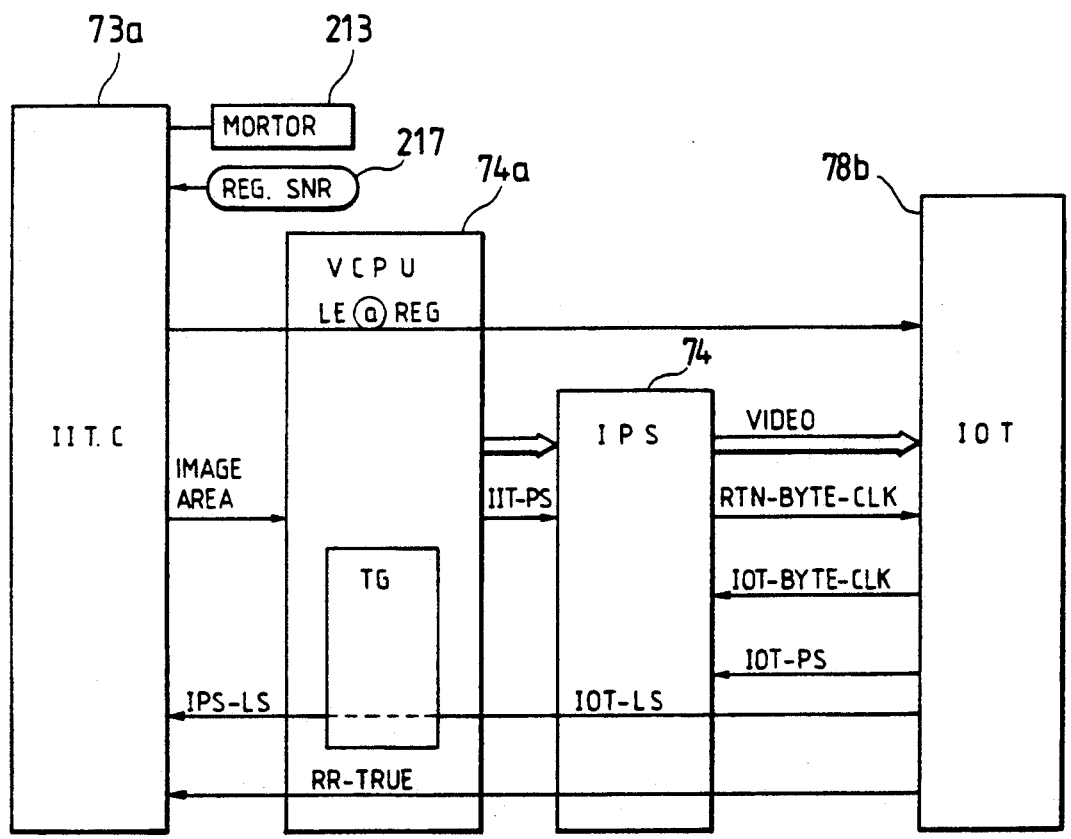

The signal transmissions and timings in a copying process between the application of image signals read by the IIT to the IOT and the image transfer on a sheet of paper at the transfer point will be described with reference to FIGS. 5(b) to 5(c).

When receiving a start job command from the SYS remote 71, the operation of the IOT 78b enters a cycle-up sequence, such as drive of a main motor and power on of a high voltage power supply, as shown in FIGS. 5(b) to 5(e). The IOT 78b produces a PR (pitch reset) signal, in order to form a latent image of a length corresponding to a paper length on the photosensitive belt.

For example. a 3-pitch PR signal is generated for the A4 size, and a 2-pitch PR signal. for the A3 size. Upon completion of the cycle-up sequence in the IOT 78b. a PR-TRUE signal is applied to the IIT controller 73a in synchronism with the PR signal, in connection with only the pitch requiring the imaging.

From the IOT 78b, an IOT-LS (line sink) signal outputted every one-line rotation of the ROS (raster output scan) is sent to a timing generator (TG) in the VCPU 74a. An IPS-LS, whose phase is advanced by a delay corresponding to a total of pipe lines of the IPS with respect to the IOT-LS signal, is transferred to the IIT controller 73a.

When receiving the PR-TRUE signal, the IIT controller 73a enables a counter, and counts the IOT-LS signal by the counter. When a count by the counter reaches a predetermined value, a stepping motor 213 for driving the imaging unit 37 is started up, and the imaging unit starts to scan an original. The counter further continues its counting, and after T2 sec., an LE-REG signal is output at the start position of reading the original, and is sent to the IOT 78b.

In respect to the read start position, a position of a reginsor 217 (near the reg. position, more exactly located at a position separated by about 10 mm from the reg. position toward the scan side) is detected, and a true reg. position is calculated using the detected position of the reginsor 217. At the same time, a normal stop position (home position) can also be calculated.

The reg. positions of the copying machines differ from one another due to a mechanical dispersion. To cope with this, the corrected values are stored in an NVM (nonvolatile memory). When the true reg. position and the home position are calculated, the stored values are used for their correction to obtain a correct original start position. The corrected value may be altered by electrically reprogramming at the factory or by a serviceman. The reason why the position of the reginsor 217 is separated by about 10 mm from the true reg. position toward the scan side is adjustment and the software. A minus value can be always used for the correction.

The IIT controller 73a outputs an IMAGE-AREA signal in synchronism with the signal LE-REG. A length of the IMAGE-AREA signal is equal to the scan length that is defined by a start command transferred from the SYSTEM module 82 to the IIT module 84. More specifically, when a document size is detected for the copying operation, the scan length is equal to the document length. When a magnification is designated for the copying operation, the scan length is determined by a divisor of a copy paper length and a magnification (100% is set at 1). The IMAGE-AREA signal is applied to the VCPU 74a. The VCPU 74a outputs it as an IIT-PS (page sink) for transmission to the IPS 74. The IIT-PS signal indicates time to execute an image processing.

When the LE-REG signal is generated, data of one line of the line sensor is read in synchronism with the IOT-LS signal. The data as read is transferred to the VIDEO circuit (FIG. 3) where it is subjected to various correction processings and A/D conversion. The output data signal of the VIDEO circuit is then transferred to the IPS 74. The IPS 74 transfers the video data of one line to the IOT 78b in synchronism with the IOT-LS signal. At this time, a signal RTN-BYTE-CLK, together with the data, is returned to the IOT, and the data and clock are also delayed to secure a reliable synchronism.

When the signal LE-REG is applied to the IOT78b, the video data is transferred to the ROS in synchronism with the IOT-LS signal, so that a latent image is formed on the photosensitive belt. When receiving the signal LE-REG, the IOT 78b starts to count by the signal IOT-CLK with reference to the timing of the signal LE-REG. The servo motor of the transfer unit is controlled so that the leading edge of a paper is positioned at the transfer point defined by a predetermined count. As seen from FIG. 5(d), the PR-TRUE signal generated by the rotation of the photosensitive belt is not inherently synchronized with the IOT-LS signal outputted by the rotation of the ROS. Therefore, when the signal PR-TRUE is received, the count starts at the next IOT-LS, the imaging unit 37 is driven at a count "m," and the signal LE-REG is outputted at a count "n", the signal LE-REG is delayed by time T1 behind the signal PR-REG. A maximum of this delay is one line sink. In the case of the full color copy, the delay is accumulated and the accumulation results in a color displacement.

Figure 5C:
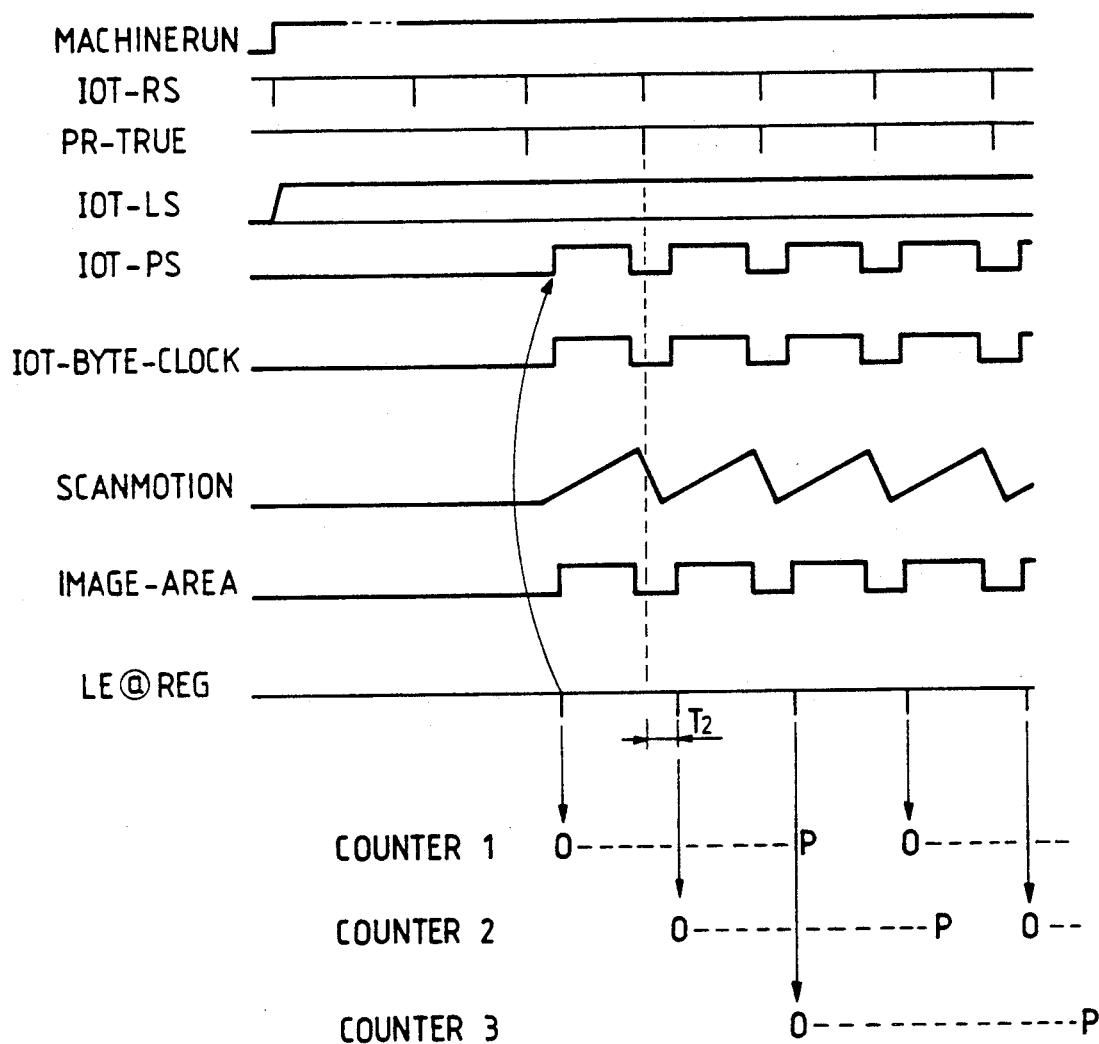
Figure 5D:
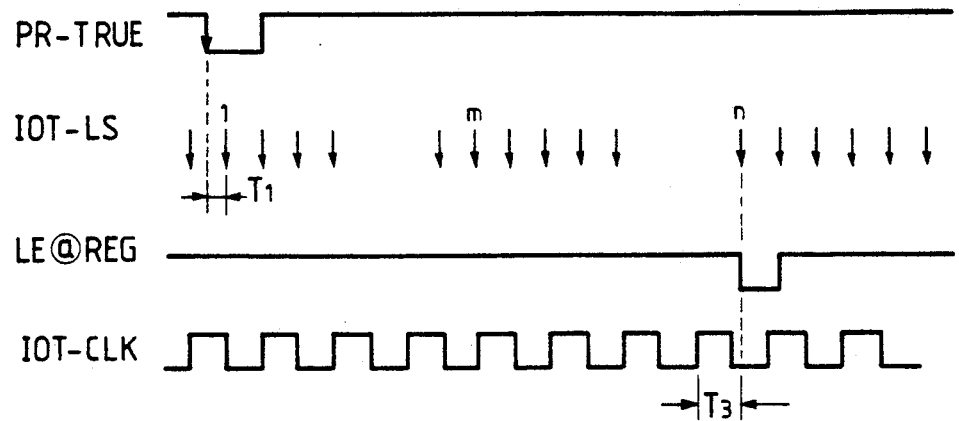
Figure 5E:
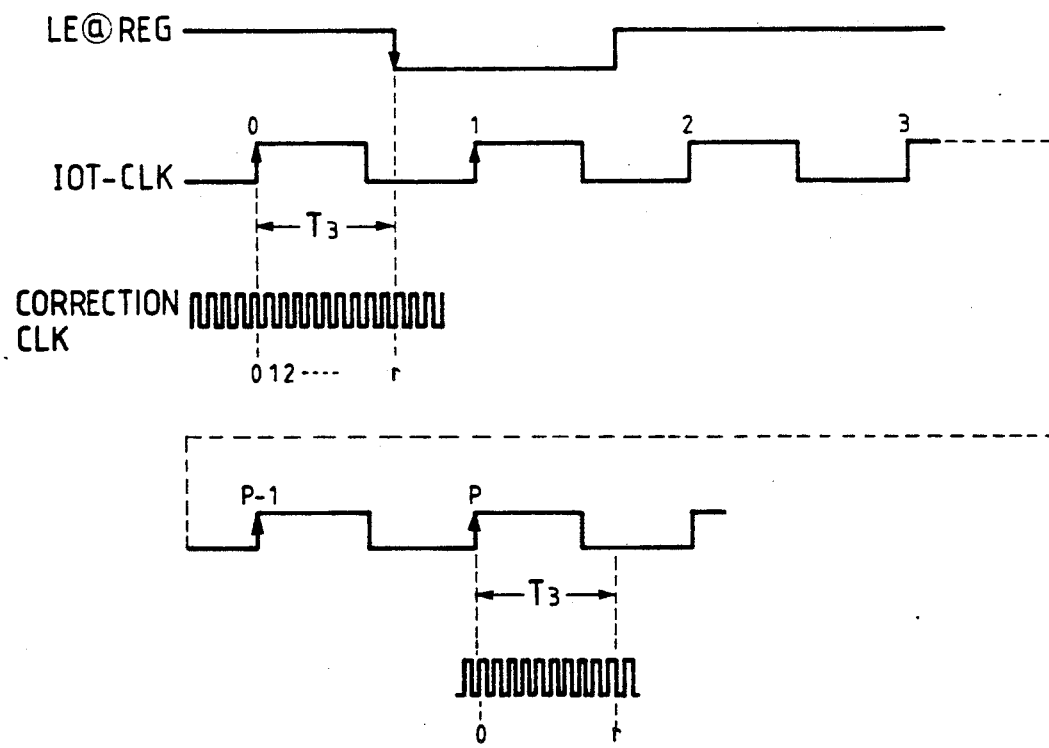

As a measure for the above, as shown in FIG. 5(c), when the first signal LE-REG occurs, the counter 1 starts to count, and when the second and third signals LE-REG occur, the counters 2 and 3 start to count. When the counters reach the count "p" corresponding to the transfer point, the counters are cleared. For the fourth count and the subsequent ones, the counters start to count in a similar way. As shown in FIG. 5(e), when the signal LE-REG occurs, time T3 lasting from the pulse of the IOT-CLK immediately before the signal LE-REG is counted in accordance with a correction clock. A latent image formed on the photosensitive drum approaches to the transfer point and a count by the counter based on the signal IOT-CLK reaches the count "p". At the instant that the count "p" is reached, the counting based on the correction clock starts. The sum of the correction clock and a count "r" corresponding to the time T3 indicates a correct transfer point. This is introduced into the control of the counter that is exclusively used for controlling a transfer point (timing) of the transfer unit. In this way, the servo motor of the transfer unit is controlled so that the leading end of the paper is exactly synchronized with the signal LE-REG.

Following the processings described above that are categorized into the copy layer, another processing step to set the number of jobs as copy units executed for an original, viz., to set the number of copies, is executed. This is executed per original (see FIG. 5(a)). An additional layer following the per original is a job programming layer to change parameters in jobs. More exactly, the job programming layer checks as to whether or not the ADF is used, a color of a part of an original is changed, and the one-side magnification function is operated these layers of the per original and the job programming are managed by the SYS module 83 in the SYS system. Accordingly, the SYSTEM module 82 checks and confirms the jobs transferred from the LLUI module 80, generates necessary data, and informs the IIT module 84 and the IPS module 85 of the job through the 9600 bps serial communication network, and also informs the MCB system through the LNET.

As seen from the foregoing description, the controls that can be independently processed and can be made common with another apparatus or device are decentralized into the UI system, SYS system, and the MCB system. The modules for managing the copying machine are determined in accordance with the layers of the copying processes. This approach brings about many advantageous features. The design work of the electrical control system the copying machine may be classified and itemized. The developing techniques, such as software, can be standardized. The time limit of delivery and the cost to manufacture can be exactly predicted. When some specifications are changed, it is only needed to replace the related modules with other new ones.

In the previous subsection, the shared controls of the UI system, SYS system and MCB system were described. In this subsection, the controls by these systems control in the respective stages of the machine operation will be described by tracing a flow of the machine operation.

Figure 6:
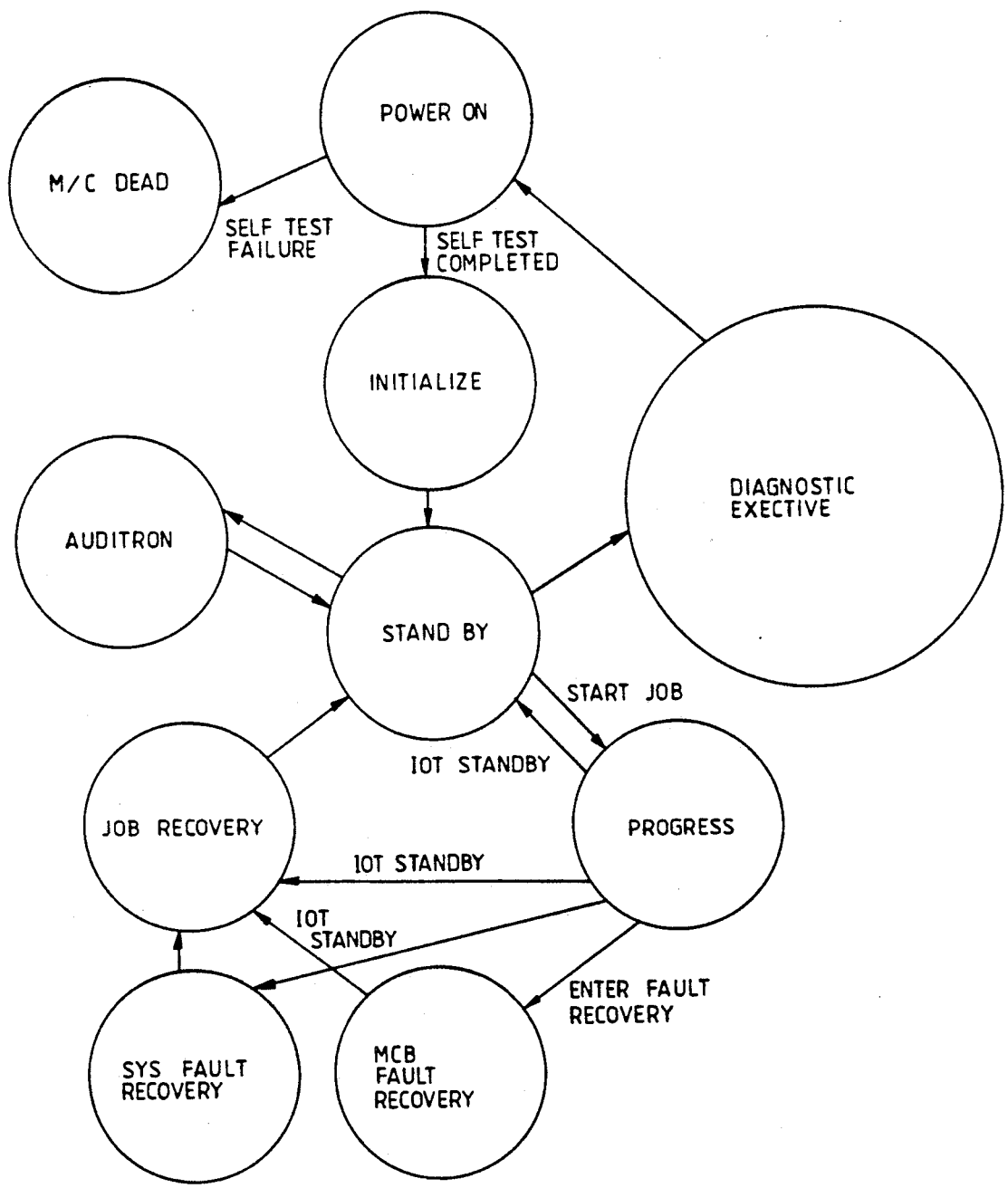
FIG. 6 is an explanatory diagram for explaining state divisions.

In the present color copying machine, a flow of machine operations including power-on, copying, end of copying, and machine state copying operation, are divided into a plurality of states. These states are assigned jobs, respectively. Control cannot proceed to the next state until the job in a state is completed. This ensures efficient and precise control progression. The above manner to control the machine operation is called a state division. In this instance, the machine operation is divided into states, as shown in FIG. 6.

The state division is featured in that in some operation modes, the SYS remote 71 possesses a control right to control all of the states and a UI master right to use the UI in a state, and in some control modes, the MCB remote possesses them. With the decentralization of control, the LLUI module 80 of the UI remote 70 is controlled not only by the SYSUI module but also by the MCBUI module 86. The processings are shared such that the pitch and copy processings are under control of the copier executive module 87 in the MCB system, and the per original processings and the job programming processings are controlled by the SYS module 82. Accordingly, in some states the SYS module 82 has the control right and the UI master right in some states, and in some states the copier executive module 87 has them. In FIG. 6, in states indicated by circles filled with vertical thin lines, the UI master right is possessed by the copier executive module 87 in the MCB system. In states indicated by circles painted black the UI master right is possessed by the SYS module 82.

Figure 7:
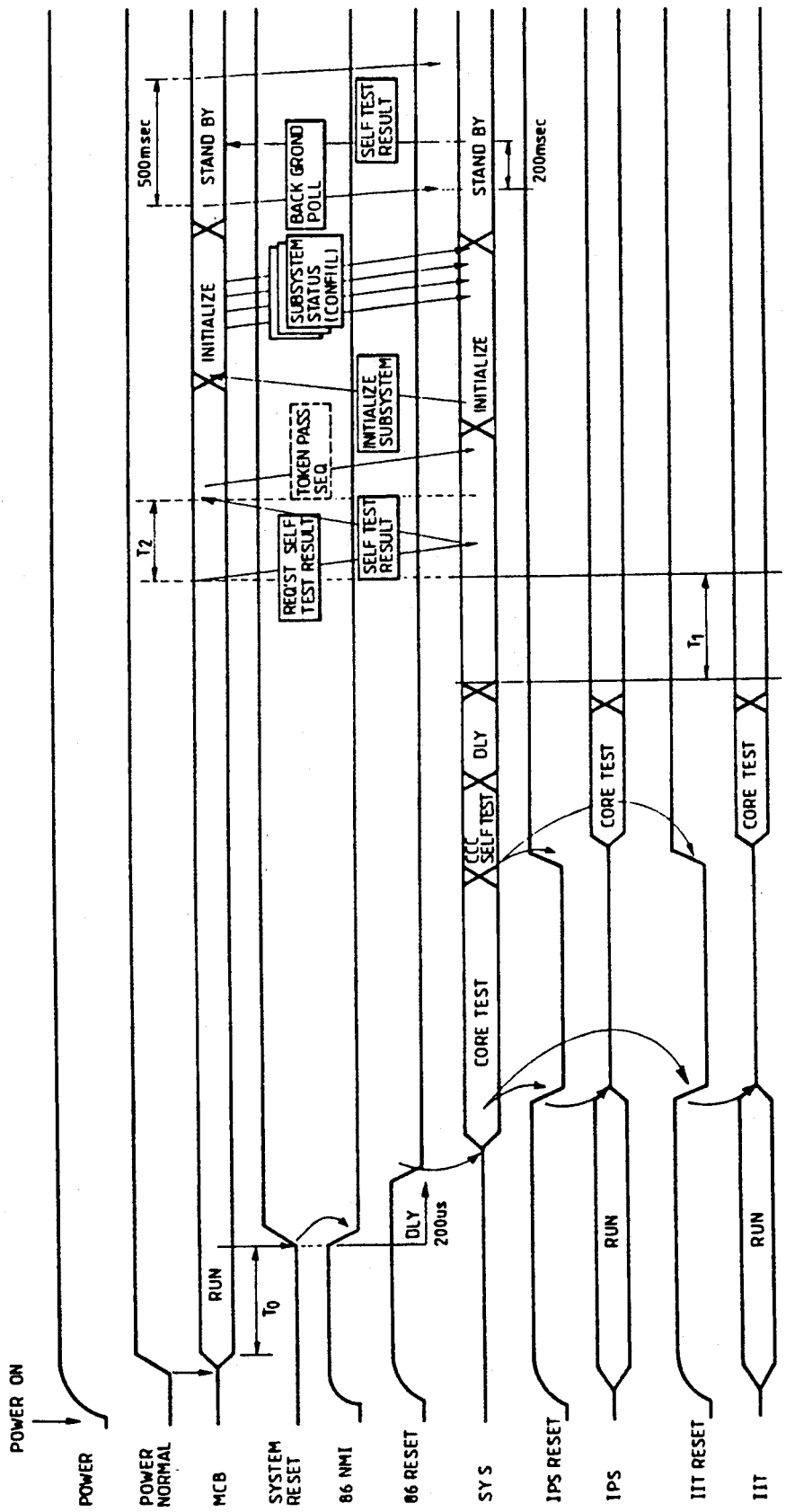
FIG. 7 shows a timing chart for explaining the operation of the copier from the power on to the standby state.

Of the states shown in FIG. 6, the machine operation from the power-on state to the standby state will be described with reference to FIG. 7. A power switch is turned on, and the machine is in a power-on state. An IPS reset signal and an IIT reset signal that are supplied from the SYS remote 71 to the IIT remote 74 and the IPS remote 74 (FIG. 3) become H (high) in logic state. Upon receipt of these signals, the IPS remote 74 and the IIT remote 73 are released from the reset status and start to operate. The settle-down of the power voltage is detected and a power normal signal rises. The MCB remote 75 starts to operate and to establish the control right and the UI master right. At the same time, it tests the high speed communication network LNET. The power normal signal is transferred from the MCB remote 75 to the SYS remote 71, by way of the hot line.

When time T0 elapses from the operation start of the MCB remote 75, a system reset signal supplied from the MCB remote 75 through the hot line to the SYS remote 71 goes high. Then, the SYS remote 71 is released from the reset status and starts to operate. The operation start of the SYS remote 71 is delayed by time T0 plus 200 usec by two signals, 86 NMI and 86 reset, that are internal signals of the SYS remote 71. The time period of 200 usec is provided for storing the present state of the copying machine into a nonvolatile memory when the copying machine stops or runs away due to clash, i.e., temporary trouble, power interrupt, software runaway, and software bug.

When the SYS remote 71 starts to operate, a core test is conducted for a period of approximately 3.8 sec. The test checks the contents of the ROM and RAM, and the hardware. At this time, if undesired data is mistakenly entered, the machine will possibly run away. To avoid this, the SYS remote 71, on its decision, renders low (L) the IPS reset signal and the II'P reset signal, at the time of the start of the core test. By the L signals, the IPS remote 74 and the IIT remote 73 are reset and come to a stand-still.

Upon completion of the core test, the SYS remote 71 conducts a CCC self test during a period of 10 to 3100 msec, and at the same time renders high the IPS reset signal and the IIT reset signal to cause the IPS remote 74 and the IIT remote 73 to operate again, and to cause them to conduct the core tests. In the CCC self test, the SYS remote 71 sends predetermined data to the LNET, receives the return data, and checks as to whether or not the transmitted data is coincident with the received data. The times of the self tests of the CCCs are staggered to prevent the different self tests from being conducted concurrently.

The LNET employs a contention system. In this system, the nodes such as the SYS remote 71 and the MCB remote 75 transmit data when they desire. If different data collide, the same data is retransmitted after predetermined time lapses. The reason why the contention system is used is that when the SYS remote 71 is conducting the CCC self test, if another node uses the LNET, data collision occurs and the CCC self test cannot occur. Accordingly, before the SYS remote 71 starts the CCC self test, the LNET test by the MCB remote is completed.

When the CCC self test ends, the SYS remote waits till the core tests by the IPS remote 74 and the IIT remote 73 are completed. It conducts a communication test of the SYSTEM node during a period T1. This communication test is for testing the serial communication network of 9600 bps. In the test, predetermined data is transferred in a predetermined sequence. Upon completion of the communication test, during a period T2 the LNET communication test is conducted between the SYS remote 71 and the MCB remote 75. In the communication test, the MCB remote 75 requests the SYS remote 71 to return the results of the self test. In response to the request, the SYS remote 71 returns the results of the tests thus far conducted, as self test results, to the MCB remote 75.

When receiving the self test result, the MCB remote 75 issues a token pass toward the SYS remote 71. The token pass is used to transfer the UI master right. For example, when the token pass is transferred to the SYS remote 71, the UI master right is transferred from the MSB remote 75 to the SYS remote 71. The operations up to this point belong to a power-on sequence. In this sequence, the UI remote 70 displays a message of "Please wait a minute," for example, and executes various tests, such as a core test of the remote 70 itself and communication test.

In the self test sequence, when the return of the self test result is requested, but no return is made, or the returned self test result contains an error, the MCB remote 75 makes the copying machine inoperable, exercises the UI control right to control the UI remote 70, and visually presents a fault state of the machine.

An initialize state to set up the respective remotes follows the power-on state. In the initialize state, the SYS remote 71 possesses the control right to control all of the states and the UI master right. The SYS remote 71 initializes the SYS system, and issues a command INITIALIZE SUBSYSTEM to the MCB remote 75 and initializes the MCB system. The result of the initialization is returned as subsystem status from the MCB remote 75. Through the initializing state, in the IOT, the fuse is heated, and the elevator of the tray is set at a predetermined position. The operations up to this point constitute the initialize state.

Upon completion of the initialize state, the respective remotes enter a stand-by state in which the they are ready for a copying operation. In this state, the SYS remote 71 possesses the UI master right. Accordingly, it exercises the UI master right to display the F/F on the UI display screen, and is ready for accepting the conditions for executing the copying operations. At this time, the MOCB remote 75 monitors the IOT. In the stand-by state, to check for a fault in the copier, the MCB remote 75 issues a background poll to the SYS remote 71 every 500 msec. In response to this, the SYS remote 71 returns the self test result to the MCB remote 75 within 200 msec. When no return of the self test result is made, or the returned self test result contains an error, the MCB remote 75 informs the UI remote 70 of occurrence of a fault state, and causes it to display a fault state of the machine.

When the auditron is used in the stand-by state, the copier enters an auditron state. In this state, the MCB remote 75 exercises the auditron control, and at the same time controls the UI remote 70 to cause it to present an auditron display. When the F/F is set up and the start key is operated in the stand-by state, the copier enters a progress state. The progress state is further divided into six substates: set-up, cycle-up, skip pitch, normal cycledown, and cycledown shutdown. These substates will be described with reference to FIG. 8.

Figure 8:
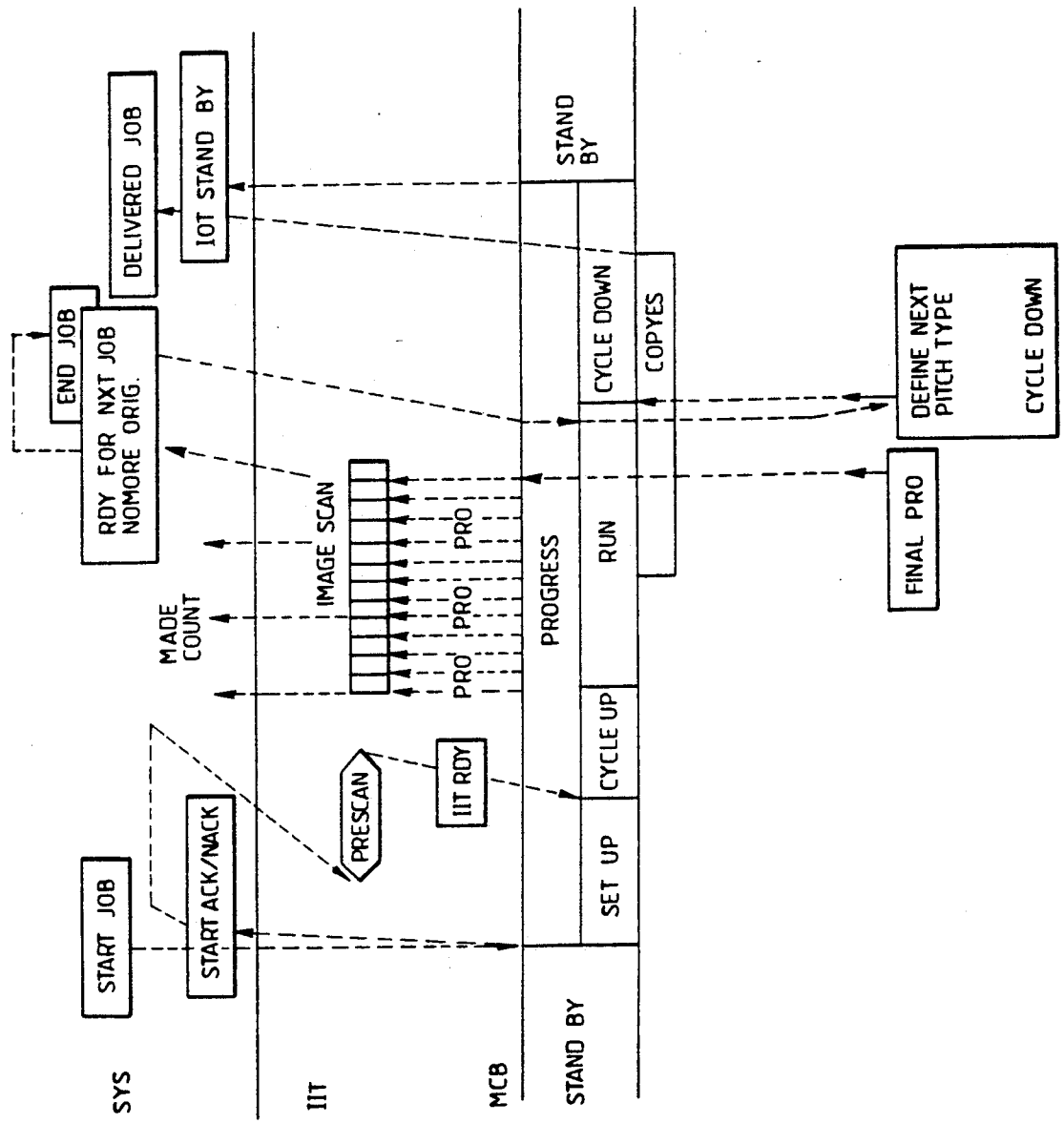
FIG. 8 is a timing chart for explaining substrates of the progress state.

A timing chart illustrated in FIG. 8 was plotted under conditions that the copier is set in a platen mode, full color mode, and the number of copies is set at three.

When detecting the depression of the start key, the SYS remote 71 sends the contents of a job to the IIT remote 73 and the IPS remote 74, through the serial communication network. The SYS remote 71 also issues a command "start job," and sends the job contents and the start job command to the copier executive module 87 in the MCB remote 75. As a result, the copier enters the setup substate, and the respective remotes prepare for executing the designated job. In the IOT module 90, a main motor is driven, and parameters for the photosensitive belt are set to correct values. The SYS remote 71 confirms that an ACK (acknowledge) signal as a response of the MCB remote 75 to the start job reaches, and causes the IIT remote 73 to prescan. In this instance, four types of prescans are used; a prescan to detect the size of an original, a prescan to detect a color in a specified portion on the document, a prescan to detect a closed loop for an outline drawing for coloring, and a prescan for reading a marker in the marker edit mode. A maximum of three prescans is repeated in accordance with the selected F/F. At this time, the UI displays a message "Please wait a minute," for example.

When the prescan operation ends, a command "IIT ready" is issued to the copier executive module 87. From this point, the copier, or the copying machine, enters the cycle-up substate. In the cycle-up state, the copier waits for the respective remote to start up and settle down. The MCB remote 75 starts up the IOT and the transfer unit. The SYS remote initializes the IPS remote 74. At this time, the UI displays the progress state being exercised and the contents of the selected job.

Upon completion of the cycle-up substate, the run substate is executed and the copying operation starts. When the first PR0 signed is produced from the IOT module 90 of the MCB remote 75, the IIT performs a first time scan, and the IOT performs the development of a first color. Here, the processing of one pitch is completed. Then, when the second PR0 signed is produced, the processing of the second pitch is completed. The above processing sequence is repeated four times to complete the processing of 4 pitches. Then, the IOT fuses the toner image and delivers the paper with the fused image outside the base machine. At this point, the first copy is completed. The above processing sequence is repeated to produce three copies as is preset.

The processing of the pitch layer and the copy layer are under control of the MCB remote 75. The setting of the number of copies in the per original as the upper layer of the above two layers is carried out by the SYS remote 71. Accordingly, in order that the SYS remote 71 can recognize what number of copies is currently made, when the first PR0 signed for each copy is produced, the MCB remote 75 produces copies made count signal for transfer to the SYS remote 71. When the final PR0 signed is produced, the MCB remote 75 requests the SYS remote 71 to send the next job by issuing a command "RDY FOR NXT JOB" to the SYS remote 71. At this time, if the start job is issued, the job can be continued. When a user does not set the next job, the job ends. In this case, the SYS remote 71 issues a command "END JOB" to the MCB remote 75. When the MCB remote 75 receives the "END JOB" and confirms that the job ends, the copier enters the normal cycledown substate. In this state, the MCB remote 75 stops the operation of the IOT.

During the course of cycle down, when the copy papers have been delivered out of the base machine and the MCB remote 75 confirms the delivery of the copy papers, the remote 75 informs the SYS remote 71 by issuing a command "DELIVERED JOB". Also, when the normal cycle down ends and the machine comes to a stop, the MCB remote 75 informs the SYS remote 71 by issuing a command "IOT STAND BY." At this point, the progress state ends and control returns to the standby state.

The substates of the skip pitch and the cycledown shutdown that have not yet been described will be referred to below. In the skip pitch, the SYS remote 71 initializes the SYS system for the next job, and the MCB remote 75 is ready for the next copy. In the cycle down shutdown state that is used when a fault occurs, the SYS remote 71 and the MCB remote 75 both execute fault processing.

As seen from the foregoing description, in the progress state, the MCB remote 75 controls the pitch processing and copy processing, and the SYS remote 71 controls the per original and the job programming. Accordingly, the control right is possessed by the MCB remote 75 or the SYS remote 71 in accordance with the shared processing that is currently performed. The UI master right, however, is exclusively possessed by the SYS remote 71. The reason for this is that the UI must display the number of copies as is set and the selected edit processings. These jobs belong to the per original layer and the job programming layer, and hence under control of the SYS remote 71.

When a fault occurs in the progress state, control goes to a fault recovery state. The word "fault" means an abnormal state of the copier including no paper, jamming, abnormal and damaged parts, and the like. The fault comes in two categories, a first fault that a user can remove by resetting the F/F, and a second fault that requires some action by a serviceman, such as parts replacement. As described above, basically, the fault display function is shared by the MCBUI module 86, but the F/F is controlled by the SYS module 82. The machine recovery from the first fault that can be cured by the resetting of the F/F is shared by the SYS module 82. The machine recovery work from other faults is shared by the copier executive module 87.

The SYS system and the MCB system are used for detecting faults. Faults occurring in the IIT, IPS, and F/P are detected by the SYS remote 71, because these are controlled by the remote 71. Faults occurring in the IOT, ADF, and sorter are detected by the MCB remote 75, because these are controlled by the remote 75. Accordingly, the faults possibly occurring in the copying machine may be categorized into four types of faults to be given below.

This type of fault occurs when the start key is depressed before the F/P is set. The fault state of the machine can be removed by resetting the F/P.

This type of fault includes trouble of the reginsor, abnormal speed of the imaging unit, overrun of the imaging unit, abnormal PR0 signal, abnormal CCC, trouble in the serial communication network, check error of the ROM or RAM, and the like. When any of the above fault states occurs, the UI displays the contents of the fault and a message "Call a serviceman."

When the sorter is actually set, if the F/F sets the sorter, the MCB node detects a fault. Such a fault state in the copying machine can be removed by resetting the F/F by a user. The same thing is true for the ADF. A fault is detected when an inadequate amount of toner is left, no tray is set, and no paper is present. These faults can be removed by merely supplying toner and toner, and setting a tray. When papers are used up in a tray, selection of another tray can cause recovery from the machine from the fault state. When toner of a certain color is used up, designation of toner of another color can cause a recovery from the fault machine. Thus, since the F/F selection can cause the recovery from the fault state, the recovery work is shared by the SYS node.

When the developing unit is abnormal, the toner supply is abnormal, the motor clutch is abnormal, or the fuser is abnormal, the MCB node detects such a fault and the UI displays a fault location and a message "Call a servicemen." When jamming occurs, the UI displays the jam location and the way to clear jamming. In this way, the machine recovery work is put into the hands of users.

As described above, in the fault recovery state, the control right and the UI master right are possessed by the SYS node or the MOCB node depending on the fault location and the recovery method used.

After fault recovery, when the MCB node issues an IOT standby command, control goes to the job recovery state and executes the remaining jobs. If the number of copies is set at 3, for example, and a jam occurs during the copying operation of the second copy, after the jam is cleared, the remaining two copies must be made. Accordingly, the SYS node and the MCB node execute their processes, to recover the job. Also, in the job recovery state, the control right is possessed by the SYS node or the MCB node depending on their sharing of process functions, but the UI master right is possessed by the SYS node. The reason for this is as follows. To exercise the job recovery state, a display for job recovery must be made, such as "Push a start key" and "Set the remaining document." Such display processing belongs to the per original layer or the job programming layer that are under control of the SYS node.

Also, when an IOT stand-by command is issued in the progress state, the job recovery state is exercised. When the job execution end is confirmed, control goes to the stand-by state, and waits for the next job. In the stand-by state, control is allowed to proceed to the diagnostic (referred simply to as a diag.) state by a predetermined key operation.

Figure 9:
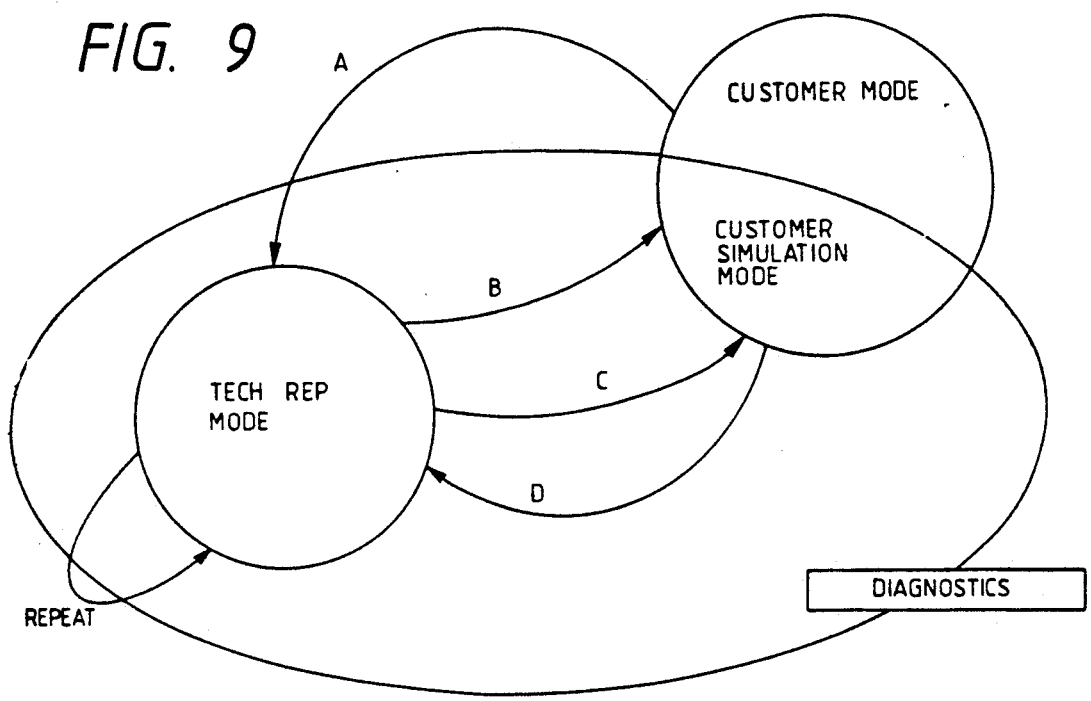
FIG. 9 is a diagram showing an outline of a diagnostic process.

The diag. state consists of self test processing such as for input/output check of parts, setting of various parameters, setting of various modes, and initializing the NVM (nonvolatile memory). The schematic illustration of the diag. state is given in FIG. 9. As seen from the figure, two modes are used, a TECH REP mode and a customer simulation.

The TECH REP mode is used for the machine diagnosis by a serviceman, such as input and output checks. The customer simulation node simulate copying operations by customers in the diag. state. If control proceeds from the stand-by state of the customer mode to the TECH REP mode by way of a route A, various checks and parameter settings in the TECH REP mode are made and control returns to the customer mode (by way of a route B), a mere operation of a predetermined key allows control to go to the power-on state (FIG. 6) and to return to the stand-by state through the sequence of FIG. 7. Because the copying machine of the present invention makes color copies and is provided with various edit functions, after various parameters are set in the TECH REP mode, checks must be made to determine whether or not desired colors are produced and whether the edit functions are normal or not by actually making copies. It is the customer simulation mode that executes the above checks. The customer simulation mode is different from the customer mode in that no billing is made and the UI displays the diag. state being exercised.

The shift of control from the TECH REP mode to the customer simulation mode (via a route C) and the reverse shift of control from the customer simulation mode to the TECH REP mode (via a route D) may be made by pregiven operations. The TECH REP mode progresses under control of the diag. executive module 88 (FIG. 4). In this case, the MCB node has both the control right and the MCB master right. In the customer simulation mode, the actual copying operation is performed under control of the diag. module 83 (FIG. 4). In this case, the SYS node has both the control right and the US master right.

Figure 10:
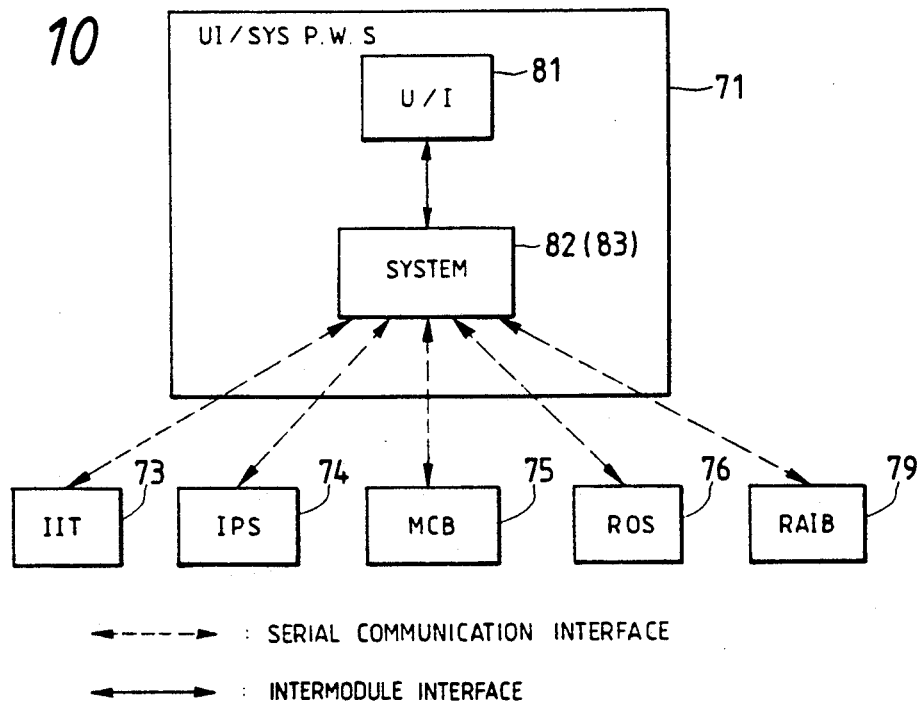
FIG. 10 is a diagram showing relationships of the system and remotes.

FIG. 10 shows relationships between the system and other remotes. As described, the SYS remote 71 uses the SYSUI module 81 and the SYSTEM module 82. Data is transferred between these modules 81 and 82 through a module interface. A serial communication interface intervenes between the SYSTEM module 82, and the IIT 73 and IPS 74. An LNET communication network couples the SYSTEM module 82 with the MCB 75, ROS 76 and RAIB 79.

Figure 11:
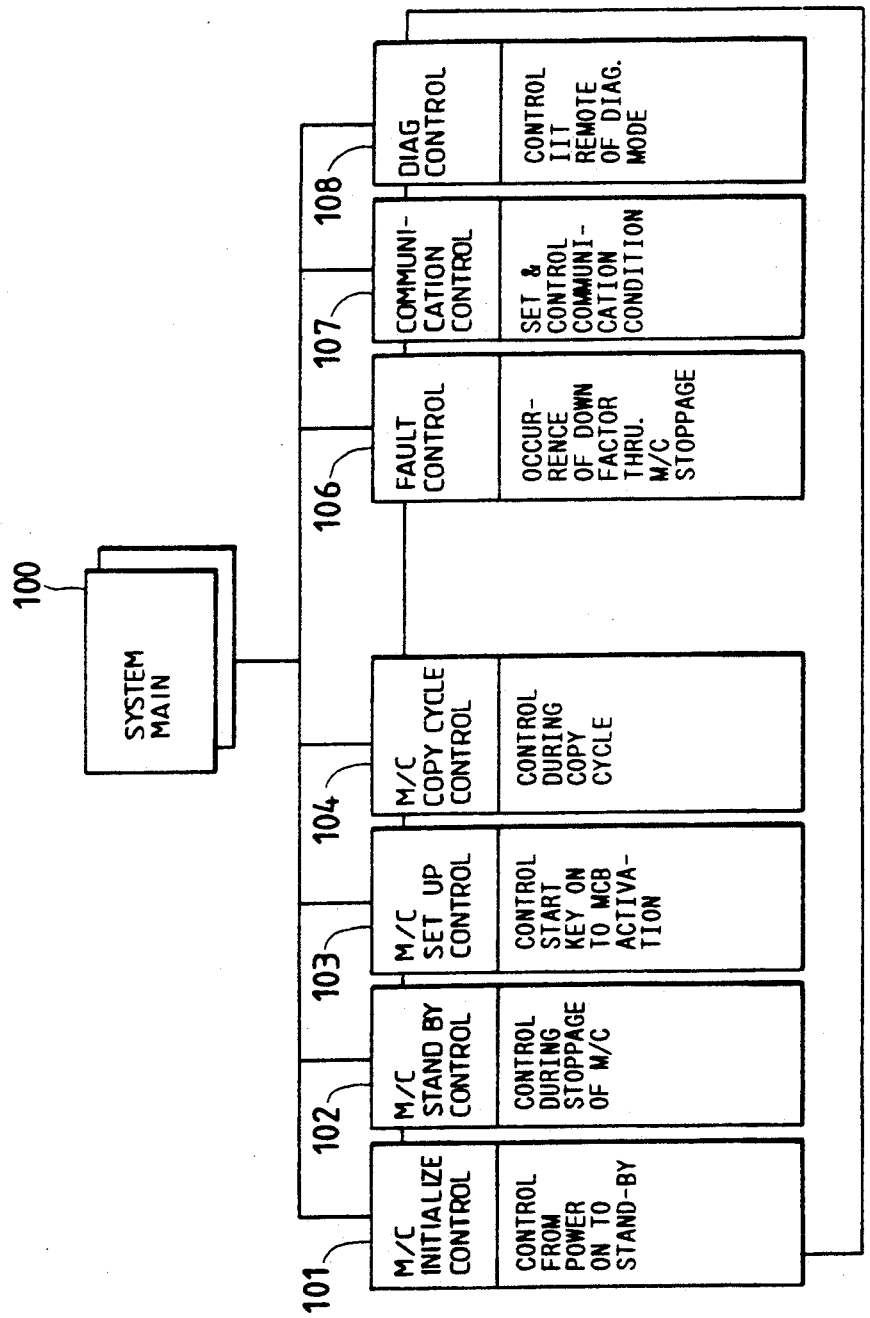
FIG. 11 is a diagram showing a module configuration of the system.

A module configuration of the system will be described with reference to FIG. 11. In the color copying machine of the present invention, the modules such as IIT, IPS and IOT function like passive parts, and the modules in the system for controlling the above modules function like active parts. The copying machine employs a decentralized CPU system. The per original layer and the job programming layer are shared by the system. The system has the control right to control the initialize state, stand-by state, set-up state, and cycle state, and the UI master right for using the UI in the above states. A system main 100 fetches the data received from the SYSUI, MCB, and the like into the internal buffer, clears the data in the internal buffer, calls the respective lower order modules in the system main 100 and transfers the job to them to execute updating processings.

An M/C initialize control module 101 controls an initialize sequence from the power-on to the setting up of the stand-by mode. This is driven when the power-on state for executing various types of tests after power-on by the MCB.

An M/C set-up control module 103 controls a set-up sequence from the pushing of the start key until the MCB executing the copy layer is driven. Specifically, the module 103 forms job modes using FEATURE (directions given to the M/C in order to reply to the request by a user) that is specified by the SYSUI, and determines a set-up sequence in accordance with the job modes.

Figure 12A:
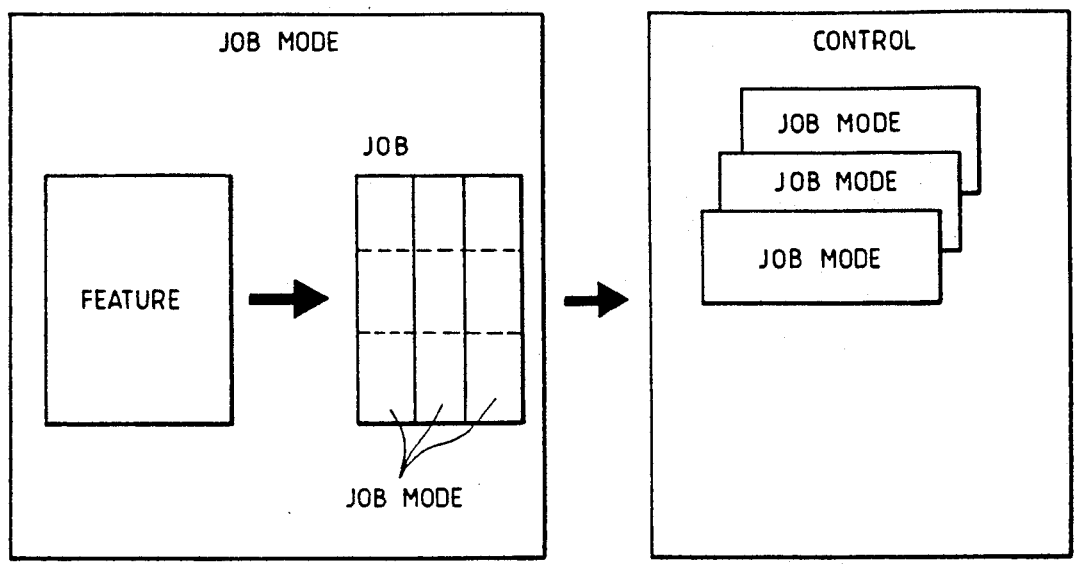
FIGS. 12(a) through 12(c) are explanatory diagrams showing how to prepare a job mode.
Figure 12B:
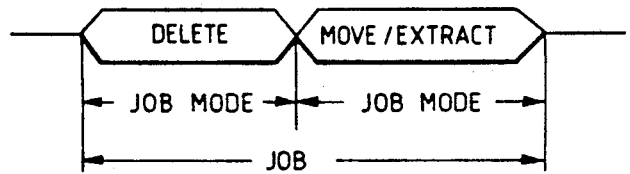
Figure 12C:
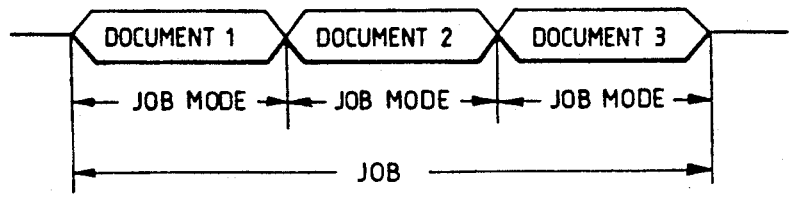

As shown in FIG. 12(a), for forming the job modes, a mode as indicated by the F/F is analyzed and divided into job modes. Here, the job means the M/C operation from the start until the copies are all delivered as requested and operation stops. The job mode is the unit of the smallest job into which the job is allowed to be divided. The job is a collection of the job modes. For example, in the case of an inlay composition, the job modes are a delete and a movement/extraction. These modes constitute a job. In the case of three ADF originals, job modes are feed processings of originals 1, 2 and 3. These job modes are collected into a job.

In an auto mode, a document scan is done. In a coloring-outline-drawing mode, a prescan is done. In a marker edit mode, a prescan is done. In a color detection mode, a sample scan is done (a maximum of three prescans is allowed). A copy mode required for the copy cycle is assigned to the IIT, IPS and MCB. At the end of the set-up sequence, the MCB is driven.

An M/C stand-by control module 102 controls a sequence during the M/C stand-by state. More exactly, it controls reception of the start key and color registration, and enters the diag. mode.

An M/C copy cycle control module 104 controls a copy sequence from the start of the MCB to the stop. Specifically, it provides information of a paper feed count, recognizes the end of a job and requests the start of the IIT. Further, it recognizes the stop of the MCB and requests the stop of the IPS. Additionally, the module 104 sends a through command that is generated during the M/C stop or the M/C operation, to a destination remote.

A fault control module 106 monitors stop parameters from the IIT and IPS. When a stop parameter is generated, the module 106 requests the stop of the MCB. More specifically, the module 106 recognizes a fail command from the IIT or IPS, and stops it. After a stop request is generated by the MCB, the fault control module determines the recovery when the M/C is stopped, and makes the recovery in response to a jamming command from the MCB, for example.

A diag. control module 108 controls in the input check mode and the output check mode that are contained in the diag. mode.

Figure 13:
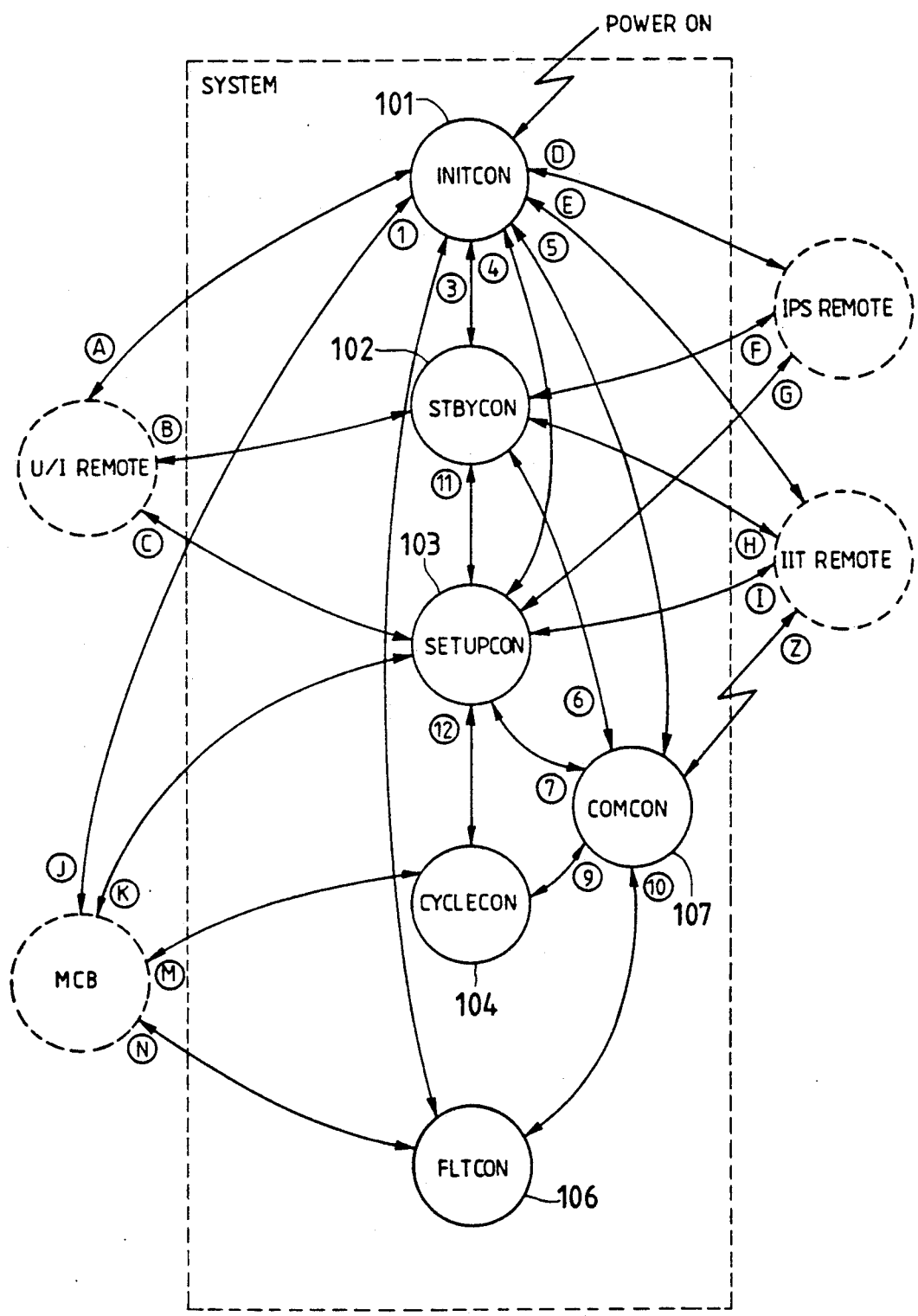
FIG. 13 shows a data flow between the system and the respective remotes.

Data transfer among the modules or between the modules and other subsystems will now be described. FIG. 13 illustrates data flows between the system and the remotes, and data flows among the modules in the system. In the figure, A to N indicate serial communications, Z a hot line, and (1) to (12) data flow among the modules.

In the communication between the SYSUI remote and the initialize control module 101, the SYSUI sends a token command indicative of transfer of the control right for the CRT, to the SYSTEM node. The initialize control module sends a config. command to it.

In the communication between the SYSUI remote and the stand-by control module 102, the SYSUI remote sends to the stand-by control module a mode change command, start copy command, job cancel command, color registration request command, and tray command. The stand-by control module 102 sends to the SYSUI remote an M/C status command, tray status command, toner status command, toner collection bottle command, color registration ans. command, and token command.

In the communication between the SYSUI remote and the set-up control module 103, the set-up control module 103 sends an M/C status command (progress) and APMS status command. The SYSUI remote sends a stop request command and an interrupt command.

In the communication between the IPS remote and the initialize control module 101, the IPS remote sends an initialize command to the control module 101. The control module 101 sends an NVM parameter command to the IPS remote.

In the communication between the IIT remote and the initialize control module 101, the IIT remote sends an IIT ready command to the module 101. The module 101 sends an NVM parameter command and an initialize command to the IIT remote.

In the communication between the IPS remote and the stand-by control module 102, the commands sent by the IPS remote to the control module 102 are an initialize free hand area command, answer command, remove area answer command, and color data command. The commands sent by the module 102 to the IPS remote are a color detect point command, initialize free hand area command, and a remove area command.

In the communication between the IPS remote and the set-up control module 103, the commands sent by the IPS remote to the control module 103 are an IPS ready command and a document information command. The commands sent by the set-up control module 103 to the IPS module are a scan information command, basic copy mode command, edit mode command, and an M/C stop command.

In the communication between the IIT remote and the stand-by control module 102, the IIT remote sends an IIT ready command indicative of the prescan end to the control module 102. The control module 102 sends to the IIT remote a sample scan start command and an initialize command.

In the communication between the IIT remote and the set-up control module 103, the IIT sends an IIT ready command and an initialize end command to the control module 103. The control module 103 sends a document scan start command, sample scan command, and copy scan start command to the IIT remote.

In the communication between the MBC remote and the stand-by control module 102, the stand-by control module 102 sends an initialize subsystem command and a stand-by selection command to the MBC remote. The MBC remote sends a subsystem status command to the stand-by control module.

In the communication between the MBC remote and the set-up control module 103, the module 103 sends a start job command, IIT ready command, stop job command, and declare system fault command to the MBC remote. The MBC remote sends an IOT stand-by command and a declare MCB fault command to the module.

In the communication between the MBC remote and the cycle control module 104, the module 104 sends a stop job command to the MBC remote. The MBC remote sends a made command, ready for next job command, job delivered command, and IOT stand-by command to the control module.

In the communication between the MBC remote and the fault control module 106, the control module 106 sends a declare system fault command and a system down end command to the MBC remote. The MBC remote sends a declare MCB fault command and a system shutdown command to the control module 106.

In the communication between the IIT remote and the communication control module 107, the IIT remote sends a scan ready signal and an image area signal to the control module 107.

The interfaces among the respective modules will be described below. The system main 100 sends reception remote numbers and reception data to the respective modules (101 to 107). Upon receipt of them, each module transfers data to and from its remote. On the other hand, the respective modules sends nothing to the system main 100.

The initialize control module 101, when completing the initialize processing, sends a system state (stand-by) to the fault control module 106 and the stand-by control module 102. The communication control module 107 sends communication yes/no data to the initialize control module 101, stand-by control module 102, set-up control module 103, copy cycle control module 104, copy cycle control module 104, and fault control module 106.

The stand-by control module 102 sends a system state (progress) to the set-up control module 103, when the start key is depressed.

The set-up control section 103, when the set-up is completed, sends a system state (cycle) to copy cycle control module 104.

Figure 14:
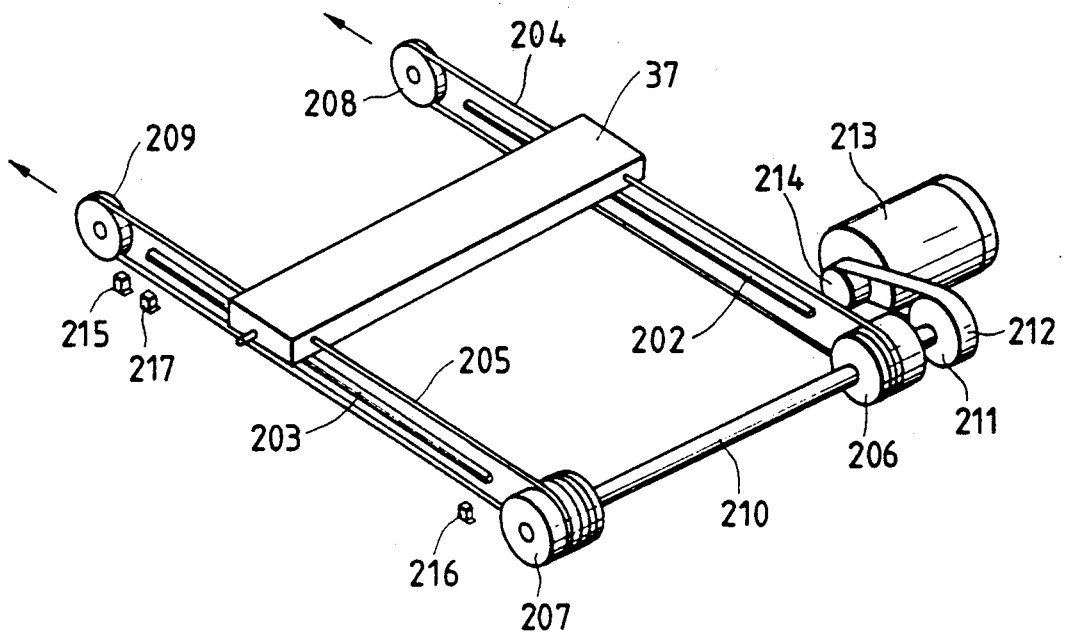
FIG. 14 is a perspective view showing an original scanning mechanism.

FIG. 14 showing a document scanning mechanism used in the color copying machine according to the preferred embodiment of the present invention. The imaging unit 37 is removably placed on a pair of slide shafts 202 and 203, and is fixed at both ends to wires 204 and 205. These wires 204 and 205 are wound around drive pulleys 206 and 207 and tension pulleys 208 and 209, respectively. The tension pulleys 208 and 209 are pulled in the direction of the arrows. The paired drive pulleys 206 and 207, and a reduction pulley 211 are mounted to a drive shaft 210, as shown. Limit switches 215 and 216 are sensors for sensing both ends of the imaging unit 37 when it is moved. A registration sensor 217 senses a document read start position.

To make a color copy, the IIT must repeat the scan four times. It is a significant matter how to reduce an out-of-synchronization state of the scan and a displacement from the document read start position. To reduce the out of-synchronization and the displacement, it is needed to minimize fluctuation of the stop position of the imaging unit 37, fluctuation of the time taken for the imaging unit to travel from the home position to the registration position, and fluctuation of the scan speed. To this end, a stepping motor 213 is used. The stepping motor 213 suffers from a higher vibration and is more noisy, when compared with the servo motor. Many countermeasures have been taken to realize high picture quality and high speed.

The stepping motor 213 is arranged such that a motor winding is wired in a pentagon fashion, its connection points are connected through pairs of transistors to the positive and the negative terminals of a power supply, and the motor is driven in a bipolar mode using ten transistors. The motor current is fed back to smooth a current variation and hence to hold back vibrations and noise.

Figure 15A:
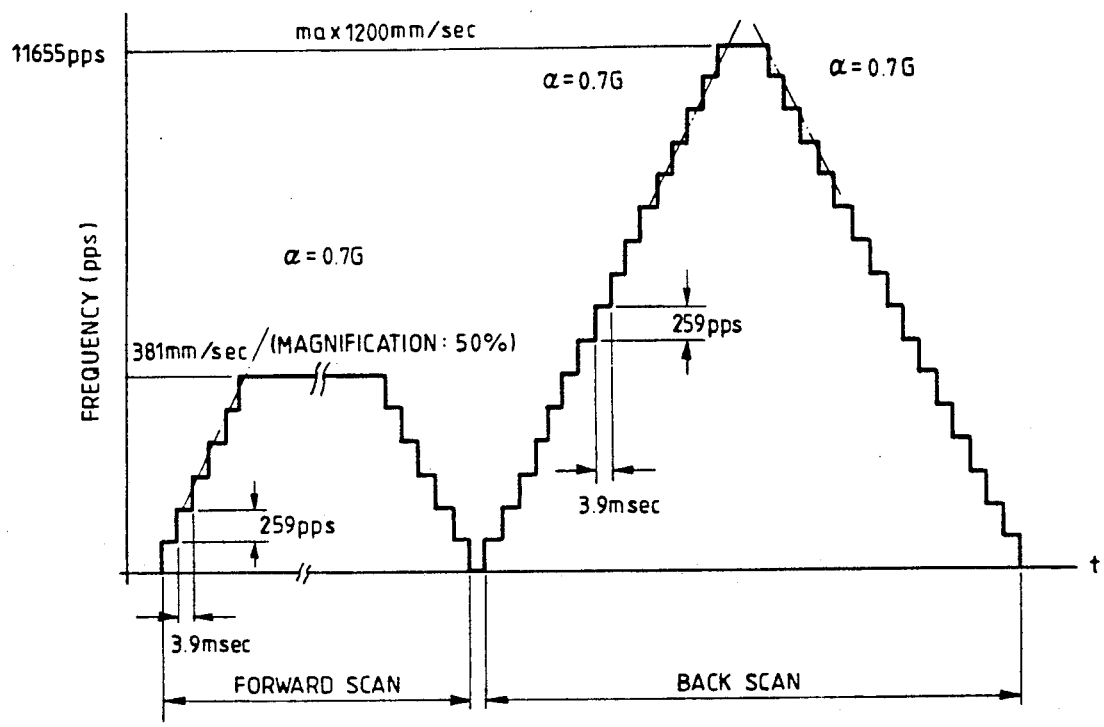

FIG. 15(a) shows a scan cycle of the imaging unit 37 driven by the stepping motor 213. More specifically, the figure also shows a relationship between the speed of the imaging unit 37, viz., the frequency of a signal applied to the stepping motor and time, when the imaging unit executes a forward scan and a back scan at the 50% magnification, or the maximum speed. In an acceleration mode, as shown in FIG. 15(b), the frequency is increased up to approximately 11 to 12 kHz in steps of 259 Hz.

Figure 15B:
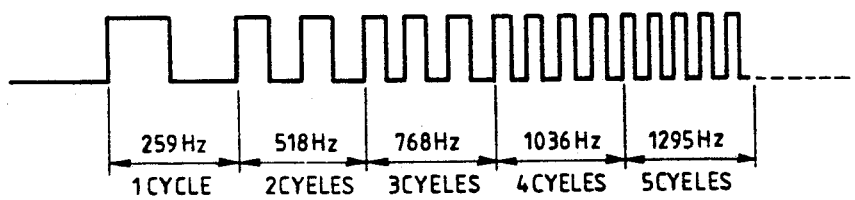

A trapezoidal speed variation profile of is formed by increasing the signal frequency at the rate of 259 pps/3.9 ms (FIG. 15(b)). A rest period is provided between the forward scan and the back scan. During this rest period, vibration in the IIT mechanism system settles down, and the synchronization of the imaging unit operation with image outputting in the IOT is secured. An acceleration of 0.7 G, which is higher than that of the conventional copier, reduces a scan cycle time.

As already mentioned, in the color document reading, it matters how to reduce the displacement from the home position during the four scans, consequently how to reduce a color displacement or an image distortion. FIGS. 15(c) to 15(e) explain the causes of the color displacement. FIG. 15(c) shows a fact that the imaging unit after scanning returns and comes to a standstill at a position different from the home position. Accordingly, in the next scan, the time taken for the imaging unit to reach the registration position is different from that in the previous scan, resulting in a color displacement.

In the case of FIG. 15(d), with a transient vibration of the stepping motor (speed fluctuation until the motor speed settles down at a steady speed) during the 4-scan period, the time taken for the imaging unit to reach the registration position becomes different from a predetermined time, and consequently causes color displacement. FIG. 15(e) shows different variations of the constant speed scan characteristic of the imaging unit between the registration position and the tail edge when the imaging unit is moved for scanning four times. As seen, the speed of the imaging unit of the first scan varies more than that of the imaging unit of the second to fourth scans. For this reason, the instant color copier is designed so that the toner color Y for which displacement is indistinctive is developed for the first scan. Other causes for color displacement include aging of the timing belt 212 and wires 204 and 205, and mechanical factors such as viscosity drag existing between the slide pad and the slide rails 202 and 203.

The IIT remote has many functions, such as sequence control for various copy operations, service support, self check, and fail safe. The sequence control of the IIT generally consists of a scan, sample scan, and initialize controls. Various commands and parameters for controlling the IIT come from the SYS remote 71 through the serial communication network.

Figure 16A:
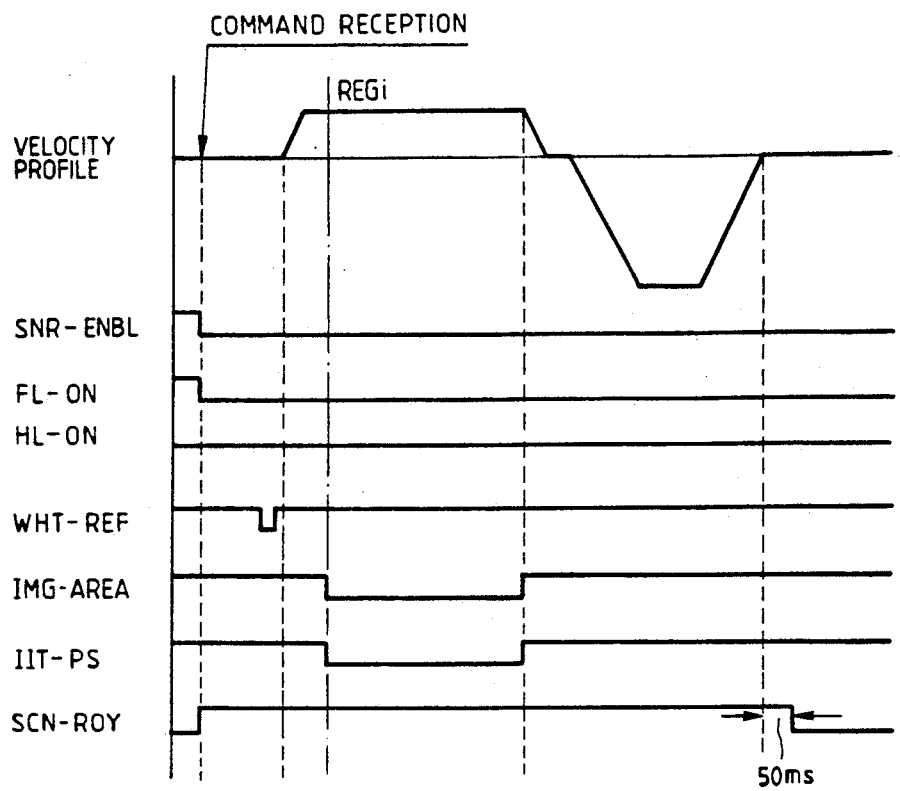
FIGS. 16(a) through 16(c) are timing charts for explaining an IIT control system.

FIG. 16(a) shows a timing chart of a normal scan operation. The scan length data is determined depending on paper length and magnification, and is exactly 0 to 432 mm (with the steps of 1 mm). The scan speed depends on the magnification (50% to 400%). The prescan length data (distance between the stop position and the registration position) also depends on the magnification (50% to 400%). When receiving a scan command, the IIT remote produces an FL-ON signal to light on a fluorescent lamp. The same turns on a motor driver by a SCN-RDY signal. After a preset time, it produces a shading correction pulse WHT-REF to cause the imaging unit to start the scanning operation. When the imaging unit passes the registration sensor, an image area signal IMG-AREA goes low and its low level state lasts during a period corresponding to the scan length. In synchronism with this, the IIT-PS signal is outputted to the IPS.

Figure 16B:
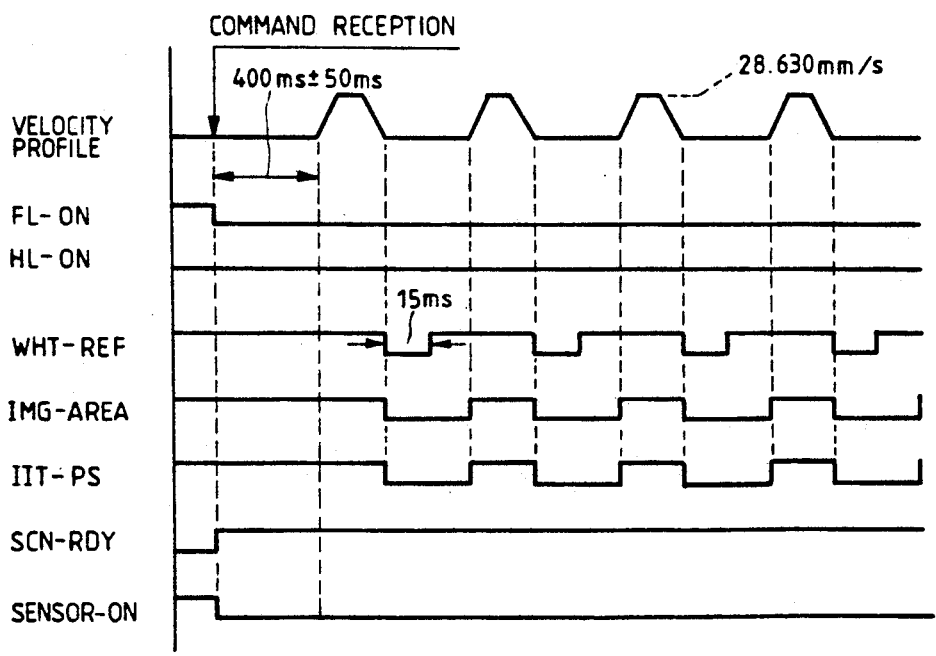

FIG. 16(b) shows a timing chart of the sample scan operation. The sample scan is used for color detection at the time of color change, color balance correction when the F/P is used, and shading correction. In the sample scan, the imaging unit is moved to a preset sample position and temporarily stops, on the basis of the data of stop position from the registration position, moving speed, the number of fine motions, and step intervals.

Figure 16C:
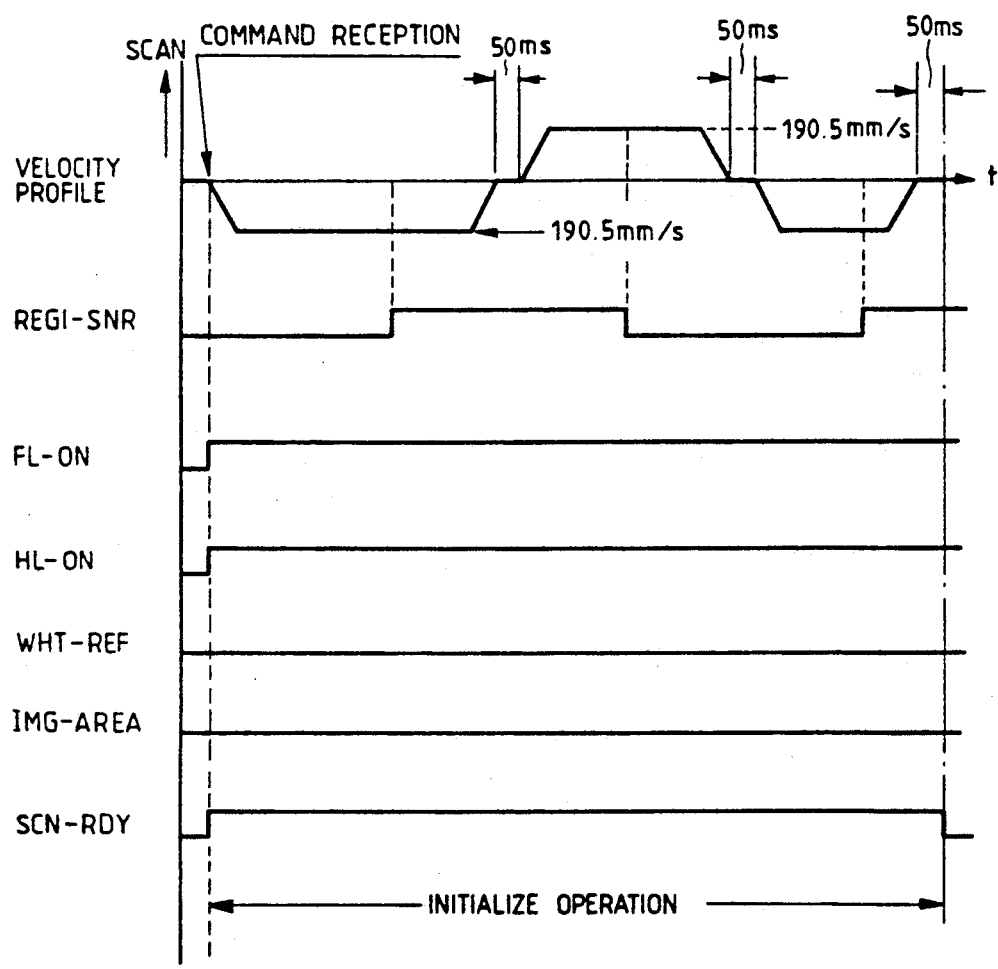

FIG. 16c illustrates the timing charts for initialization. when power is turned on, the IIT receives a command from the SYS remote to confirm regi-sensor, operation of the imaging unit by means of the regi-sensor, and to correct the home position of the imaging unit by means of the regi-sensor.

Figure 17:
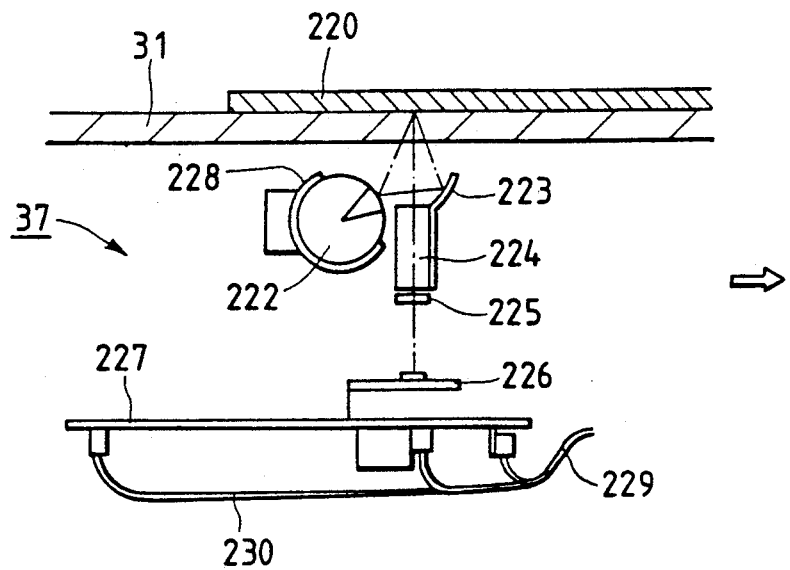
FIG. 17 is a sectional view showing an imaging unit.

FIG. 17 shows a sectional view of the imaging unit 37. An original 220 is set on the platen glass 31, with its image surface facing down. The imaging unit 37 moves under the platen glass in the direction of the arrow. Throughout the movement of the imaging unit, the image surface of the original placed on the platen glass is illuminated with the combination of the daylight fluorescent lamp 222 of 30 W and a reflecting mirror 223. The light reflected from the original 220 passes through a selfoc lens 224 and a cyan filter 225 and forms a normal equal-size image on the light receiving surface of a CCD sensor array 226. The selfoc lens 224 is a compound eye lens consisting of four rows of fiber lens. This lens is bright and has high resolution. This lens is advantageous in that power consumption of the light source is reduced and the imaging unit may be made compact. The imaging unit 37 is provided with a circuit board 227 containing a CCD line sensor drive circuit, CCD line sensor output buffer circuit, and the like. A lamp heater 228 is provided as a flexible cable 229 for the illumination power source 230.

Figure 18A:
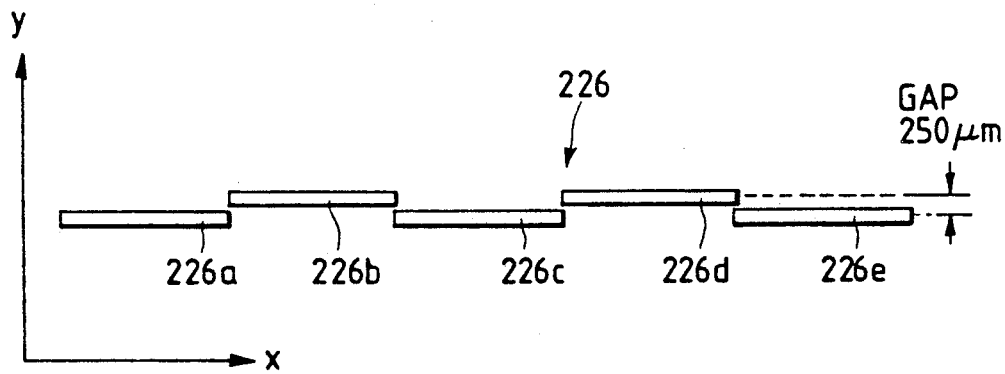
FIGS. 18(a) and 18(b) show layouts of CCD line sensors.
Figure 18B:
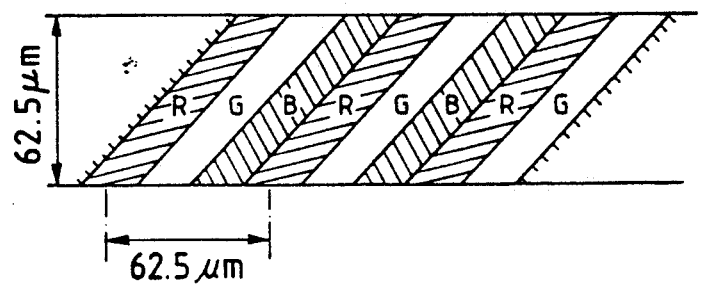

As shown in FIG. 18(a), five CCD line sensors 226a to 226e are laid out in zig-zag fashion in the main scan direction. The reason a zig-zag layout of CCD sensors is used is that when a single CCD line sensor is used, it is difficult to array a number of photo sensor elements without any drop of element and to obtain a uniform sensitivity. When a plurality of CCD line sensors are arrayed in a line, it is difficult to form pixels in the CCD line sensor up to both end portions and light insensitive portions are present in the CCD sensor.

As shown in FIG. 15(b), in the sensor portion of the CCD line sensor array 226, trios of color filters R, G, and B comprise pixels repeatedly laid out in this order, and the adjacent three bits form one pixel at the time of reading. When a read pixel density of each color is 16 dots/mm and the number of pixels of each chip is 2928, the length of one chip is: $2928/(16 \times 3) = 61$ mm and hence the total length of five chips is $61 \times 5 = 305$ mm. Accordingly, a CCD line sensor of the equal size type capable of reading an original of A3 size can be obtained. The respective pixels of R, G, and B are slanted by 45°, to reduce moire.

When a plurality of CCD line sensors 226a to 226e are disposed in a zig-zag fashion as in the above case, the adjacent CCD line sensors scan different portions on the original surface. When the original is scanned by moving the CCD line sensors in the vertical scan direction Y orthogonal to the main scan direction X, there is a time lag between the signals derived from the CCD line sensors 226b and 226d of the first row that precedingly scan the original and the signals derived from the CCD line sensors 226a, 226c and 226e of the second row that succeedingly scan the original. The time lag corresponds to a difference between the positions where the CCD line sensors of the first and second rows are located.

To obtain a continuous signal of one line from the image signals dividedly read by the plurality of CCD line sensors, the signals from the first row CCD line sensors 226b and 226d that precedingly scan the original are stored, and the stored signals must be read out in synchronism with the outputting of the signals from the second row CCD line sensors 226a, 226c and 226e that scan the original succeeding to the first CCD row line sensors. In this case, if the position difference is 250 um and the resolution is 16 dots/mm, a delay of 4 lines is needed.

In the image reader, the reduction/enlargement is carried out in such a manner that increase and decrease processing, and other processing by the IPS are used for reduction/enlargement in the main scan direction, and the increase or decrease of the moving speed of the imaging unit 37 is used for the reduction/enlargement in the vertical scan direction. Accordingly, the resolution in the vertical scan direction is changed by changing the moving speed of the imaging unit 37, while the reading speed (the number of read lines per unit time) of the image reader is fixed. If the resolution is 16 dots/mm at 100% magnification, the magnification percentage, speed, resolution and the number of zig-zag correction lines are as shown in the following table.

| Magnification (%) | Speed (times) | Resolution (dots/mm) | No. of zig-zag correction lines |
|---|---|---|---|
| 50 | 2 | 8 | 2 |

-continued

| Magnification (%) | Speed (times) | Resolution (dots/mm) | No. of zig-zag correction lines |
|---|---|---|---|
| 100 | 1 | 16 | 4 |
| 200 | ½ | 32 | 8 |
| 400 | ¼ | 64 | 16 |

As seen from the above table, as the magnification percentage increases, the resolution increases, and hence the number of necessary line memories for correcting a difference of 250 um in the zig-zag layout of the CCD line sensors is also increased.

Figure 19:
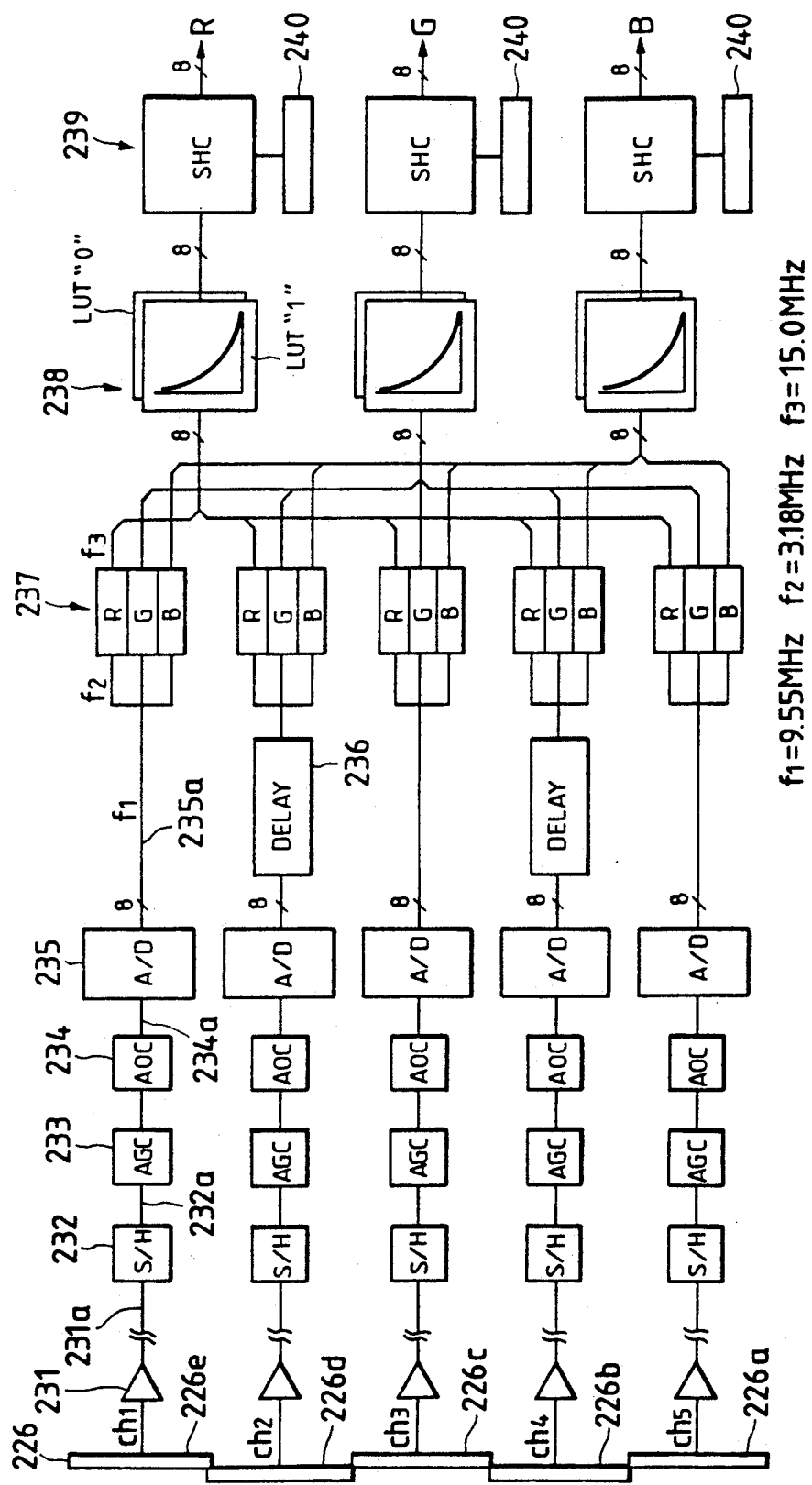
FIG. 19 is a block diagram showing a video signal processing circuit.

The description to be given below with reference to FIG. 19 is an elaboration on a video signal processing circuit for reading a color original for each trio of colors R, G, and B in terms of reflectivity signals by using the CCD line sensor array 226 when the reflectivity signal is converted into a digital signal as a density signal.

An image of an original is read by using the CCD line sensor array 226 consisting of five CCD line sensors in the imaging unit 37. In the image reading, the CCD line sensor array divides the original image into five portions and reads these portions through five channels. Further, in reading the segmented image, the image light reflected from the image is separated into trios of colors R, G, and B. The color signals (in a channel typically used for ease of explanation) are amplified to a predetermined level by a amplifier 231. The amplified color signals are transmitted to the circuit of the base machine through a transmission cable connecting the imaging unit to the base machine (FIG. 20, 231a).

Figure 20:
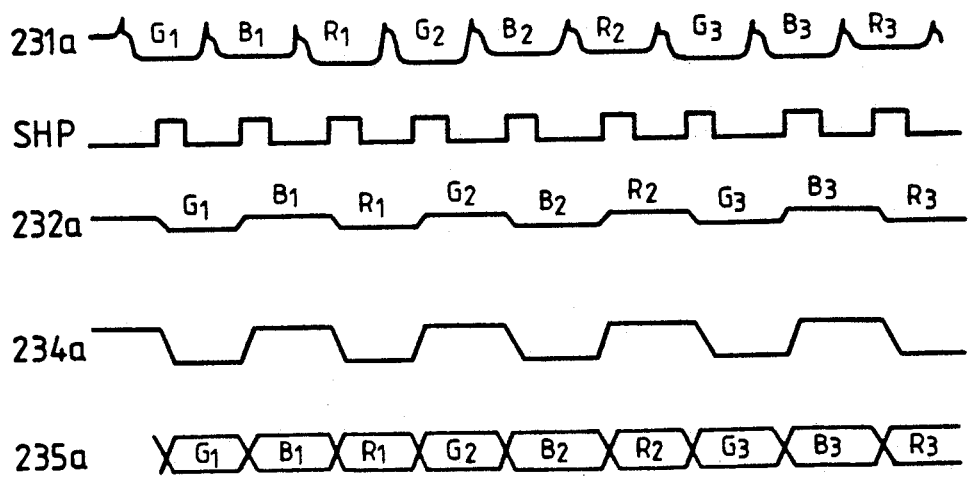
FIG. 20 is a timing chart useful in explaining the operation of the video signal processing circuit.

In the base machine, a sample/hold circuit SH232, by use of a sample hold pulse SHP, removes the noise of the color signals and shapes the signals (FIG. 20, 232a). The photoelectric converting characteristic of the CCD line sensor differs for each pixel and each chip. Accordingly, when an original with a uniform density is read by the CCD line sensor, the output signals of the line sensor are not uniform. If these signals are image processed, stripes and irregularities appear in an image formed by the thus image processed signals. Therefore, correction processing must be applied to the signals derived from the CCD line sensor array.

An automatic gain control (AGC) circuit 233 controls the gain for the sensor output signals. This control is called a white level adjustment. This circuit is used for reducing an error in the A/D conversion in a circuit for amplifying the output signals of each sensor and applying them through an AOC (automatic affect control circuit) 234 to an A/D converter 235. To this end, reference data is collected by each sensor, is digitized, and is stored into a shading RAM 240. The data of one line is compared with preset reference data in the SYS remote 71 (FIG. 3). A digital value providing a given gain is converted into an analog signal, and is applied to the AGC 233. In this way, its gain is changed in 256 steps.

The AOC circuit 234 controls a dark voltage outputted from each sensor. This control is called a black level adjustment. For the adjustment, the fluorescent light is off and the output voltage of each sensor is measured. These output voltages are digitized and stored into the shading RAM 240. The data of one line as read out is compared with a predetermined reference value by the SYS remote (FIG. 3). An offset value is converted into an analog signal, and applied to the AOC 234. In the AOC 234, the offset voltage is controlled in 256 steps. The AOC controls the original density as finally read so that its output density falls within a predetermined value.

The data thus digitized by the A/D converter 235 (FIG. 20, 235a) is generated in the form of a stream of 8 bits of GBRGBR.... A delay circuit 236 is a memory of the FIFO type capable of storing the data of a plurality of lines. The delay circuit 236 stores the data signals derived from the preceding scan, 1st row CCD line sensors 226b and 226d, and outputs the data in synchronism with the outputting of the data signals from the succeeding scan, 2nd row CCD line sensors 226a, 226c and 226e.

A separate/compose circuit 237 separates the R, G, and B data for each CCD line sensor, and composes these items of data into serial data for each color, R, G, and B and for each line. A converter 238, e.g., a ROM, stores a logarithm converting table LUT "1". In the table, the received digital data is used as addresses to access the table stored in the ROM. The table converts the R, G, and B reflectivity data into density data.

A shading correction circuit 239 will be described. The shading stems from variances of the light distribution characteristics of the light source, reduced light amount at the end portion of the fluorescent light when it is used as a light source, sensitivity variances of pixels of the line sensor, smear on the reflecting mirror, and the like.

To correct for the shading, at the start of the shading correction, the light reflected from a white plate, that is to be used as reference density data for shading correction, is applied to the CCD line sensor. The output signal from the line sensor is subjected to A/D conversion and logarithm conversion in the signal processing circuit. The reference density data log ($R_i$) thus obtained is stored into the line memory 240. Then, the reference density data log ($R_i$) is subtracted from the image data log ($D_i$) read from the original through the scanning operation. That is, $$\log(D_i) - \log(R_i) = \log(D_i/R_i).$$

In this way, logarithmic values of the pixel data are obtained which are shading corrected. With the above approach wherein the shading correction follows the logarithm conversion, satisfactory logic operation can be realized by using an ordinary full adder IC, instead of intricate, large scale, hard logic dividers used in conventional converters.

Figure 21:
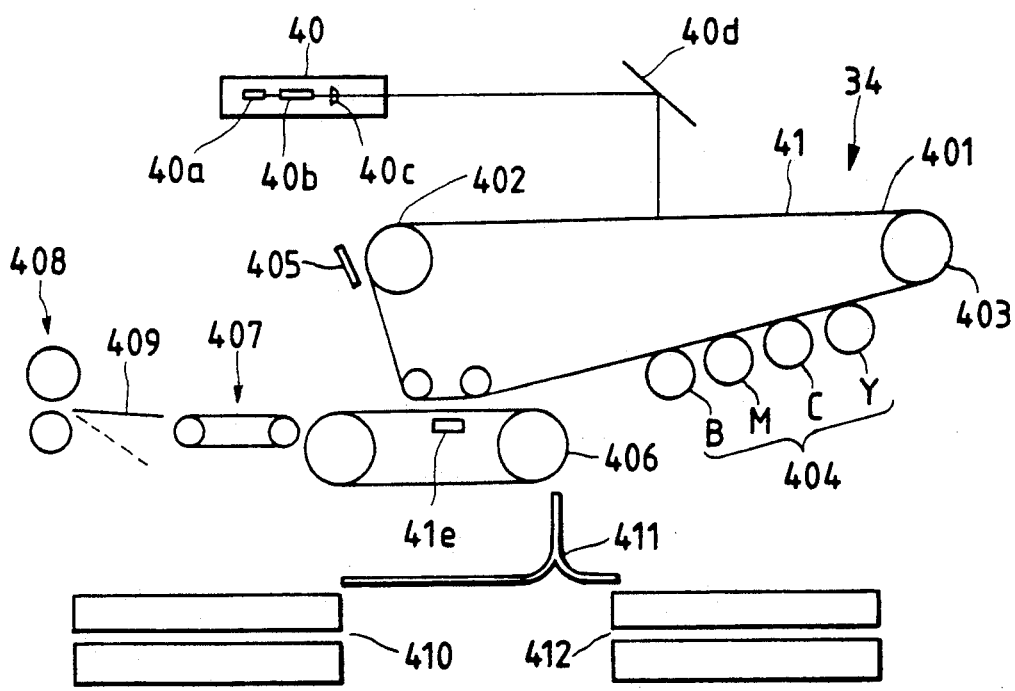
FIG. 21 is an explanatory diagram schematically showing the structure of the IOT.

An outline of the image output terminal (IOT) is shown in FIG. 21. The IOT uses a photoreceptor belt as a photo sensitive member. The IOT is provided with a developing unit 34 comprising a group 404 of four developing devices for full color development, i.e., black (K), magenta (M), cyan (C) and yellow (Y), a tow roll transfer loop 406 for transferring paper to the transfer unit, a vacuum transfer 407 for transferring paper from the tow roll transfer loop 404 to a fuser 408, paper trays 410 and 412, and a paper transfer path 411. The three units of the photoreceptor belt, developing unit 412, and paper transfer path 411 can be pulled out of the front side of the IOT.

The data light obtained by modulating a laser beam from a laser source 40 is guided by a mirror 40d onto the surface of the photoreceptor belt 41 to form a latent image thereon. The latent image formed on the surface of the tow roll transfer loop or turtle 41 is developed into a toner image by the developing unit 404. The developing unit 404 consists of four developing devices of B, M, C, and Y which are disposed as shown. The layout of the developing devices allows a relationship between dark attenuation and the characteristics of the respective toners, difference in the results of mixing of the respective color toners with the black toner, and the like. In the case of the full color copy, these developing devices are driven in the order of B→C→M→K.

Papers fed from the two-stage elevator tray 410 and another tray 412 are supplied through the transfer oath 411 to the transfer tow roll transfer loop 406. The loop 406 is disposed in the location of the transfer unit 34, and is made up of a pair of rolls rotatably coupled by a timing chain or a timing belt, and a gripper bar to be described later. The paper is gripped and transferred by using the gripper bar, and the toner image on the surface of the photo receptor belt is transferred onto the paper. In the case of full color, the paper is turned four times by the tow roll transfer belt, during the four turns, the toner images of B, C, M, and K are successively transferred onto the paper in this order. After the image transfer, the paper is released from the gripper bar, and transferred to the vacuum transfer 407, and fed to the fuser 408. The toner image on the paper is fused by the fuser and delivered outside the base machine.

The vacuum transfer 407 absorbs the difference of the speeds of the transfer loop 406 and the fuser 408, and thereby synchronizes their operation. In this instance, the transfer speed (process speed) is 190 mm/sec. In the case of full color copy, the fusing speed is 90 mm/sec. Thus, the transfer speed is different from the fusing speed. To secure the fusing speed, the process speed is reduced. Since the 1.5 kVA power must be secured, the power cannot be distributed to the fuser. To cope with this, when small size paper such as B5 and A4 is used, at the instant that the image transferred paper is released from the transfer loop 406 and rides on the vacuum transfer 407, the speed of the vacuum transfer 407 is decreased from 190 mm/sec to 90 mm/sec to make it equal to the fusing speed.

The instant copier is designed to be compact by making the distance between the transfer loop and the fuser as short as possible. The A3 paper is in excess of the distance of the transfer point and the fuser. If the speed of the vacuum transfer is decreased, there inevitably occurs a situation that the leading end of the paper reaches the fuser, but the trailing portion of the paper is under image transfer process. In such a situation, the paper has commonly been braked and consequently color displacement possibly occurs. To solve this problem, a baffle plate 409 is provided between the fuser and the vacuum transfer. When the A3 paper arrives, the baffle plate is turned down to curve the A3 paper along the plate, to effectively elongate the path between the fuser and the vacuum transfer. Accordingly, the vacuum transfer is operable at the same speed as the transfer speed of the turtle 406. With such an arrangement, after the image transfer is ended, the leading end of the paper reaches the fuser. In other words, the speed difference between the turtle and the fuser is absorbed and both are operable synchronously. The above approach for A3 paper is correspondingly applied to the OHP, because it has poor thermal conduction.

The instant copier is designed such that a black copy as well as a full color copy can be made at high efficiency. In the case of the black copy, the toner layer is thin and hence it can be fused by less heat. Accordingly, the fusing speed is 190 mm/sec and in not reduced in the vacuum transfer. The same thing is applied to a single color copy because the single color copy has a single toner layer. After the transfer process is completed, the toner remaining on the surface of the photo receptor belt is wiped off by a cleaner 405.

Figure 22A:
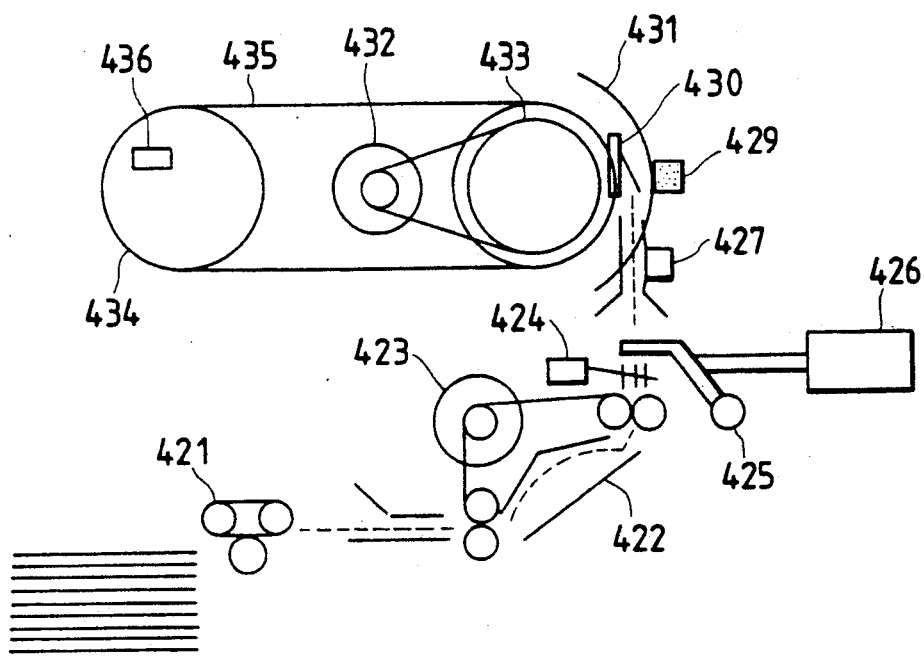
FIGS. 22(a) and 22(b) are explanatory diagrams showing the structure of a transfer unit.

The tow roll transfer loop 406 is configured as shown in FIG. 22(a). The use of the tow roll transfer loop 406 means that no mechanical paper support member is used to eliminate color irregularity, and the transfer speed can be increased through speed control. Papers are picked up from a tray sheet by sheet by a feed head 421 and are transported through a buckle chamber 422 and a registration gate 425 that is controlled by a registration gate solenoid 426, to the transfer loop. Arrival of the paper at the regi. gate is detected by a pre-registration gate sensor 424.

The transfer loop is driven counterclockwise by rotating a roller 433 by a servo motor 432 through a timing belt. No particular drive is applied to another roller 434. A timing chain or belt is wound around the paired rollers. A grip bar or gripper 430 is provided between the chains (in the direction orthogonal to the paper transfer direction). The gripper 430 is opened at the entrance of the transfer loop with the aid of a solenoid. The gripper 430 grips and pulls the paper for transfer at the entrance to the transfer loop. Conventionally, an aluminum or steel support covered with a mylar sheet or mesh supports the paper. When it is heated, the difference of thermal expansion with respect to the support makes the support surface irregular. The poor flatness on the support causes nonuniform transfer efficiency over the support surface, and consequently color irregularity. The use of the gripper 430 eliminates the need for the paper support, and hence the color irregularity.

The transfer loop is not provided with a support for the transferred paper, and the paper is released by centrifugal force. To hold the paper against the centrifugal force, the paired rollers are designed to draw a vacuum and attract the paper. Therefore, after passing the roller, the paper may flutter. At the transfer point, the paper is electrostatically attracted toward the photo receptor belt near a detach corotron and a transfer corotron, and the toner image on the photo receptor surface is transferred onto the paper. After the image transfer, at the exit of the transfer loop, the present position of the gripper 430 is detected by a gripper home sensor 436. At a proper timing, the gripper 430 is opened by a solenoid to release the paper and transfer it to the vacuum transfer 413.

In the case of the full color copy, the paper is turned around the transfer loop four times, for the color image transfer purposes. In the case of the three-pass color copy, it is turned three times.

Figure 22B:
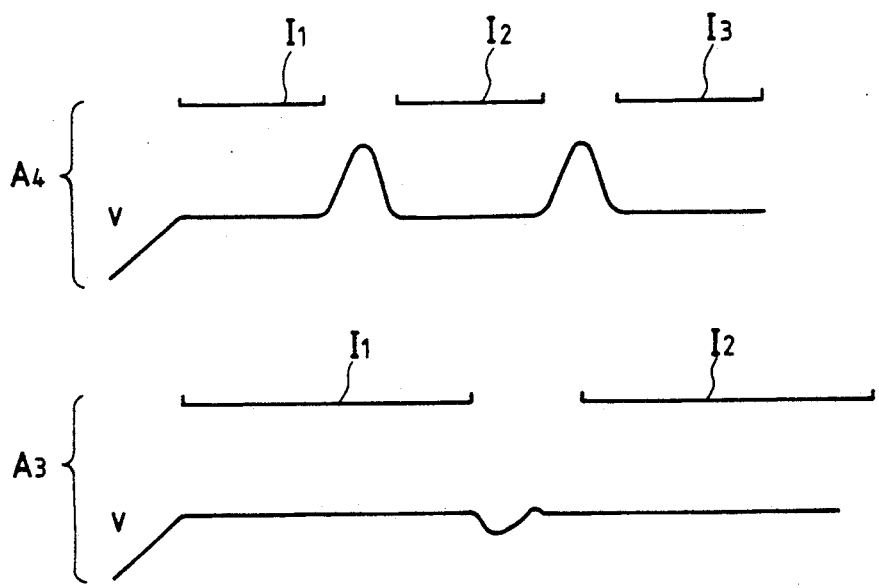

The timing control of the servo motor 432 will be described with reference to FIG. 22(b). The control of the transfer loop is such that, during image transfer, the servo motor 432 is driven at a constant speed, and after the transfer process ends, the leading edge transferred onto the paper is coincident with the transfer point of the next latent image. The length of the photo receptor belt 41 is equal to a length required for three latent images to be formed for A4 paper, and two latent images to be formed for A3 paper. The length of the belt 435 is slightly longer than the length of the A3 paper, more exactly approximately 4/3 times the length of the A3 paper.

To make a color copy of A4 size, when a latent image I1 of the first color is transferred to the paper, the servo motor 432 is driven at a constant speed. After the transfer ends, the servo motor is rapidly accelerated so that the lead edge transferred onto the paper coincides with the leading edge of a latent image I2 of the second color. To make a color copy of A3 size, after the transfer of the first color latent image I1 ends, the servo motor is decelerated and waits until the lead edge transferred onto the paper coincides with the leading edge of a latent image I2 of the second color.

Figure 23A:
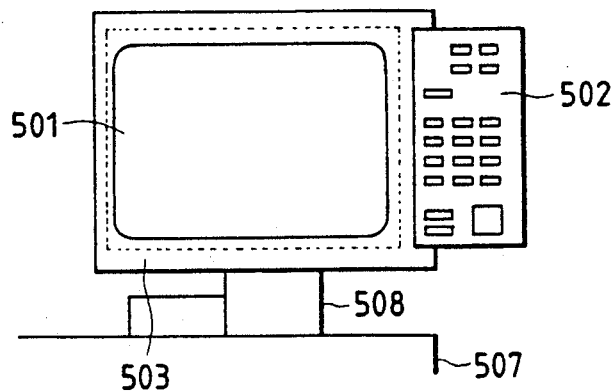
FIGS. 23(a) to 23(c) are diagrams showing an example of mounting an UI using a display.
Figure 23B:
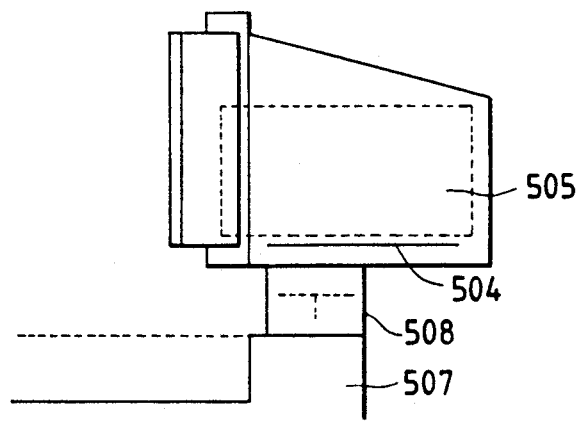
Figure 23C:
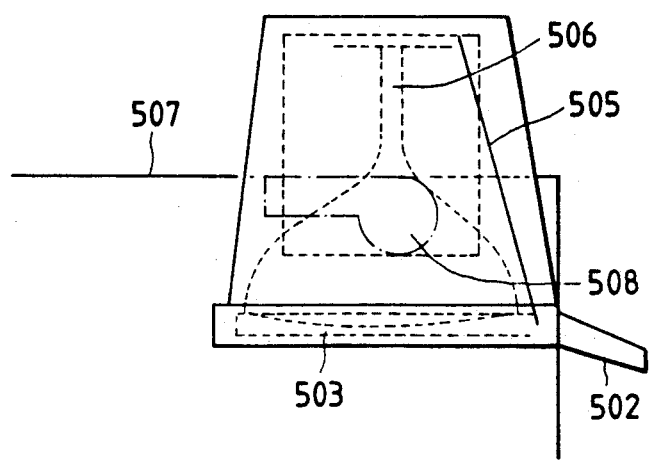
Figure 24A:
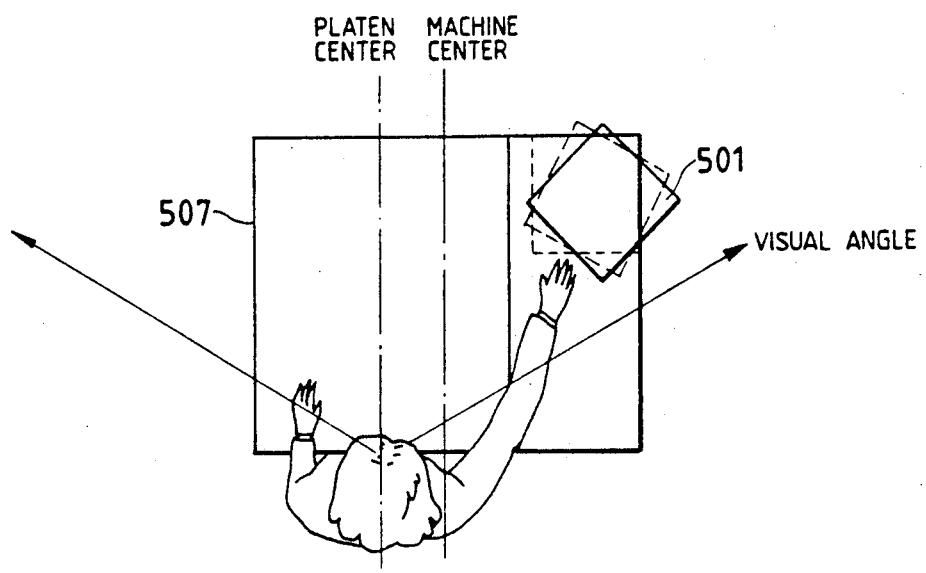
FIGS. 24(a) and (b) are diagrams showing an angle and height of the UI.
Figure 24B:
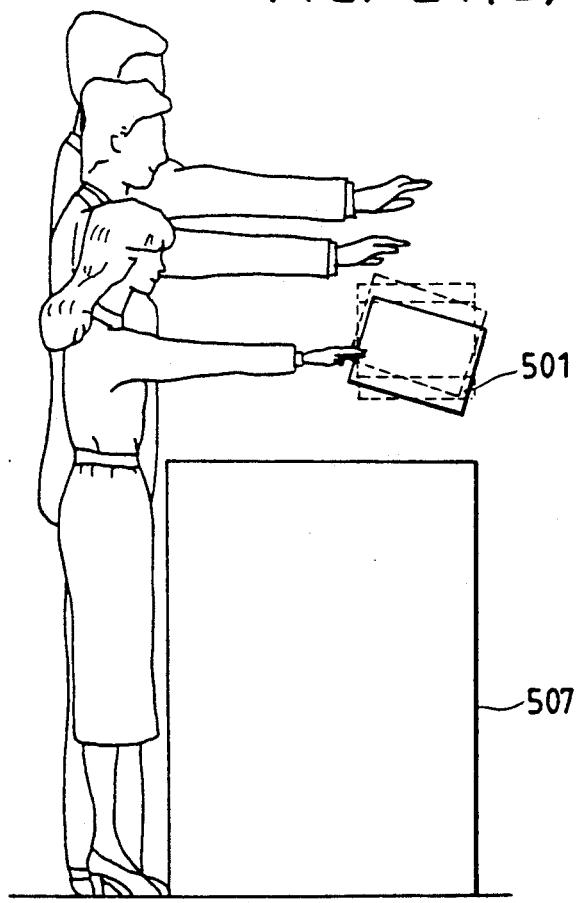

FIG. 23(a), 23(b), and 23(c) show how a user interface (UI) using a display device is mounted and FIGS. 24(a) and 24(b) illustrate the angle and height of the user interface mounted to the base machine.

The user interface is a man-machine interface. It must be operable in a simple manner, and distinctively and impressively present necessary information to an operator. The user interface according to the present invention is user friendly and intelligible to beginners, and simple to use for experienced operators. The main interface allows a user to directly select desired functions, and exactly and quickly provides necessary information to operators by using colors, icons, and buttons.

Operability constitutes an important factor in evaluating the user interface. To improve the operability of the user interface, the user interface is provided with a color display or monitor 501 and a hard control panel 502 placed by the monitor, as shown in FIG. 23(a). A creative color display provides legible menus to users. Further, an infrared ray touch board 503 is disposed on the periphery of the color display 501. Use of the touch board allows a user to directly access the machine by soft buttons to be displayed in the display screen of the display 501. Various types of operations are properly assigned to the hard buttons on the hard control panel 502 and the soft buttons in the screen of the display 501 to provide simple operations and effective use of menu displays.

The color display 501 and the hard control panel 502 are provided on the rear side with a monitor control/power supply board 504, a video engine board 505, and a CRT driver board 506, and the like, as shown in FIGS. 23(b) and (c). As shown in FIG. 23(c), the hard control panel 502 is inclined toward the front of the display 501.

It is noted that the color display with the hard control panel 502 is placed atop a support arm 508 standing erect on the base machine 507, viz., not directly placed on the base machine. Since the stand type of the color display 501, not the console panel that is used in the conventional machine, is used, the display may be installed above the base machine 507. Particularly, when it is located at the right back corner, the copier may be designed without having to take the console panel space into account. A compact copier may, therefore, be designed.

The platen or the base machine is waist high, which is best for a user to set an original on the platen table. This height limits the design freedom in selecting the height of the base machine. The conventional console panel is mounted on the top of the base machine. The console is placed substantially at the height of the waist, and access to the console panel by the hands is easy. However, the display and operating sections for selecting the various functions and for setting the conditions to execute the functions are relatively remote from the operator's eyes.

In the case of the user interface of the present invention, the display and operating sections are placed above the platen and more level with the operator's eyes. Such a placement makes it easy to operate the machine and provides additional space to accommodate the control board and option devices including a memory card device, a key counter, and the like. Accordingly, when a memory card device is assembled into the copying machine no structural and outer appearance modifications are required for the base machine.

Figure 25:
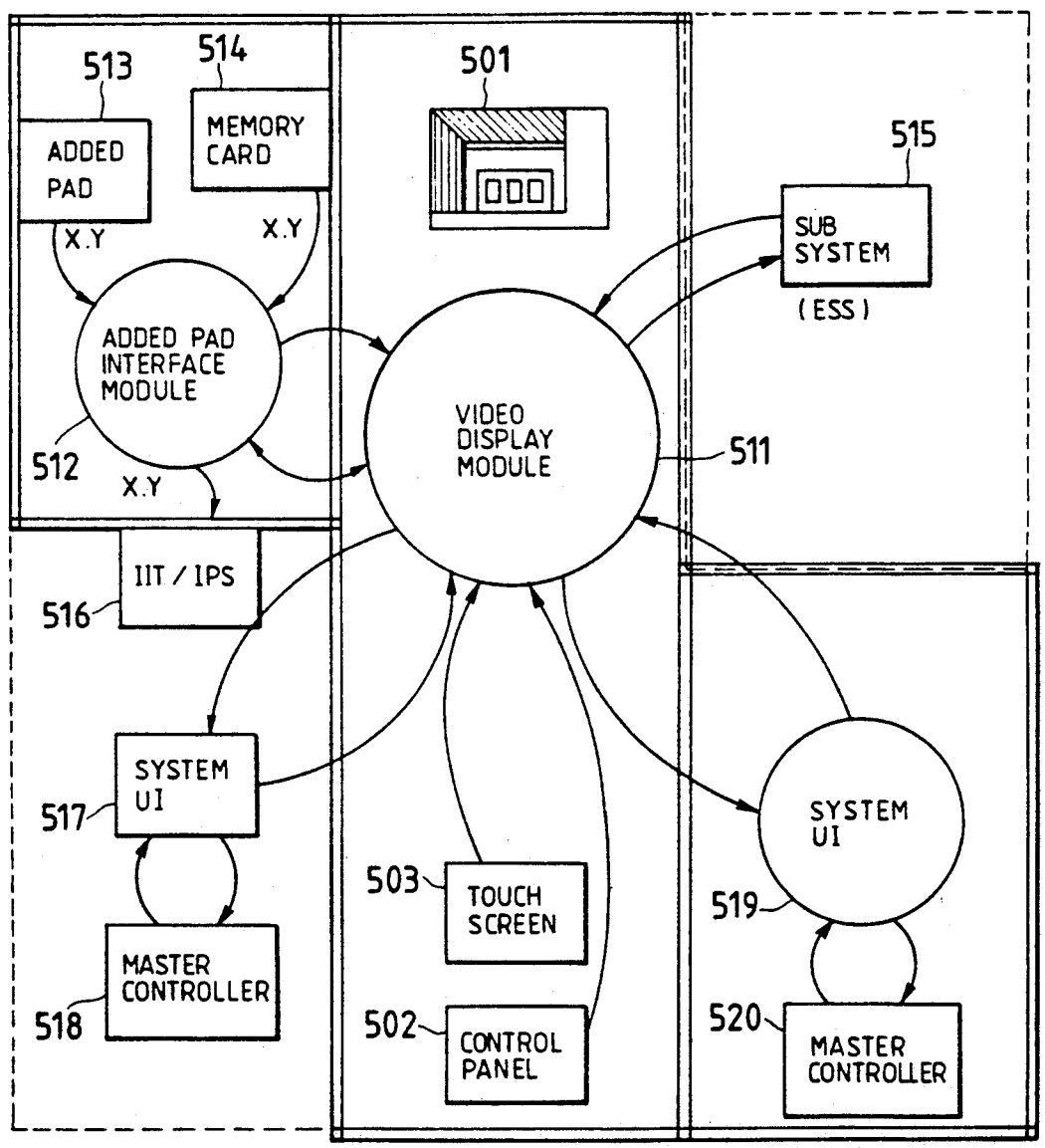
FIG. 25 shows a module configuration of the UI.
Figure 26:
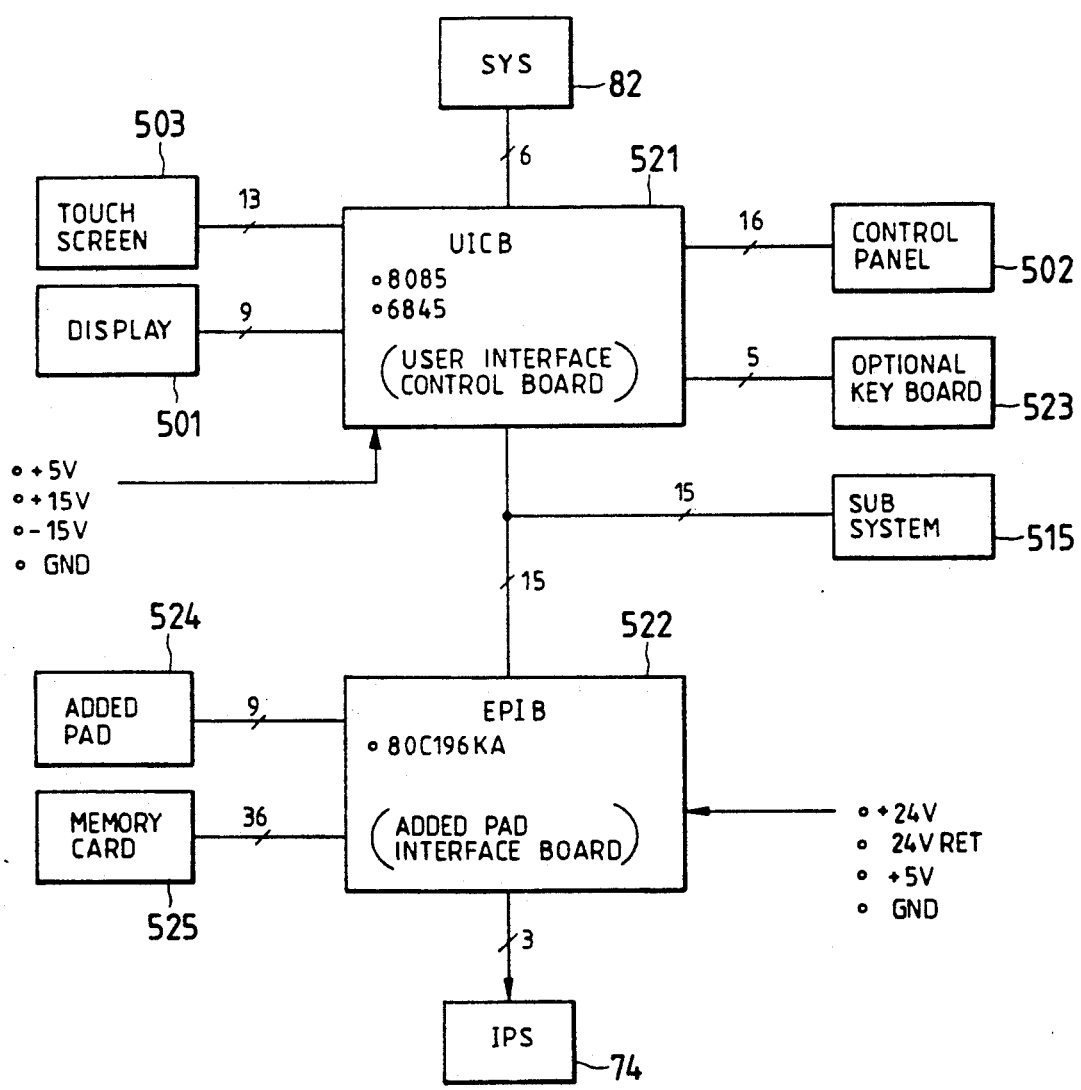
FIG. 26 shows a hardware configuration of the UI.

FIG. 25 shows a module configuration of the user interface, and FIG. 26 shows a hardware configuration of the same.

As shown in FIG. 25, the user interface of the present invention is composed of a video display module 511 for controlling the display screen of the color display 501, and an edit pad interface module 512 for inputting and outputting an edit pad 513 and a memory card 514. System UIs 517 and 519 and a subsystem 515 for controlling the above modules, and a touch screen 503 and a control panel 502 are connected to the video display module 511. The edit pad interface module 512 enters X and Y coordinates data from the edit pad 513, and receives jobs and X and Y coordinates from the memory card 514, sends video map display data to the video display module 511, and transfers UI control signals to and from the video display module 511.

An area designation consists of a marker designation to designate a specific area on an original by a red or blue marker for effecting trimming and color change process, a 2 point designation by using coordinates data in a rectangular area, and a closed loop designation by tracing an edit pad. The marker designation has no data in particular. The 2 point designation is for designating a small amount of data. The closed loop designation needs a large amount of data for the area to be edited. The IPS is used for the editing data. The amount of the data is too large to transmit at high speed. For this reason, the transfer line connected to the IIT/IPS 516 and exclusively used for transmitting the X and Y coordinates data is provided separately from the ordinary data transmission line.

The video display module 511 enters vertical and horizontal input points (coordinate positions on the touch screen) on a touch screen 503, recognizes a button ID, and enters a button ID on the control panel 502. Further, the video display module 511 sends a button ID to the system UIs 517 and 519, and receives a display request from the system UIs 517 and 519. The subsystem (ESS) 515 is connected to a work station and a host CPU, for example, and serves as a print controller when the copying machine is used as a laser printer. In this case, the data of the touch screen 503, control panel 502, and keyboard (not shown) is transferred to the subsystem 515. The contents in the display screen are sent from the subsystem 515 to the video display module 511.

The system UIs 517 and 519 transfer the copy mode and machine state data to and from master controllers 518 and 520. In connection with the software architecture shown in FIG. 4, one of the system UIs 517 and 519 is the SYSUI module 81 in FIG. 4, and the other is the MCBUI module 86 of the MCB remote.

The hardware of the user interface according to the preferred embodiment of the instant invention is made up of a couple of control boards, UICB 521 and EPIB 522, as shown in FIG. 26. In connection with the above module configuration, the functions of the user interface are also categorized into two groups. The UICB 521 uses two CPUs, such as Intel 8085 and 6845 microprocessors or their equivalents in order to control the hardware of the UI, to drive the edit pads 513 and 514, and to process the received data of the touch screen 503 and to write the results on the CRT screen. The EPIB 522 uses a CPU of 16 bits such as 80C196KA made by Intel, and transfers the depicting data of the bit map area to the UICB in the DMA mode. The 16-bit CPU is used because a CPU of 8 bits is unsatisfactory to depict data in the bit map area. In this way, the many functions used are decentralized.

Figure 27:
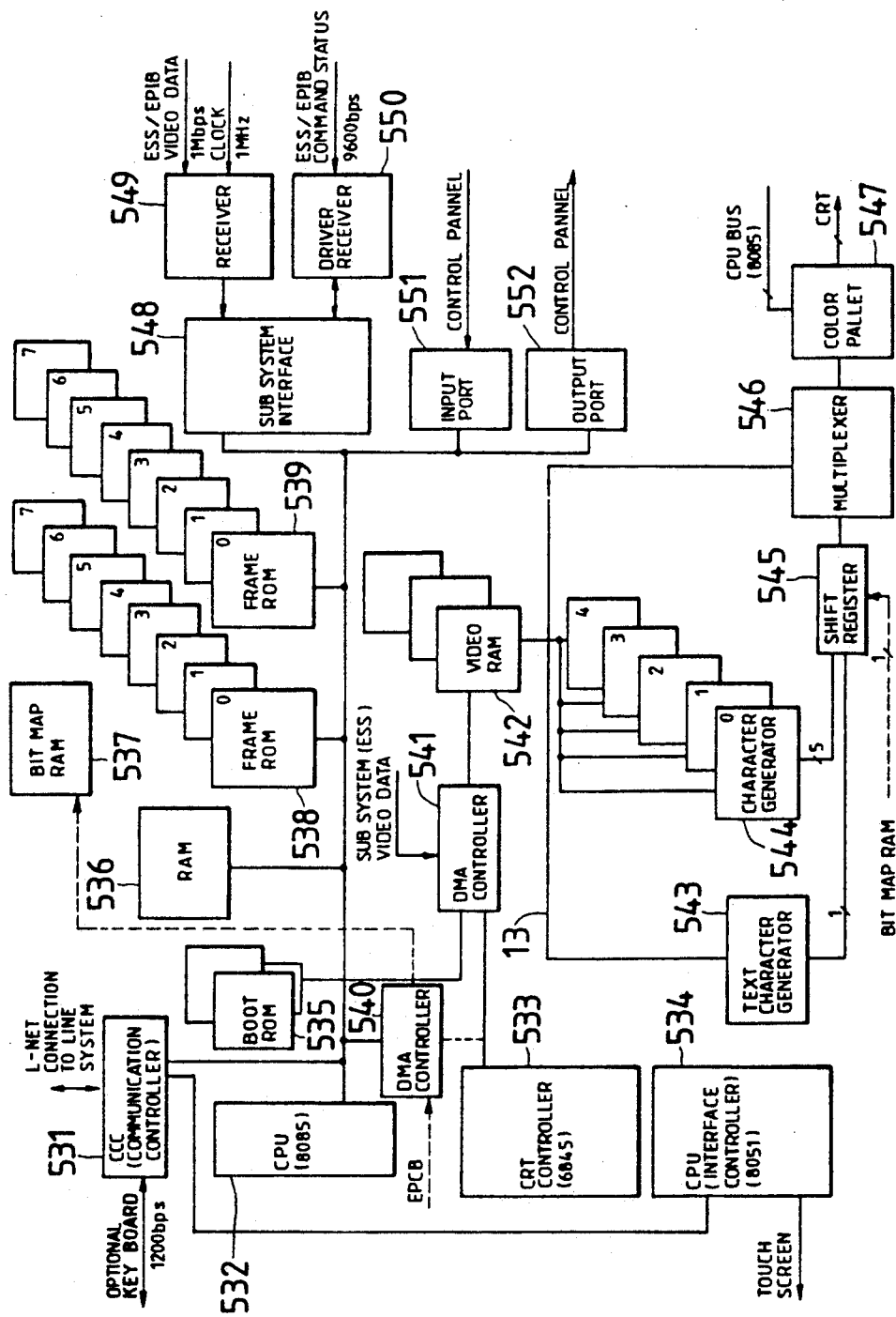
FIG. 27 shows a configuration of a UICB.

FIG. 27 shows a circuit arrangement of the UICB. The UICB uses a CPU 534 such as an Intel 8051 or its equivalent, in addition to the above CPUs CCC 531 is connected to the high speed communication line L-NET or a communication line of an optional keyboard, and it controls the communication by the CPU 534 and CCC 531. Further, the CPU 534 is also used for driving the touch screen. The signals of the touch screen (the coordinate position data) are fetched through the CCC 531 into the CPU 532 from the CPU 534. In the CPU 532, the button ID is recognized and processed. The UICB is connected to the control panel through an input port 551 and an output port 552. Further, it receives video data at 1Mb/sec together with a 1MHz clock signal from the EPIB 522 and the subsystem (ESS) through the subsystem interface 548, receiver 549, and driver 550, and is capable of transmitting and receiving commands and status data at 9600 bps.

The memories used are a boot ROM 535 storing a bootstrap program, frame ROMs 538 and 539, RAM 536, bit map RAM 537, and V-RAM 542. The frame ROMs 538 and 539 store the data with regard to the display screen whose data structure is not a bit map and, therefore, may be handled in the software, viz., not bit map. When a display request arrives through the L-NET, the CPU 532 generates depicting data in the RAM 536 that is used as a work area. The data generated is written into the V-RAM 542 by the DMA 541. The bit map data is transferred from the EPIB 522 to the bit map RAM 537, and written thereinto by the DMA 540. A character generator 544 is for a graphic tile, and a character generator, for a character tile. The V-RAM 542 is controlled by a tile code. The tile code consists of 24 bits (3 bytes). In the tile code, 13 bits are assigned to indicate the kinds of tiles; 2 bits to identify text, graphic or bit map; 1 bit for blink data; 5 bits for color data of the tiles; and 3 bits for data indicative of background or foreground. A CRT controller frames a display according to the tile code data that is stored in the V-RAM 542, and feeds the video data to the CRT screen by way of a shift register 545, multiplexer 546, and color palette 547. Depiction in the bit map area is changed by the shift register 545.

Figure 28:
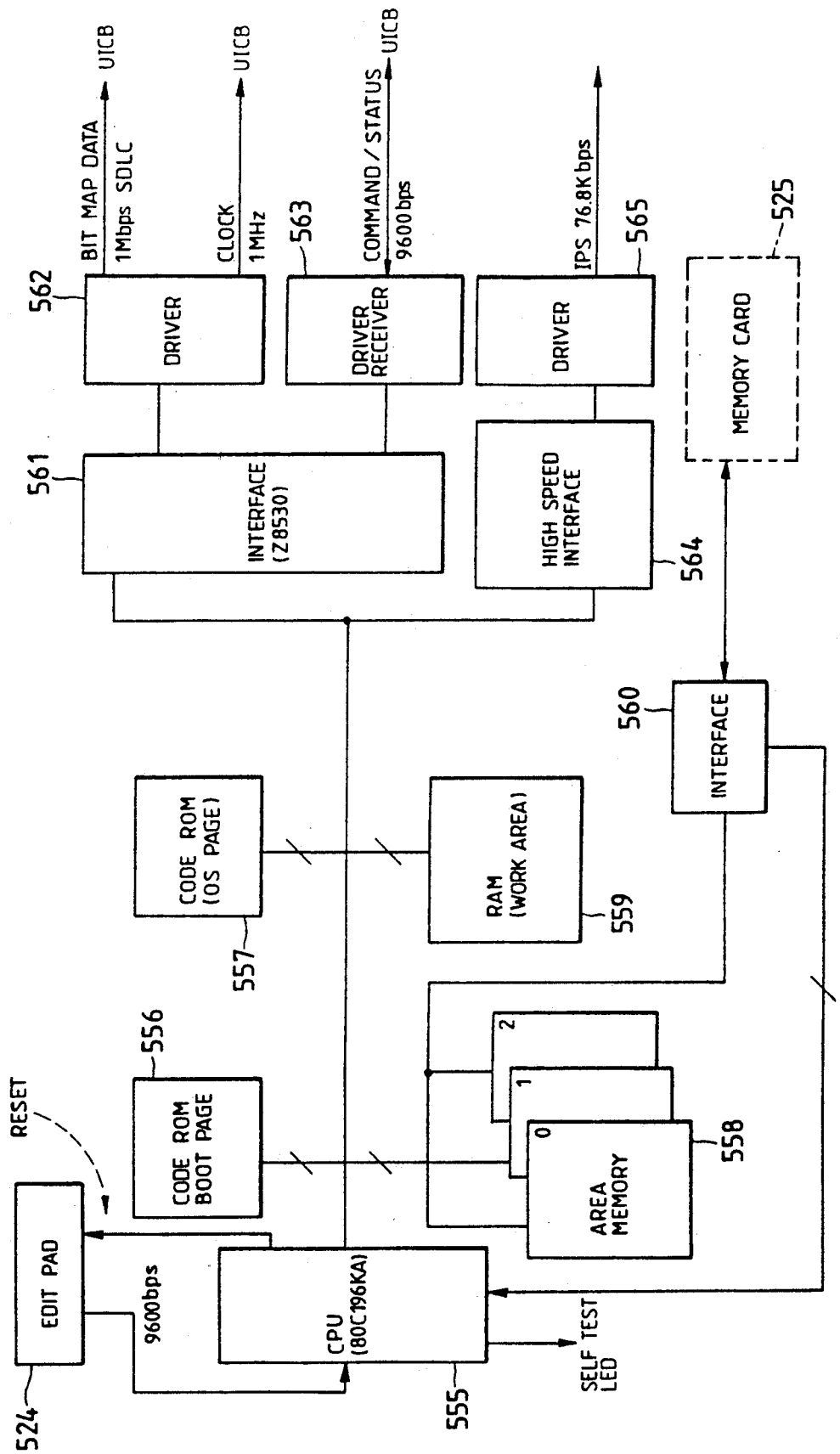
FIG. 28 shows a configuration of an EPIB.

FIG. 28 shows an arrangement of the EPIB. The EPIB is made up of a 16-bit CPU 555, such as on Intel 80C196KA or its equivalent, boot page code ROM 556, OS page code ROM 5557, area memory 558, and RAM 559 used as a work area. The EPIB transfers bit map data to the UICB, and transfers commands and status data to and from the same, through a driver 562 and a driver/receiver 563. Through a high speed communication interface 564 and a driver 565, the EPIB transfers X and Y coordinate data to the IPS. Data transfer to and from a memory card 525 is performed through an interface 560. Accordingly, when the EPIB receives the data to designate a closed loop edit area or copy mode data from the edit pad 524 or the memory card 525, the received data is transferred to the UICB through the interface 561 and the driver 562, and to the IPS through the high speed communication interface 564 and the driver 565.

The display system for the user interface presents a large amount of data of the multi-functioning copying machine. The increased data requires a broad display area, but this is contrary to the concept of a compact machine. If a compact size display is used and all necessary data must be displayed in one display screen, the display density would be unacceptable and further, if it would be realized, the displayed items are illegible to operators.

In the preferred embodiment of the present invention, creations are introduced into the display screen layout and its controls, enabling use of a compact display. The color display can provide various display modes by controlling many attributes of the display, for example, color, brightness, and the like. In this respect, the color display is superior to LEDs and LCDs used in the conventional console panel. By making use of the advantageous features, a legible display is obtained with a compact display unit.

For example, the information to be displayed on the display screen is categorized into a plurality of groups of information. These groups of information are displayed in a plurality of displays. With regard to one display, the detailed information is displayed in a pop-up manner, and is not displayed in the primary display screen. Accordingly, the display is concise and clear with only necessary information. For the display containing different items of information, color and emphatic indications are used so that the operator can readily and distinctly recognize the necessary information on the display screen from among the information.

Figure 29A:
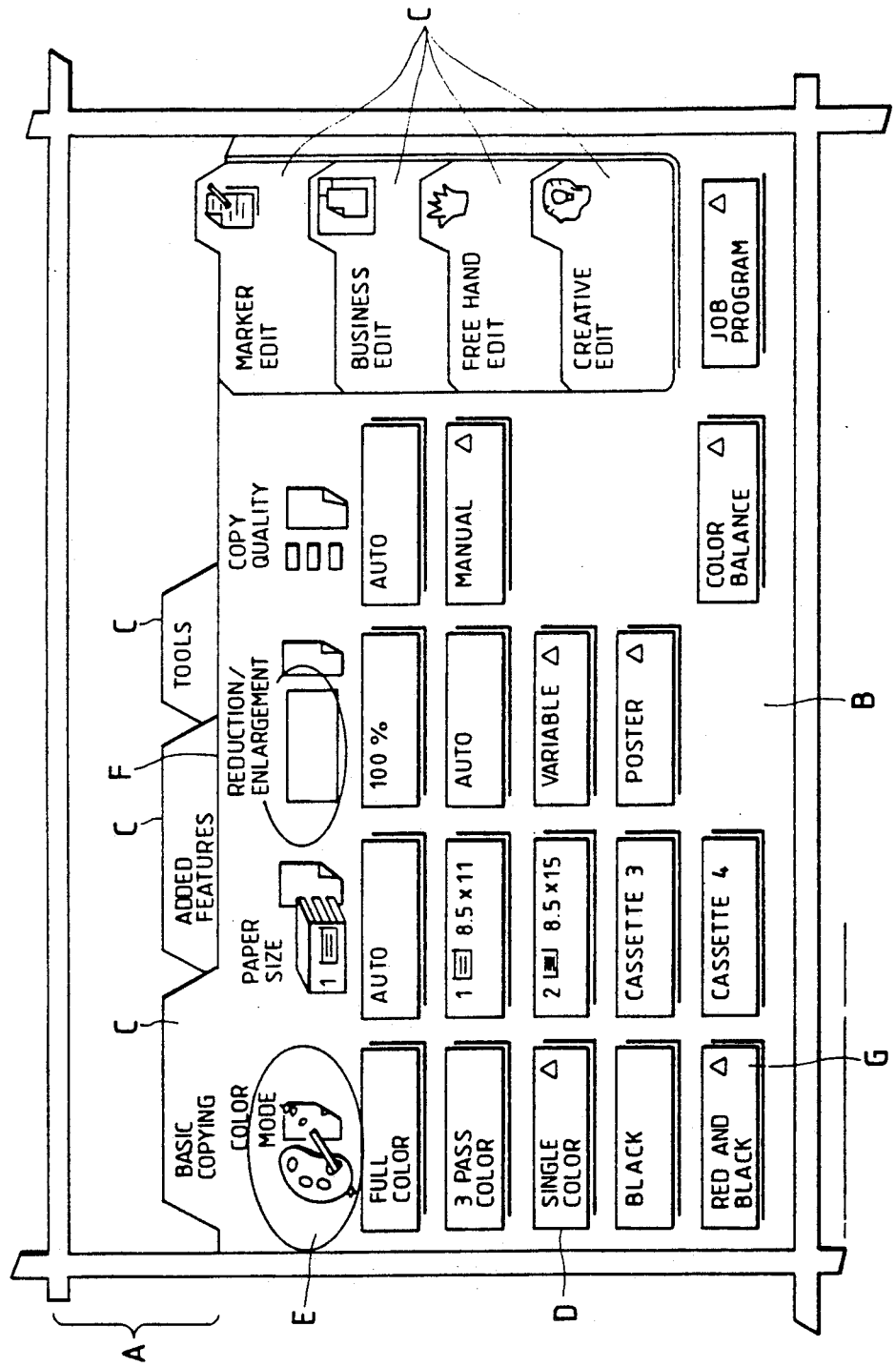
FIGS. 29(a) to 29(c) show layouts in displays for instructive controls.
Figure 29B:
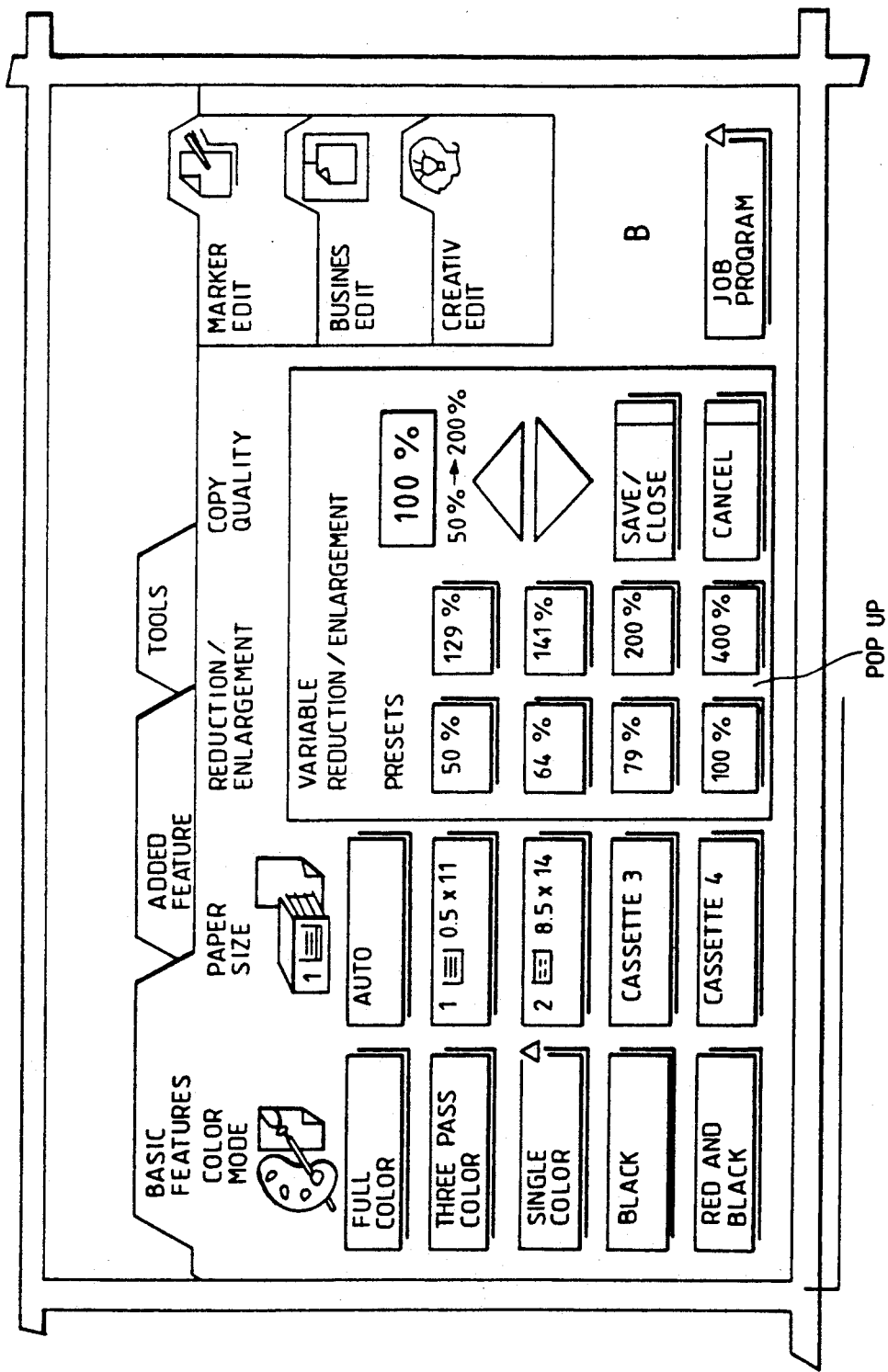
Figure 29C:
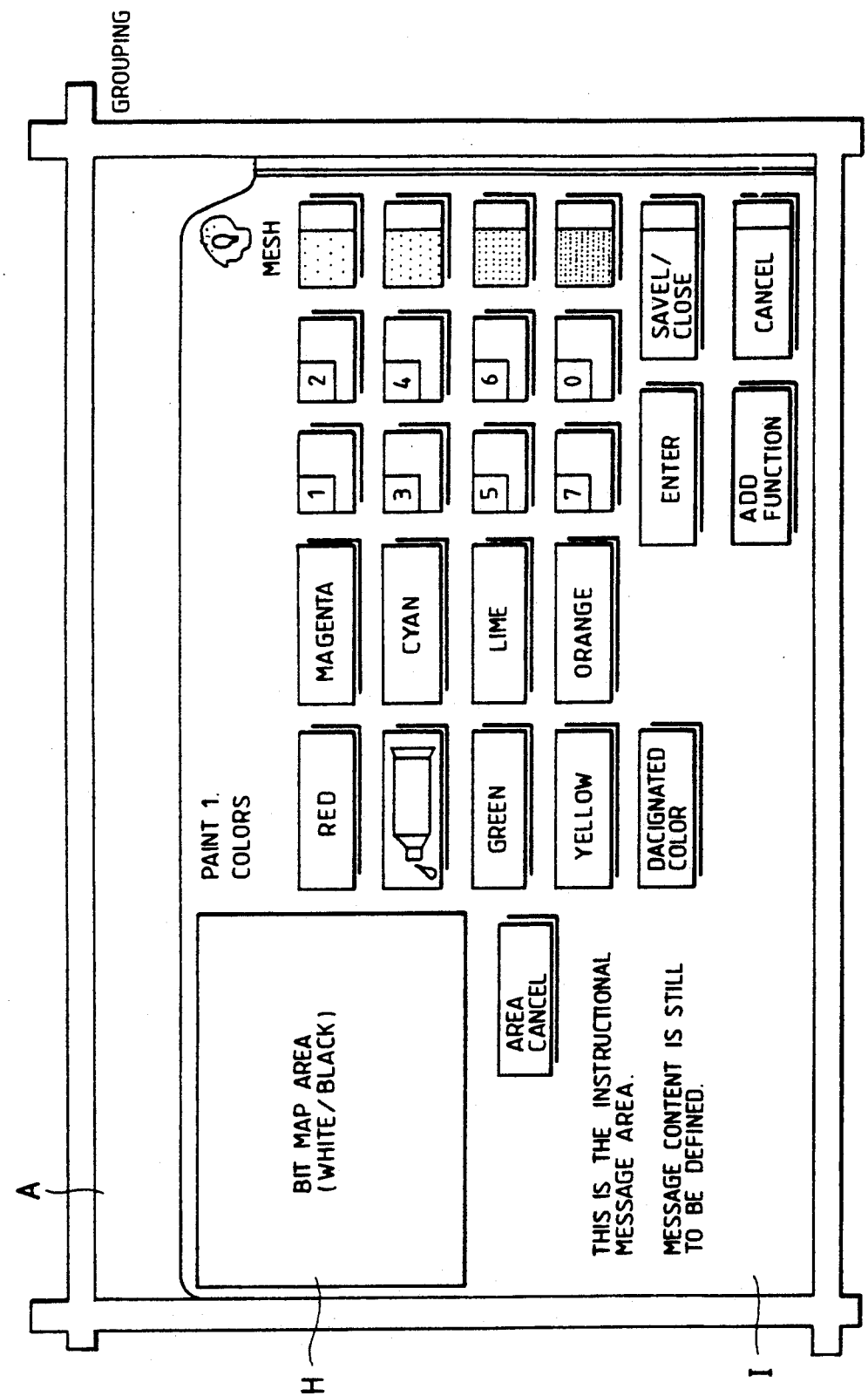

FIG. 29(a) shows a basic copy display, FIG. 29(b) shows a display in which a pop-up display is inserted in the basic copy display and FIG. 29(c) shows a paint 1 display of the creative edit.

In the user interface according to the preferred embodiment of the present invention, an initial display is the basic copy display for setting copy modes as shown in FIG. 29(a). The display for setting copy modes is divided into two sections, a message area A and a pathway area B.

The message area consists of the upper three lines on the screen. The first line is for a statement message. The second and third lines are for various messages, such as a guide message when different functions are contradictively selected, a message showing a fault state of the machine, and an alarm message. The right end portion of the message area is used as an area for displaying the number of copies, such as the number of copies set by a ten key keypad, and the number of copies under copying operation.

The pathway area B is an area for selecting various functions, and contains many pathways of a basic copy, added feature, marker edit, business edit, free hand edit, creative edit, and tool. The pathway tabs C for those pathways are displayed. Each pathway uses a pop-up function for improving operability. The pathway area B further contains soft buttons D as choices for selecting functions by touching it with a finger, an icon (picture) E for indicating the function selected, and an indicator F for indicating magnification percentages. Those soft buttons with the pop-up functions are each marked with a pop-up mark G of delta (Δ). By touching the pathway tab C, the pass-way of the touched tab is opened. By touching the soft button, the function indicated by the touched soft button is selected. For gaining a good operability, the soft buttons D are arrayed so that for function select, those buttons are operated in the order from the left upper button to the right lower button.

The basic copy display and other displays are sorted to maximize a integration between it and other devices, and between the soft panel and the hard console panel. Further, each edit display consists of a plurality of levels that can be selected in accordance with the degree of skill of the operator. Further, the pop-up function is used. Of those functions displayed, the functions requiring a high level of technique or complicated functions are displayed in a pop-up manner.

The pop-up display has detailed setting items data for a specific function. The display has a pop-up open function. To see detailed setting items data, the pop-up is opened. With this, the display of each pathway is easy to see and is simple. The pop-up display is opened by touching the soft button with the pop-up mark and is closed when a close button or a cancel button or an all-clear button are pushed, or when an auto clear function operates. A display shown in FIG. 29(c) appears when the reduction/enlargement function is selected, the pop-up display is opened by touching a variable reduction/enlargement soft button.

In the basic copy display, when the pathway tab for the creative edit is touched, the display is changed to the screen of the creative edit pathway. The display of paint 1 of those creative edit pathway displays is shown in FIG. 29(c). The display includes a bit map area H and an instructional message area I. The bit map area H is located in the left upper portion in the screen. When an edit area is designated by the edit pad, a single color bit map is displayed in the area. An instructional message area I is located in the lower left portion in the screen. By using this area, instructive messages for edit work are presented to the operator. As a matter of course, the message differs with the type of the edit work. In the screen, a work area occupies an area except for the bit map area H, instructional area I, and the message area A in the upper portion of the screen.

As shown in FIG. 29(a), the pathway for the basic copy includes soft buttons (choices) for selecting the color mode, paper select, reduction/enlargement, copy image quality, color balance, and job program, and the pathway tabs for the maker edit, business edit, freehand edit, and creative edit, and the edit feature and tool. This pathway is an initial pathway as is displayed after power on and when an auto clear mode is set up by pushing the all clear button.

The color mode consists of five modes, a full color (4 pass color) mode using four colors Y, M, C, and B for copy, 3-pass color mode using three colors except color B, single color mode using a single color selected from among 12 colors, black mode, and black/red mode. A default automatically selected may be set appropriately. The single color mode and the black/red mode have detailed setting items. Accordingly, these modes are displayed in a pop-up code.

The paper select mode consists of an automatic paper select (APS), tray 1 and tray 2, cassette 3 and cassette 4. The APS functions when a specific magnification is set in the reduction/enlargement mode, and does not function when an auto magnification select (AMS) mode is set up. The default is the APS.

The reduction/enlargement mode has two choices, 100%, an AMS for determining a magnification on the basis of document size and paper size when paper of a specific size is set, and a variable magnification select. In this mode, a set, calculated on auto magnification is indicated by the indicator on the top. In the variable magnification select, a magnification may be set in steps of 1% in the range from 50% to 400%. The magnifications in the vertical and the horizontal directions may be independently set. Accordingly, these detailed items are displayed in the pop-up mode. The default is 100%.

In respect to the reduction/enlargement, as described above, the magnification in the vertical scan direction (X direction) is adjusted by controlling the scan speed. The magnification in the main scan direction is adjusted by changing the method of reading data from the line memory in the IPS.

The copy image quality consists of two choices, an auto mode and a manual mode. In the auto mode, an optical density is automatically controlled for a mono color document, and a color balance is automatically controlled for a color document. In the manual mode, the pop-up technique is used for controlling the optical density of the document in seven steps. The control is carried out by the IPS.

The job program is effective only when a memory card is inserted into a slot of the card reader. In this mode, jobs can be written into and read out of the memory card. The memory card used in this instance has 32K bytes and is capable of storing a maximum of 32 jobs. Accordingly, all other jobs than that of the projector mode can be programmed.

The pathway of the bit feature display includes soft buttons (choices) for selecting a copy output, copy sharpness, copy contrast, copy position, film projector, page programming, job program, and binding margin, and the pathway tabs for the maker edit, business edit, freehand edit, and creative edit, and the basic copy and tool.

The copy output has two choices, a top tray and a sort mode. The default is the too tray, and when no sorted is used, this item is not indicated.

The copy sharpness has three choices; standard, manual, and photo. In manual mode, the pop-up display is used and control in 7-steps is possible. In the photo mode, the pop-up display is used. It contains items of photo, character, print and photo/character. The control for this is carried out in the IPS.

The copy contrast has a copy contrast control in seven steps. The copy position has a choice of an auto center function in which the center of the copy image is positioned at the center of paper by the default.

The film projector is used for copying images on various kinds of films, and will be described in detail later. The pop-up display is used for selecting any of 35 mm negative and 35 mm positive by the projector, and 35 mm nega. 6 cm × 6 cm slide, and 4" × 5" slide on the platen.

The page programming has choices of cover mode for applying a cover to copies, insert mode for inserting white or color paper into copied papers, color mode to set color copying for every page of the document, and paper to select a desired tray for every page of the document. This item is not displayed when the ADF is not set up.

In the binding margin mode, the margin may be set in steps of 1 mm in the range of 0 to 30 mm. The binding margin designates one location for one document. The length of the binding margin is from the lead end of the paper to the lead end of an image area. The length of the margin in the main scan direction is adjusted by a shift operation by the line buffer in the IPS. The length of the margin is adjusted by shifting the scan timing of the IIT.

The edit display consists of four pathways, the marker edit, business edit, free hand edit, and creative edit.

The marker edit pathway and the free hand pathway have choices of extract, delete, color application (mesh/line/solid), and color change. Further, it has pathway tabs of a basic copy, edit feature, and tool.

The business edit pathway has choices of extract, delete, color application (mesh/line/solid), color conversion, coloring, logotype insertion, and binding margin. Further, the business edit, like the marker edit pathway, etc., has pathway tabs of a basic copy, edit feature, and tool.

The creative edit pathway has choices of extract, delete, color application (mesh/line/solid), color conversion, coloring, logotype insertion, binding margin, negative/positive inversion, inlay composition, transparency composition, paint, reflected image, repeat, enlargement, continuous projection, partial movement, corner/center movement, manual/auto one-side magnification, color mode, color balance control, page continuous copy, and color composition. Further, the creative edit, like the marker edit pathway, etc., has pathway tabs of a basic copy, edit feature, and tool.

The tool pathway is used by key operators and customer engineers. This pathway is opened by entering a password. Choices of the tool pathway are: an auditron, machine initial value set-up., select of default of the respective functions, color registration, film type registration, fine adjustment of registered color, preset of the respective choices of the machine, setting of a film projector scan area, audio tone (kind of tone and volume), setting of timers for the paper transport system and others (auto clear, etc.), billing meter, setting of dual languages, diag. mode, max. control value, and memory card format.

The default select is directed for the color mode, paper select, copy density, copy sharpness, copy contrast, paper tray for page programming, color of the single color, color and mesh of a color palette for color application, pattern of a logotype, binding margin, and color balance.

In the user interface, progress of the copying operation is constantly monitored. When jamming occurs, the user interface displays the occurrence of the jam. In respect to the function settings, an information display for presenting the information of the current display is provided, which is ready for display at all times.

The displays (except the bit map area) are composed of tiles whose width is 3 mm (8 pixels) and height is 6 mm (16 pixels). The width of each display is 80 tiles and the height is 25 tiles. The bit map area is displayed with pixels and its height is 151 pixels and width is 216 pixels.

As described above, the user interface is arranged such that the functions are categorized into different modes such as the basic copy, edit feature, and edit. The displays are assigned to those modes, and accordingly, the display is changed in accordance with the mode used. The display of each mode presents items of function select, setting of conditions for function exercise, and the like. For exercise of a function, a choice is selected by pushing the related soft button. Necessary condition data can be entered while seeing the display.

Some of the choices in the menu are displayed in the form of a pop-up display (overlay display or window display). Use of the pop-up display provides a concise and easy-to-see visual presentation, even if the number of selectable functions and conditions settings is large. Accordingly, the operability of the copying machine is improved.

The hard control panel, as shown in FIG. 23, is disposed on the right side of the color display panel, and is slightly bent toward the center. The control panel is provided with various buttons of ten keys, ten key clear, all clear, stop, interrupt, start, information, audiotron, and language.

The ten key buttons are used to set the number of copies, to enter codes and data, and to enter a password when the tool is used. These buttons are invalid when a job occurs or it is interrupted.

The all clear button is used to return all of the copy modes to default values, and to return the displays to the basic copy display except when the tool display is opened. When an interrupt job is being set, the copy mode returns to the default, but the interrupt mode is not removed.

The stop button is used to interrupt the job at a proper place to end in the copy during the execution of copying operation, and to stop the machine after the copied paper is delivered outside. In the diag. mode, it is used to stop (interrupt) the input/output check.

The interrupt button is used to set up an interrupt mode during the primary job except when the job is interrupted, and returns control to the primary job when control is being interrupted. When this button is operated during the execution of the primary job, the machine is placed into a reserve mode, and the job is interrupted or ends at the end of delivering the copied paper.

The start button is used to start the job or to restart the interrupted job. In the diag. mode, it is used to enter and save codes and data, and to start the inputting and outputting of the same. When the machine is being preheated, if this button is operated, the machine automatically starts at the end of preheating.

The information button consists of an on button and an off button. These buttons are in a ready state except the progressing of copying operation. When the on button is operated, an information display for the display being currently presented appears. To remove the information display, the off button is operated.

The auditron button is used to enter a password at the start of a job. The language button is used to select a desired language of expressions in the display from among a plurality of languages. The hard control panel is also provided with LEDs for indicating operations of the respective buttons.

The film image reader, as shown in FIG. 2, is composed of a film projector (F/P) 64 and a mirror unit (M/U) 65.

Figure 30:
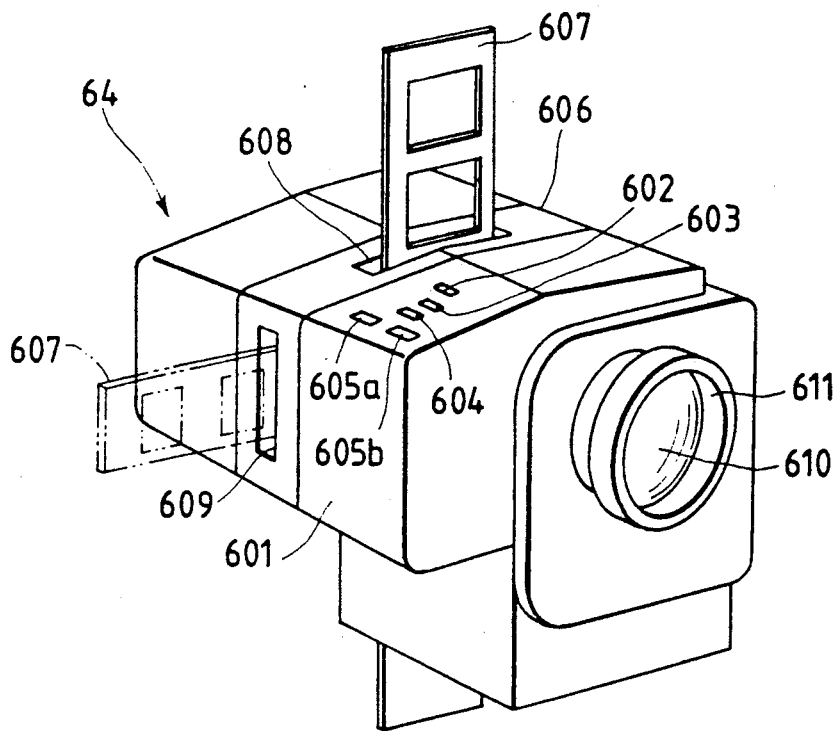
FIG. 30 shows a perspective view of an F/P.

As shown in FIG. 30, the F/P is provided with a housing 601. The housing 601 is further provided with an operation check lamp 602, manual lamp switch 603, auto focus/manual focus (AF/MF) select switch 604, and manual focus (M/F) operation switches 605a and 605b. The housing 601 is further provided with an open/close member 606 swingable for opening and closing. Slots 608 and 609 are formed in the upper surface and the sidewall of the open/close member 606. A film holder 607 holding an original film 633 is inserted into the housing 601 through either of these slots. In use, these slots sre selectively used in accordance with the orientation of the image recorded in the film 633. Slots (not shown) are additionally formed in the bottom surface and the wall opposite to the above. Through these slots, the film holder 607 may be ejected. The open/close member 606 is hinged to the housing 601 or removably mounted to the housing 601. With provision of the open/close member 606 thus mounted, when foreign material enters the housing 601, an operator opens the member 606, and may remove this material.

In this instance, two types of film holders are used, one for 35 mm negative film, and the other for 35 mm positive film. The F/P 64 accepts these types of films, and further negative films of 6 cm×6 cm and 4"×5". In the case of negative film, it is placed close between the M/U 65 and the platen glass 31.

Figure 33:
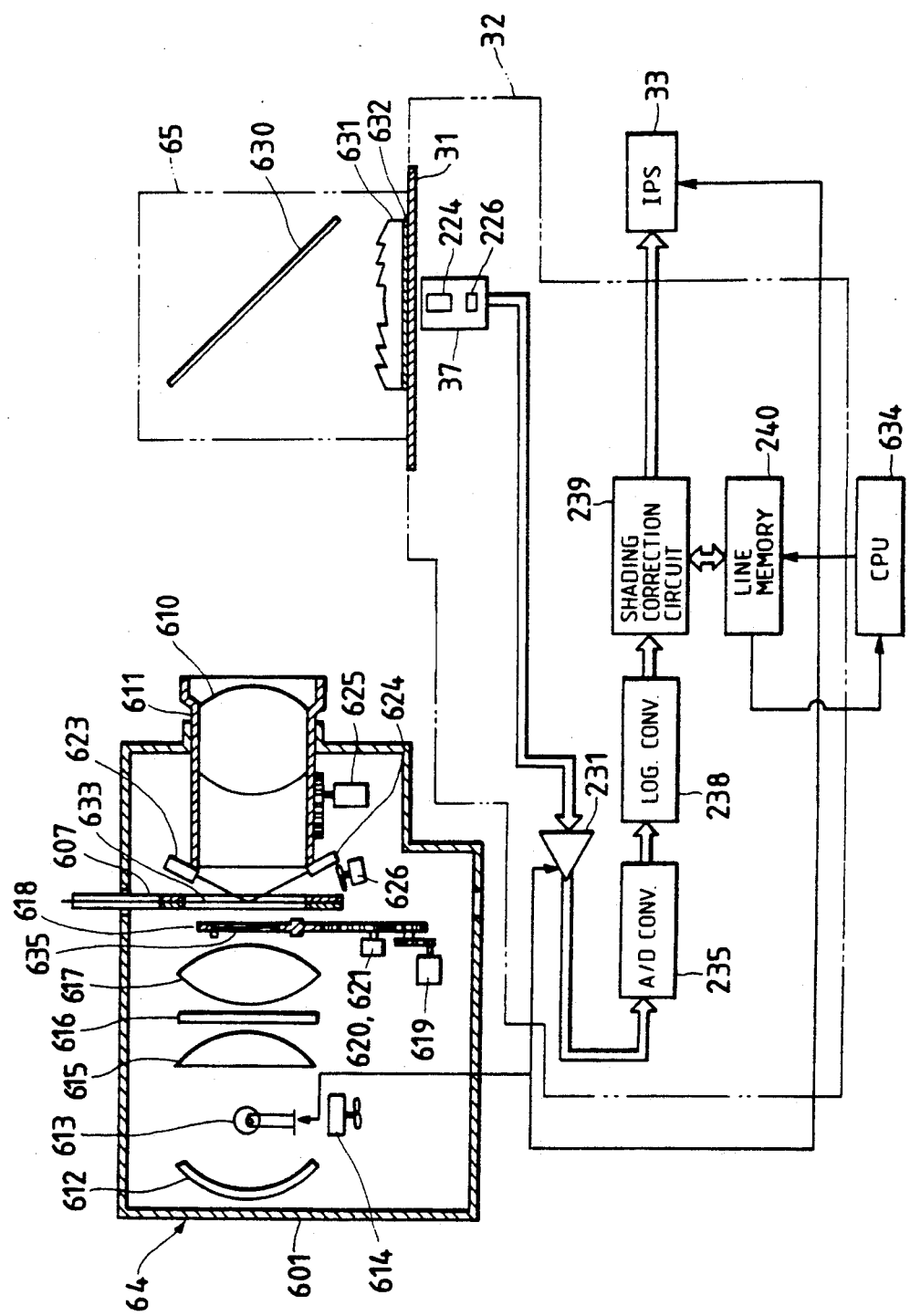
FIG. 33 shows a configuration of the F/P in connection with the F/P, M/U and IIT.

As shown in FIG. 33, a lens holder 611 holding a projection lens 610 is slidably supported in the right portion of the housing 601 as viewed in the drawing.

Within the housing 601, a reflector 612 and a light source lamp 613 such as a halogen lamp is disposed in alignment with the projection lens 610 with respect to an optical axis. A cooling fan 614 for cooling the lamp 612 is disposed near the lamp 613. An aspheric surface lens 615 for converging rays of light from the lamp 613, heat wave absorbing filter 616 for cutting off the light of a predetermined wavelength, and a convex lens 610 are disposed on the right side of the lamp 613 and in alignment with the same with respect to the optical axis.

An auto exchanger for correction filter is installed on the right side of the convex lens 617. The auto filter exchange includes a correction filter holder 618, motor 619, first and second position sensors 620 and 621, and controller (not shown, but is housed in the F/P 64). The filter holder 618 holds a correction filter 635 for correcting the film density of the 35 mm negative film and the positive film. The correction filter illustrated is for one of the two types of films. The motor 619 drives the filter holder 618.

The first and second position sensors 620 and 621 are for detecting angular displacements of the filter holder 618. In use, a correction filter corresponding to the original film 633 is automatically selected from those contained in the filter holder 618, and is aligned with the projection lens 610 and other lenses with respect to the optical axis. The auto filter exchanger 635 may be any other place than the above, if it lies on an optical axis of the projection light, for example between the platen glass 31 and the imaging unit 37.

An auto focus device is further installed, which is composed of a light emitting means 623 such as a photo diode and a photo sensor 624 that operate in connection with the lens holder 611, and a motor 625 for sliding the lens holder 611 of the projection lens 610 with respect to the housing 601. When the film holder 607 is inserted through279 the original film 633 contained in the film holder 607 is positioned between filter holder 618 and the paired photo diode 623 and photo sensor 624. A fan 626 for cooling the original film 633 is located near the place where the original film 635 is set.

A power supply for the F/P 64 is different from that for the base machine 30, but may be installed within the base machine 30.

Figure 31:
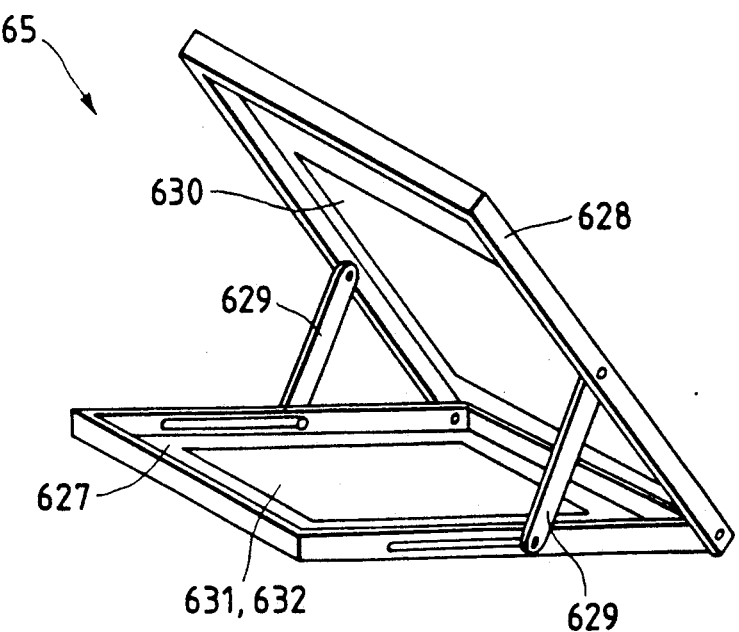
FIG. 31 is a perspective view of an M/U.

As shown in FIG. 31, the mirror unit (@!/U) 65 is made up of a bottom plate 627 and a cover 628 swingably mounted at one end of the bottom plate 627. Supports 629 are coupled between the bottom plate 627 and the cover 628. The supports 629 support the cover 628 at 45° with respect to the bottom plate 627 when the bottom plate is fully opened. A mirror 630 is mounted to the rear side of the cover 628. The bottom plate 627 has a large opening which is filled with a fresnel lens 631 and a diffusion plate 632.

As best illustrated in FIG. 33, the fresnel lens 631 and the diffusion plate 632 are formed by a single acrylic plate. The top surface of the acrylic plate constitutes the fresnel lens 631, and the bottom surface constitutes the diffusion plate 632. The fresnel lens 631 converts the light reflected from the mirror 630 that otherwise will spread out, into parallel rays of light to prevent the peripheral portion of an image from being darkened. The diffusion plate 632 slightly diffuses the parallel rays of light to an extent to prevent the line sensor 226 from detecting a shadow of the selfoc lens 224 within the imaging unit 37.

When the color copying using the F/P 64 is not selected, the mirror unit 65 is folded and stored in a given storage place. In use, it is opened and placed at a predetermined location on the platen glass 31 of the base machine 30.

The halogen lamp as is generally used as the light source lamp 613 of the F/P 64 has a spectral characteristic of more red (R) than blue (B). When, with the light emitted from the halogen lamp, an image on a film is projected, a ratio of red (R), green (G) and blue (B) of the projection light is influenced by the spectral characteristic of the lamp. Therefore, some correction of the spectral characteristic of the halogen lamp must be made.

A variety of the film recording images exist, such as negative films and positive films. The negative and positive films per se each consist of many types of films. These films are featured by their own spectral characteristics, respectively. For example, in the case of the negative film, the transmittance of R is high and the transmittance of B is low. Accordingly, for negative film the spectral characteristic must be corrected to increase the amount of blue light.

The F/P 64 is provided with a correction filter effecting such a correction of the spectral characteristic. In the F/P 64, these correction filters are automatically exchanged by the auto filter exchange as already discussed. More specifically, a microprocessor (CPU) in the system (SYS) issues a 2-bit command signal to set a correction filter corresponding to the original film 633 at a predetermined position. In response, the controller drives the motor 619 so that 2-bit signals derived from the first and second position sensors 620 and 621 coincide with the 2-bit command signal from the CPU. When these signals are coincident, the controller stops the motor 619 and the correction filter corresponding to the original film is automatically set at the predetermined position. In this manner, the correction filter can be exchanged readily and exactly.

The original film 633 may be inserted into the housing through either of the slots 608 and 609. In other words, in accordance with the orientation of the image of the film, the film may be inserted into the housing vertically or horizontally. In this case, at least one of the slots 608 and 609 is provided with a film detecting switch. In other words, at least one film detect switch is provided. If the slot 608 has the film detect switch, the film holder 607 is inserted through the hole 608, the film detect switch detects the film and produces a detect signal. When the detect signal is present, a necessary area of the line sensor 226 is vertical, that is, the scanning direction is set to be coincident with the longitudinal direction of the projection image. When the film holder 607 is inserted through the slot 609, the switch is in off state and no detect signal is produced. When the detect signal is absent, the necessary area is lateral, viz., the main scan direction is set to be in the longitudinal direction of the projection image.

Also, when the film detect switch is provided in the slot 609 alone, or both the slots 608 and 609 have switches, when the film holder 607 is inserted through the slot 608, the necessary area of the line sensor 226 is set so that the vertical scan direction is in the longitudinal direction of the projection image. When the film holder 607 is inserted through the slot 609, the necessary area of the line sensor 226 is set so that the main scan direction is in the longitudinal direction of the projection image. That is, the on and off signals of the film detect switch are set so as to set up the above operations.

When the film holder 607 is set to the F/P 64, the original film 633 must be positioned with a precision of several tens mm. Therefore, after the original film 633 is set, a focusing operation is required. To manually effect the focusing, an image of the original film 633 is projected onto the diffusion plate 632 of the M/U 65, an operator slides the projection lens holder 611 for focusing, while seeing the projection image. In this case, the image projected onto the diffusion plate 632 is hard to see and therefore, it cannot be expected that exact focusing is attained. To cope with this, the F/P 64 is arranged to automatically focus the projection image when it is set to the F/P 64.

The AF function is exercised by the AF in the following way. A related key on the display of the U/I 36 is operated to set up am F/P mode. The photo diode 623 emits light. In FIG. 30, the AF/MF select switch 604 is set to the AF side. The AF is ready for operation. As shown in FIG. 33, when the film holder 607 containing the original film 633 is set, the light from the photo diode 623 reflects at the original film 633. The reflected light is detected by the photo sensor 624 of the two element type, for example, for the AF purposes.

The two elements of the photo sensor 624 produces signals amounting to the amount of the reflected light, and applies it to a CPU 634. The CPU 634 calculates a difference of these signals. When the difference is not 0, the CPU produces a signal and drives the motor 625 in the direction to reduce the difference. With the rotation of the motor, the projection lens holder 611 slides. With the sliding of the lens holder, the photo diode 623 and the photo sensor 624 both move. When the difference between the signals of the sensors is reduced to 0, the image is in focus and the CPU 634 stops the motor 625.

In this way, the AF operation is carried out. As seen from the above, when the film holder containing the original film is loaded into the F/P 64, the focusing is automatically carried out without any assistance of any manual operation. Consequently, the focusing operation is free from trouble due to manual operation and improperly focused copies are avoided.

To exercise this function, the AF/MF select switch 604 is set to the MF side, and the lamp 613 automatically lights up for a predetermined period of time, to set up an MF mode. In this mode, an operator operates the switches 605a and 605b while observing the projection image on the diffusion plate 632. Through the MF, the film image is focused at a specific portion.

When a manual lamp switch 603 is pushed, the lamp 613 is turned on. The switch is not used in normal mode, but is used for back lighting to copy an image recorded on a relatively thick original including paper, films, and the like, to view a projection image for a long period of time in the AF mode, and to check if the lamp is working.

The instant copying machine is so arranged that by setting the paper size by the U/I 36, an optimum paper size is automatically selected. Additionally, when the kind of film used is selected by the U/I 36, a copy area is automatically selected in accordance with the kind of film.

The ROM of the CPU 634 prestores density data of the orange mask of the ASA 100 of each negative film produced by FUJI (trade mark), KODAK (trade mark) and KONICA (trade mark). When one of these films is selected, the CPU 634 automatically makes the shading correction on the basis of the density data stored in the ROM. In this case, there is no need for loading the base film of that film into the F/0 64. Further, density data of the orange mask of one type of film other than the above three types of films can be recorded. This data is stored into the RAM in the system of the copying machine.

Corrections, for example, gamma ($\Gamma$) correction are performed on the basis of various conditions such as the density characteristic of the original film and exposure conditions at the time of film-recording. Density control and color balance adjustments are automatically carried out.

Generally, the image density range of a film is broader than that of a document. The density range differs with the type of film. For example, the density range of positive film is broader than that of negative film. Further, the density range of film depends of film-recording conditions such as exposure to light amount, density of an object to be photographed, and brightness at the time of photographing. Actually, the density of the object is broadly distributed over the entire density range of the film.

When the image recorded in the film with the above density characteristic is copied by a copying machine using the light reflected from the image on the film, if the same signal processing as that for the ordinary document copying is used, the reproduced image is unsatisfactory in quality. To cope with this, correction is applied to the read image signal so as to have proper densities for major objects.

Figure 32:
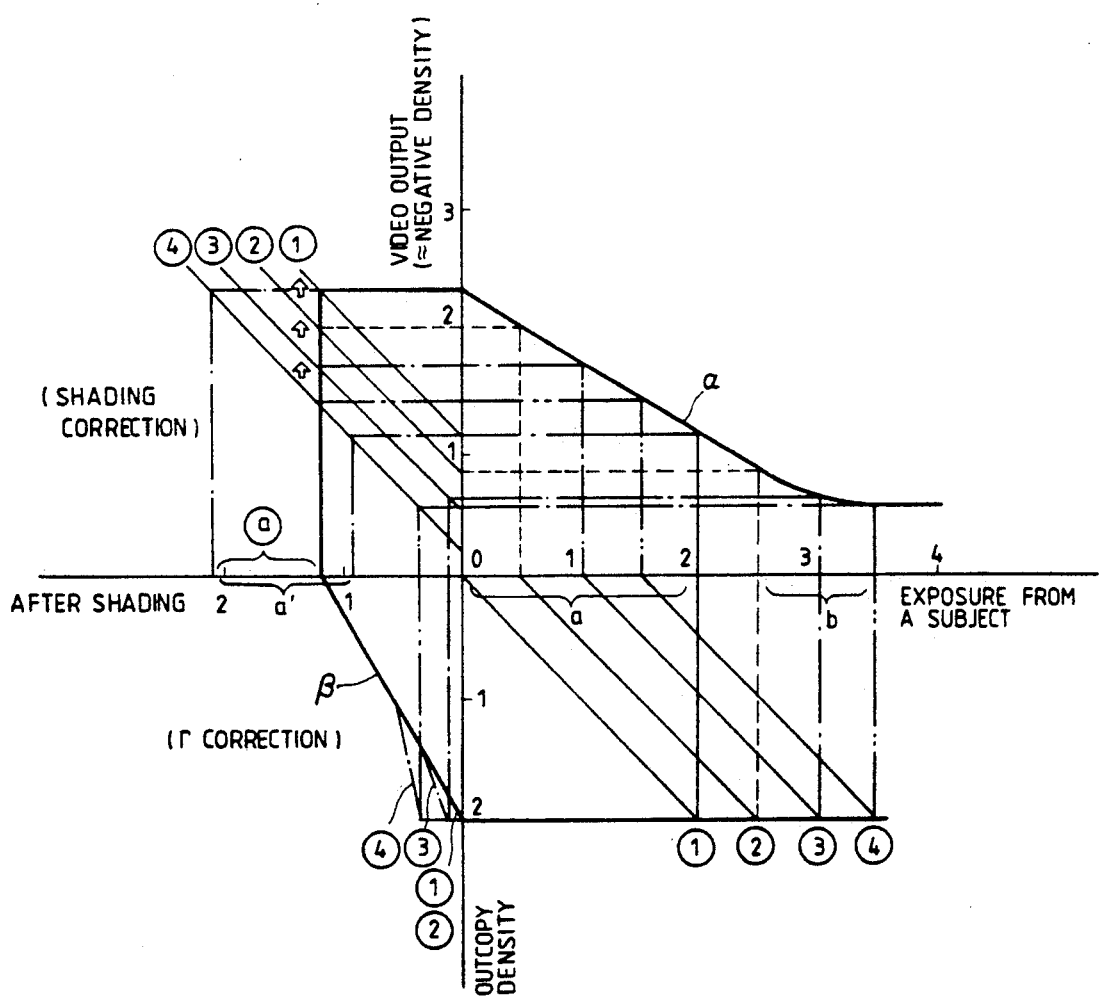
FIG. 32 is a graph showing the density characteristic of a negative film and the principle of correction.

FIG. 32 graphically illustrates the density characteristics of negative film and the principle of its density correction. In the figure, the right half of the abscissa represents the amount of exposure light applied to the object (corresponding to a density of the object), and the left half represents density after the shading correction. The upper half of the ordinate shows video circuit output (approximately equal to the density of negative film), and the lower half shows the density of the output copy. Thus, the first quadrant shows a density characteristic of a negative film; the second quadrant, shading correction; the third quadrant, gamma ($\Gamma$) correction; and the fourth quadrant, the relationship of exposure light amount vs. density of an output copy.

The density characteristic of the negative film is represented by a line "a." As shown, when the amount of the exposure light from the object is large, the density of the negative film is large. As the exposure light amount becomes small, the density of the negative film becomes linearly small. When the amount of the exposure light from the object decreases to or below a prescribed value, the linear relationship between the exposure light amount and the density of the negative film is lost. When the exposure light amount is small, contrast problems are created, and, for example, the contrast of the face and hair is lost. Also, when the exposure amount is large, if the inclination of the line "a", viz. the gamma ($\Gamma$) value is less than 1, and correction is not made, the resultant copy is soft. It is for this reason that gamma ($\Gamma$) correction is needed.

The principle of gamma ($\Gamma$) correction will be described with reference to FIG. 32. As shown, an END curve "B" is present in the third quadrant. An inclination gamma ($\Gamma'$) of the END curve "B" is selected to be $\Gamma'=1/\Gamma$ in order that a relationship between the amount of exposure light from an object to be copied and the output copy density is expressed by a straight line inclined at 45°.

It is now assumed that in the region "a" where the exposure light amount is relatively large, a density adjustment value set in the register of the shading correction circuit is expressed by a straight line (4). In this case, the density after shading correction lies in the region "a'." This region "a'" is out of the conversion region by the END curve "B." Therefore, a portion of the reproduced image corresponding to this region is smeared with white. To avoid this, the straight line (4) representative of the density adjusting value is shifted to the straight line (1) so that the density after the shading correction falls within the conversion range by the END curve. If the density adjusting value is so set, the relationship between the exposure light amount and the output copy density traces a straight line (1) in the fourth quadrant. The copied image has a gradational density. In a region "b" where the exposure light amount is relatively small, the relationship between the exposure light amount and the negative film density loses its linearity. In this case, the density adjusting value of the shading correction circuit is changed to a straight line (4) in the second quadrant. When the exposure light amount lies in the region "b," and an image of a person with black hair and wearing a brown hat is copied, the densities of the hair and the hat are substantially the same, and the resultant copied image has a good contrast between the hair and the hat.

As shown in FIG. 33, the line sensor 226 reads the projection light of an image on the document film 633 in the form of the amounts of color lights of R, G, and B, and produces analog signals representative of them. The analog image signals representing the light amounts are amplified by an amplifier 231 up to preset levels. The amplified image signals are digitized by an A/D converter 235. The digital signals indicative of the light amounts are then converted into signals indicative of densities by a log converter 238.

The density image signals are subjected to shading correction by the shading correction circuit 239. Shading correction removes from the image the nonuniform light amount of the selfoc lens, the variance of the sensitivities of the pixels of the line sensor 226, variances of the spectral characteristics and the light amounts of the correction filters and the lamps 613, and the adverse effects due to aging.

Before shading correction, reference data is stored into the line memory 240. To effect this, when a document film is selected from among the three types of films and the registered films, the related correction filter is selected and set to the positive film filter. The copying machine is operated with the original film 633 not being set. Under this condition, the amount of light from the lamp 613 is read. amplified, digitized, and converted into a density signal. The data based on the density signal thus obtained is stored in the line memory 240, as the reference data. More specifically, the imaging unit 37 is step scanned 32 lines for each pixel of R, G and B. The sampled data is transferred through the line memory 240 to the CPU 634. The CPU 634 produces an average density of the sampling data of 32 lines through its calculation. In this way, the shading data is obtained. The averaging of the sampling data eliminates the error for each pixel.

Then, the original film is set, and the image of the original film is read. The CPU 634 calculates a density adjusting value DADj by using the density data of the film as is read out of the ROM, and replaces the DADj value in the register of the LSI in the shading correction circuit 239. Further, the CPU 634 adjusts the amount of light of the lamp 613 and the gain of the amplifier 643 in accordance with the selected film.

The shading correction circuit 239 adds the DADj value to the actual data obtained by reading the original film, and shifts the read value. The shading circuit 239 subtracts the shading data of each pixel from the adjusted data to effect shading correction.

For copying the films that are not stored in the ROM of the CPU 634 and in the RAM of the system, a base film is set to collect the density data of the film, and a DADj value must be calculated on the basis of the collected density data.

After shading correction, the IIT 32 transmits density signals of R, G, and B to the IPS 33.

The CPU 634 selects the END curve on the basis of the actual data of the original film, and produces a correction signal for the gamma ($\Gamma$) correction on the basis of the selected curve. The IPS 33 exercises the gamma ($\Gamma$) correction to remove the poor contract problem due to the nonlinear characteristic and the fact that the gamma of the original film is not 1.

Figure 34:
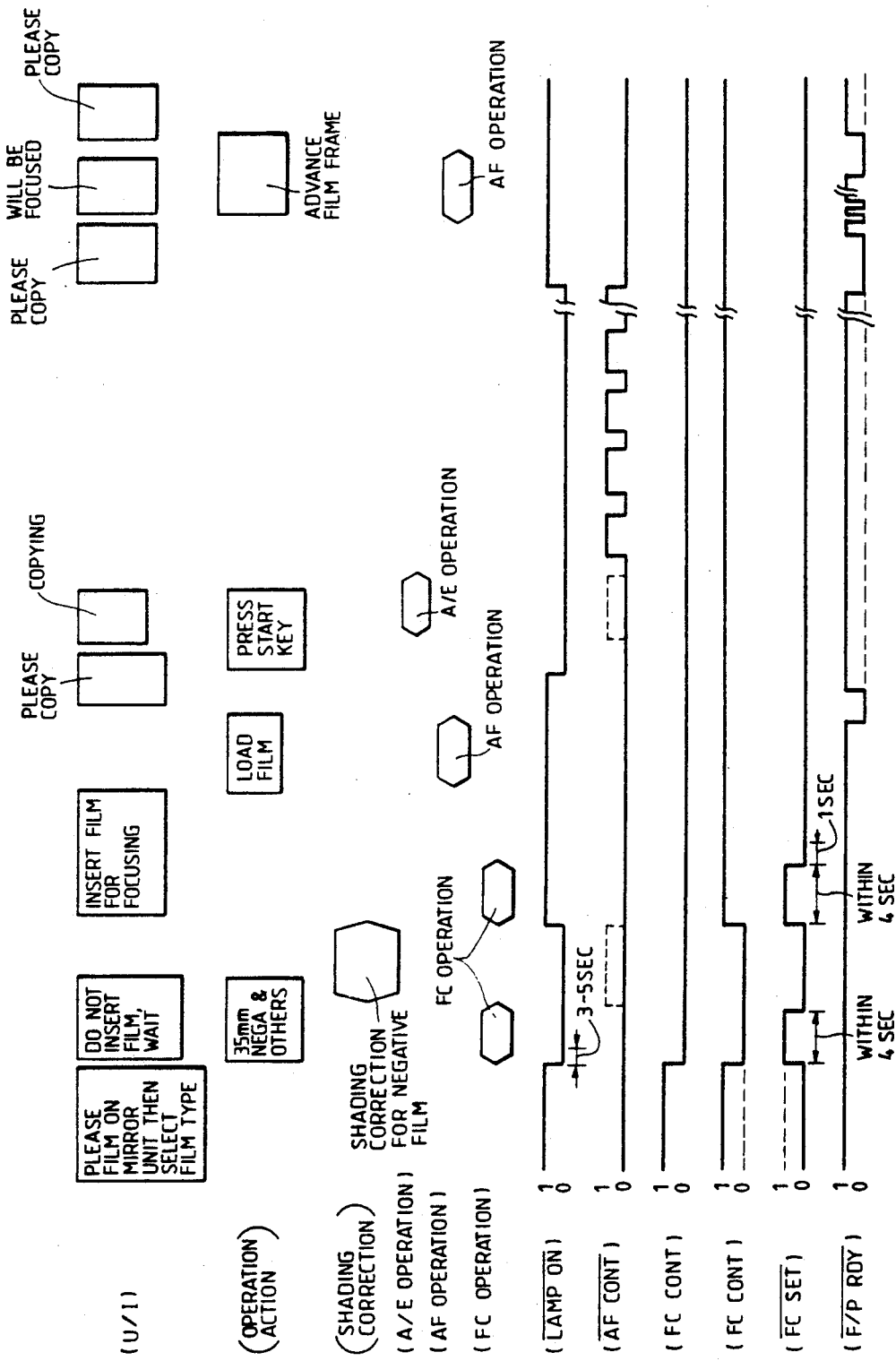
FIG. 34 shows an operation procedure and a timing chart of the operation.

The operation procedure and signal timing will be described with reference to FIG. 34. In the figure, broken lines indicate signals that may be used.

The operation of the F/P 64 is executed by the U/I 36 of the base machine 30. Specifically, by operating the F/P operation key displayed on the U/I display, the base machine 30 is placed into the F/P mode. It is assumed now that the original film is any of the three types of films and the registered films. As shown in FIG. 34, the display of the U/I 36 presents a message "Place the mirror unit, and select your film". After seeing this, an operator opens the M/U 65, and sets it at a position preset for use on the platen glass 31.

When the film select key is touched, a message "Wait while not placing the film." At the same time, the lamp 613 lights up, and the correction filter control (FC CONT) signal becomes (0, 0), and the FC operation starts. More specifically, the auto filter exchanger operates to set the positive correction filter at a preset position. When the correction filter is set, a correction filter exchange end signal (FC SET) goes LOW.

When the FC SET signal goes LOW and after 3 to 5 seconds have elapsed from the lighting of the lamp 613, the shading data collection starts for shading correction. After the shading data collection ends, the FC SET signal goes (0, 1) in logical state, and the auto filter exchanger starts to operate and set the film correction filter at the preset position. Upon triggering of shading correction, the display presents a message "Set a film for focusing." At this time, the lamp 613 is off. After seeing this message, the operator loads the film holder 607 containing the document film 633 into the F/P 64. The light from the photo diode 623 is reflected by the film, and the reflected light is received by the photo sensor 624.

When the difference between the amount of light received by the two elements of the photo sensor 624 is not 0, the motor 625 of the AF unit operates for focusing. That is, the AF operation is performed. After the focusing operation, an F/P ready (F/P RDY) signal goes LOW.

Following this, the FC SET signal goes LOW, and after one minute, the display presents a message "Ready for copy." When the start key of the U/I 36 is pushed, the display gives a message "Copy progresses". The lamp 613 is on, and after the lamp stabilizes data for the auto density adjustment is collected. Specifically, the imaging unit 37 scans the film one time to read a part or the entire of the projection image, for density adjustment, color balance adjustment, and gamma ($\Gamma$) correction.

In the full color mode, the imaging unit scans four times for copying operation. In this case, the shading correction and the density adjustment are carried out on the basis of the shading data and the automatic density adjustment data. When the copy operation ends, the lamp 613 is off and the display displays a message "Ready for Copy." Accordingly, a new copy may be made by operating the start key. To copy another image, another frame of the film is set. When the frame of the film is changed, the F/P RDY signal goes HIGH, and the display gives a message "Adjust the focus." When the new frame is set, the AF operation is performed. At the same time, the signal F/P RDY goes LOW, and a message "Ready for copy" is displayed. Then, the start key may be pushed to again start the copying operation.

Figure 35:
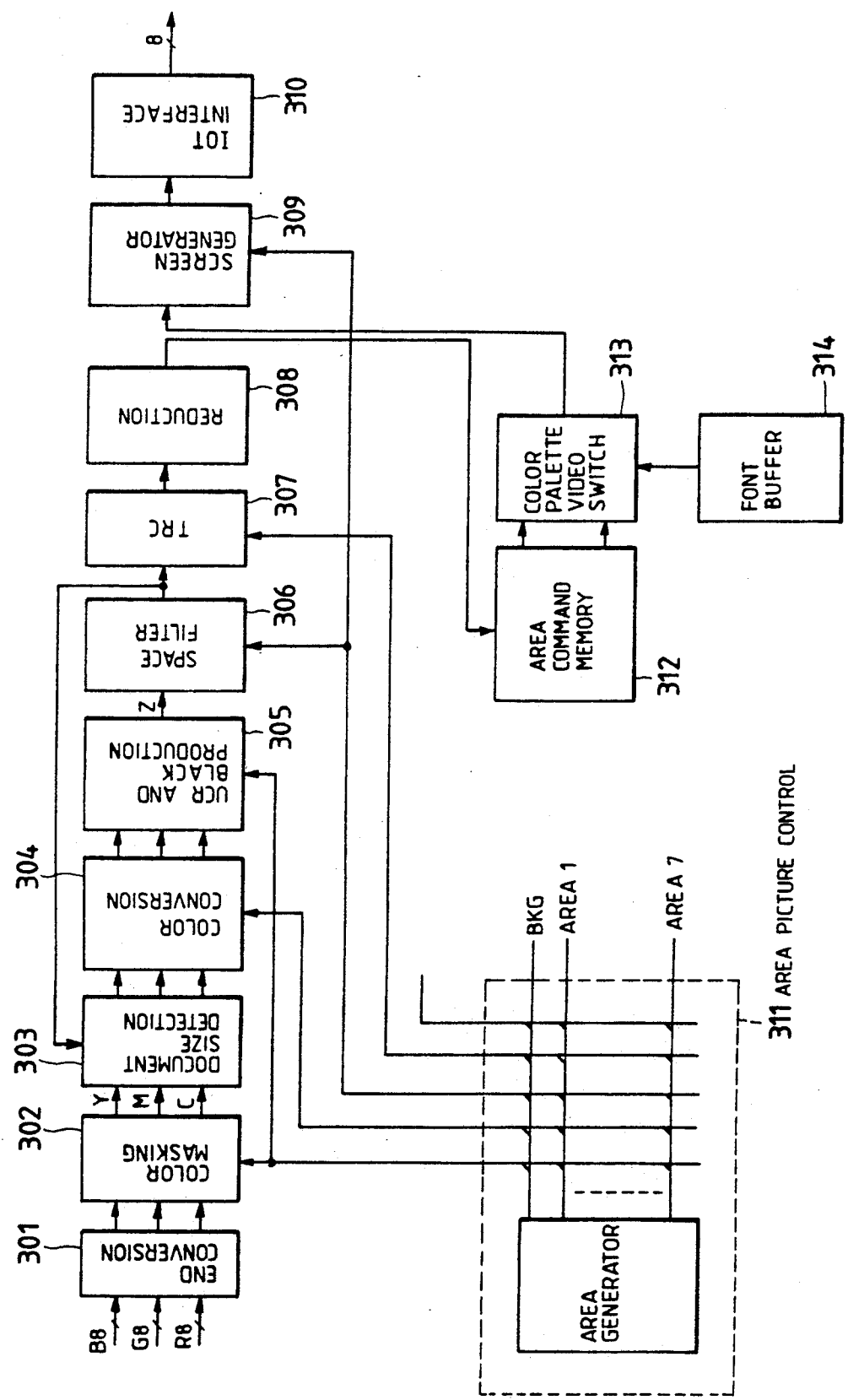
FIG. 35 shows a module configuration of the IPS.

FIG. 35 shows an arrangement of IPS modules in the image processing system (IPS). In the color image forming apparatus, the IIT (image input terminal) reads a color image on an original in the form of the primary colors B (blue), G (green), and R (red) by using the CCD image sensor, and converts these signals to primary toner colors of Y (yellow), M (magenta), C (cyan), and K (black or tusche), and the IOT (image output terminal) performs the exposure by the laser beam and development to reproduce the original color image. In this case, the four separated toner images of Y, M, C, and K are used. A copy process (pitch) is performed one time using the process color of Y. Subsequently, the copy processes will be performed for the remaining process colors M, C, and K. A total of four copy cycles are executed. These four images consist of mesh points and are superposed to reproduce a single color image of the full color. Accordingly, when the separated color signals of B, G, and R are converted into toner signals of Y, M, C and K, there is a problem of determining the color balance, reproduction of colors in accordance with the read characteristic of the IIT and the output characteristic of the IOT, adjustment of the balance of density and contrast, adjustment of the emphasis and blur of the edge, and adjustment of Moire.

The IPS receives the separated color signals of B, G, and R, processes these signals to improve the reproducibility of colors, tone, and definition, converts the toner signals of the developing process colors into on/off signals, and outputs them to the IOT.

As shown in FIG. 35, the IPS is made up of an END (equivalent neutral density) conversion module 301, color masking module 302, original size detect module 303, color conversion module 304, UCR (under color removal)/black generating module 305, spatial filter 306, TRC (tone reproduction control) module 307, reduction/enlargement processing module 308, screen generator 309, IOT interface module 310, area image control module 311 including an area generator and a switch matrix, and an edit control module including an area command memory 312, color palette video switch circuit 313, and font buffer 314.

In the IPS, the 8-bit data (256 gray levels) on each of the separated color signals B, G and R is applied to the END conversion module 301. The module 301 converts the data into the toner signals of Y, M, C, and K. A process color toner signal X is selected, and is digitized. The digitized signals are transferred, as the on/off data of the process color toner signals, from the IOT interface module 310 to the IOT. Accordingly, in the case of full color copying (4 colors), the prescan is executed to detect an original size, an edit area, and other necessary information of the original. Then, a first copy cycle is executed using Y as the toner signal X of the process color. Then, a second copy cycle is executed using M for the toner signal X. Subsequently, copy cycles will be executed for the remaining process colors. A total of four copy cycles are repeated.

In the IIT, the color components of R, G, and B of the image are read by using the CCD sensor with the size of one pixel of 16 dots/mm. The IIT outputs the read signals as the data of 24 bits (3 colors × 8 bits; 256 gray levels). B, G, and R filters are laid on the upper surface of the CCD sensor with the density of 16 dots/mm and a total length of 300 mm. The CCD sensor scans 16 lines/mm at the process speed of 190.5 mm/sec. Accordingly, the sensor produces the read data at the rate of about 15M pixels/sec for each color. The ITT log converts the analog data of B, G, and R pixels to obtain the density data from the reflectivity data, and then digitizes the density data.

Figure 36A:
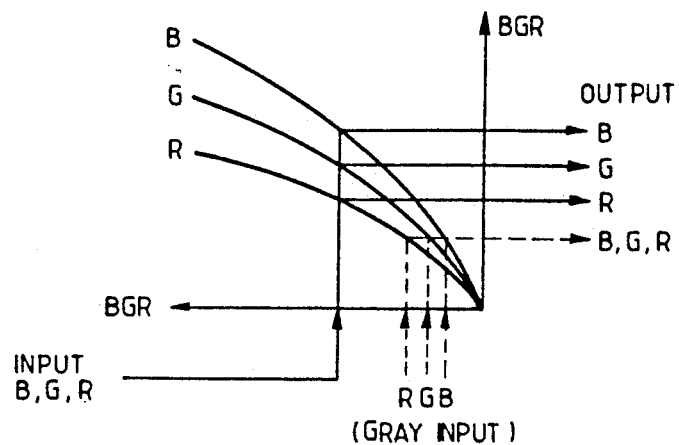
FIGS. 36(a) to 36(q) are diagrams showing the respective modules constituting the IPS.
Figure 36B:
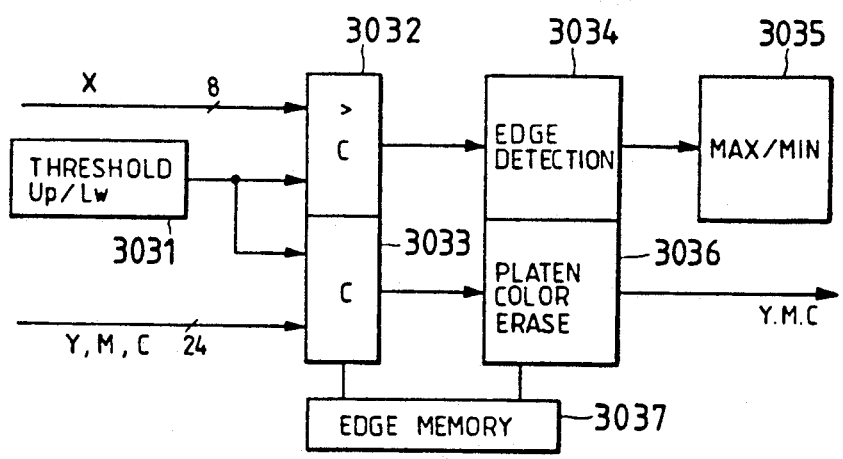
Figure 36C:
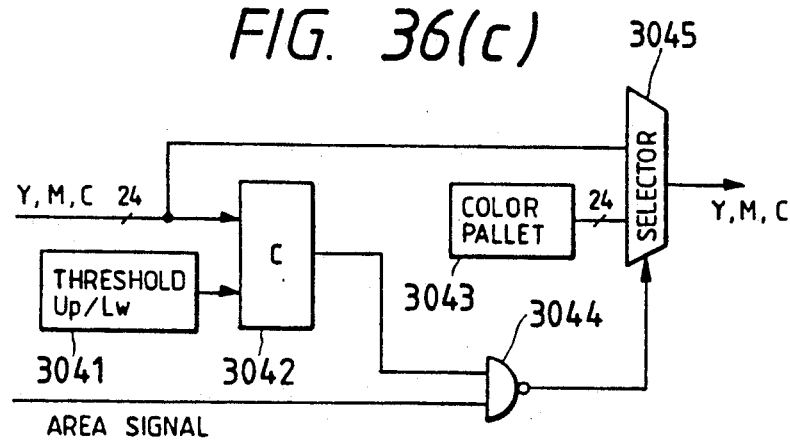
Figure 36D:
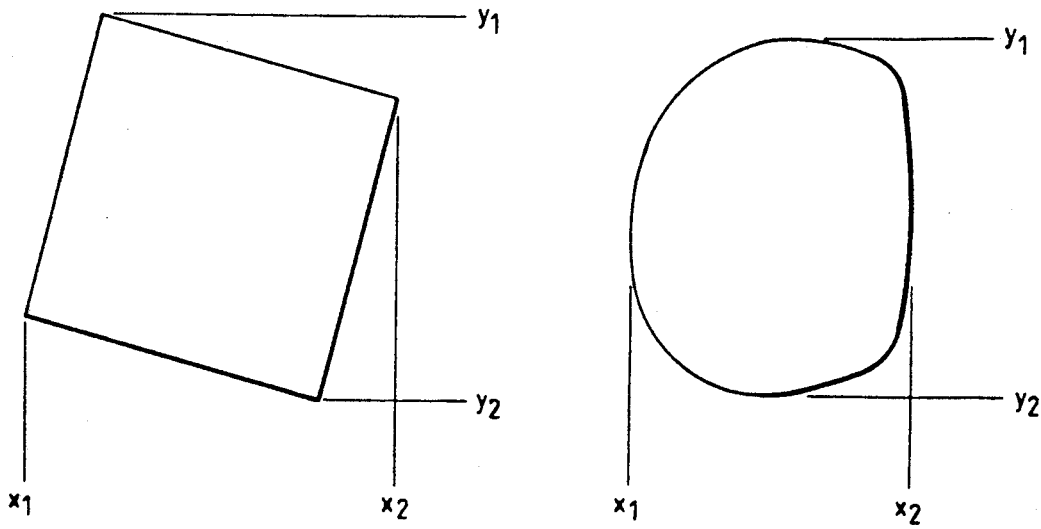

The respective modules will be described in detail. FIGS. 36(a) through 36(q) are explanatory diagrams for explaining the respective modules of the IPS.

The END conversion module 301 adjusts (converts) the optically read signal of the color original obtained by the IIT into a gray balanced color signal. The toners of the color image are equal to one another when the color is gray. The toner amount of gray is used as a reference toner amount. However, the separated color signals of B, G, and R produced from the IIT when it reads a gray document are not equal in value because the spectral characteristics of the light source and the color separation filter are not ideal. The unbalanced color signals are balanced by using a converting table (LUT: look up table) as shown in FIG. 36(a). This balancing work by the LUT is the END conversion. When a gray original is read, the LUT converts the B, G, and R color separated signals into signals of equal gradation in accordance with a level (black→white) of the gray signal. The LUT depends on the characteristics of the IIT and 19 LUTs may be used. Of those LUTs, 16 tables are for the film projectors including negative films. 3 tables are for copy, photograph, and generation copy.

The color masking module 302 converts the B, G, and R color signals into signals indicative of toner amounts of Y, M, and C, respectively, through a matrix operation. This conversion is applied to the signals after they are subjected to the gray balance adjustment by the END conversion.

In this instance, the conversion matrix for the color masking is a 3×3 matrix exclusively used for converting the B, G, and R into Y, M and C. A matrix capable of dealing with BG, GR, RB, B2, G2, and R2, in addition to B, G, and R may also be used. Any other suitable matrix may be used, if necessary. Two sets of matrices are used, one for an ordinary color adjustment and the other for emphasis signal generation in the monochromatic color mode.

Thus, when the video signal from the IIT is processed by the IPS, the gray balance adjustment is first conducted. If it were to follow the color masking process, the gray balance adjustment using the gray original would have to allow for the characteristics of the color masking, making the conversion table more intricate.

Originals that can be copied include not only standard size documents, but also patched up documents and others. To select paper of a proper size corresponding to the size of an original, it is necessary to detect the original size. In case that the paper size is larger than the original size, if the peripheral region of the original is masked, the resultant copy is excellent. For this reason, the original size detection module 303 detects the original size at the time of scanning and suppresses the platen color (edge suppress) at the time of scanning to read the original image. Accordingly, color, for example, black, that is clearly distinguished from the original is used for the platen color. The upper limit value and lower limit value for platen color discrimination are set in a threshold register 3031, as shown in FIG. 36(b). At the time of prescan, the signal is converted (gamma ($\Gamma$) conversion) into a signal X representing the data approximate to the reflectivity of the original (by using the spatial filter 306 to be given in detail). The signal X is compared with the upper/lower limit value as is set in the register 3031, by a comparator 3032. An edge detect circuit 3034 detects the edge of the original, and stores the maximum and minimum values of X and Y as coordinates into a max./min. sorter 3035.

As shown in FIG. 39(d), when the original is oblique or nonrectangular, the maximum values and the minimum values (s1, x2, y1, y2) at four points on the outline of the figure are detected and stored. At the time of scanning for reading the original, the comparator 3033 compares the Y, M, and C of the original with the upper/lower limit values in the register 3031. A platen color suppress circuit 3035 suppresses the pictorial information outside the edge, viz., the read signal of the platen, to effect the edge suppressing processing.

The color change module 305 sets up a condition that a designated color in a specific area on an original is erasable. As shown in FIG. 36(c), this module is made up of a window comparator 3042, threshold register 3041, and color palette 3053. To effect color change, the upper/lower limit values of Y, M, and C of the colors to be changed are set in the threshold register 3041. The upper/lower limit values of Y, M, and C of the converted colors are set in the color palette 3043. According to an area signal applied from the area image control module, the NAND gate 3044 is controlled. When it is not a color change area, the color signals of Y, M, and C of the original are transferred without change from a selector 3045.

When the color change area is reached, and the color signals of Y, M, and C of the original are between the upper limit values and the lower limit values as set in the threshold register 3041, the selector 3045 is switched by the output signal of the window comparator 3042 and it sends the converted color signals of Y, M, and C that are set in the color palette 3043.

As for the designated color, by directly pointing an original by a digitizer, 25 pixels of B, G, and R in the vicinity of the coordinates (as designated at the time of prescan) are averaged and the designated color is recognized on the basis of the average. By the averaging operation, even in the case of an original of 150 lines, the designated color can be recognized with a precision within 5 of color difference. To the B, G, and R density data, the designated coordinates are converted into an address and the density data are read out of the IIT shading correction circuit with that address. In the address conversion, readjustment corresponding to the registration adjustment is needed, as in the case of the original size detection. In the prescan, the IIT operates in the sample scan mode. The B, G, and R density data read out of the shading RAM are subjected to a shading correction by software, and are averaged. Further, the data are subjected to END correction and color masking, and then are set in the window comparator 3042. The registered colors are selected from 1670 colors, and up to eight colors can be simultaneously registered. The reference color prepared include a total of 14 colors, Y, M, C, G, B and R, colors between these colors, and K and W.

When color signals of Y, M, and C having equal quantities are combined, gray is produced. Theoretically, the same color can be obtained by replacing the colors of Y, M, and C of equal quantities with black. In this case, however, the color is impure and hence the reproduced color is not fresh. To cope with this problem, the UCR/black generation module 305 generates a proper amount of K to prevent such a color impurity, and equally reduces the toner colors Y, M and C, in accordance with the amount of the generated K (this process is called an under color removal (UCR). More specifically, the maximum and the minimum values of the toner colors Y, M, and C are detected. A K is generated by a conversion table in accordance with the difference between the maximum value and the minimum value. Further, the toner colors Y, M, and C are UCR processed in accordance with the generated K.

Figure 36E:
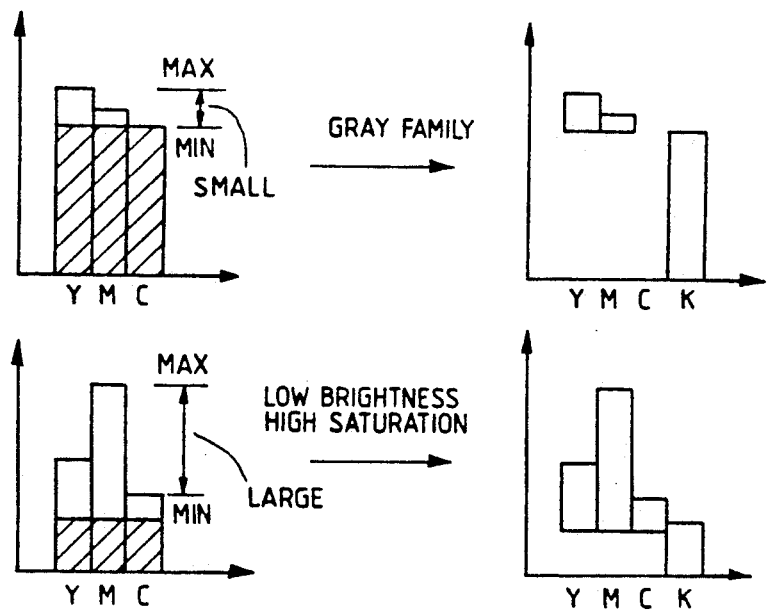

As shown in FIG. 36(e), in the case of a color closer to gray, the difference between the maximum and the minimum values is small. Accordingly, the minimum value or its near value of each color Y, M, and C is removed for generating the color K. When the difference is large, the quantities of the colors Y, M, and C to be removed are set below the minimum values to reduce the quantity of the generated K. In this way, the mixing of tusche into the pure color and the hue degradation of a low gradation, high hue color can be prevented.

Figure 36F:
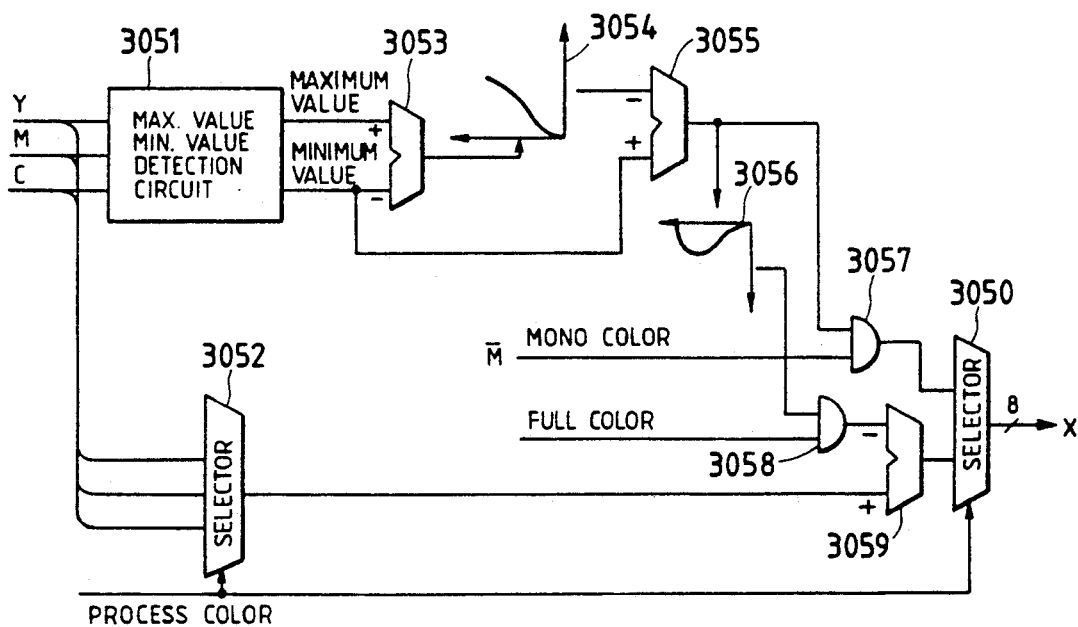

FIG. 36(f) shows a specific circuit arrangement of the UCR/black generation module, a max./min. value detector 3051 detects the maximum and the minimum values of the process colors Y, M, and C. A calculating circuit 3053 calculates the difference between the maximum and the minimum values of each color. A conversion table 3054 and another calculating circuit 3055 cooperate to generate black K. The conversion table 3054 adjusts the value of K.

When the difference between the maximum and the minimum values is small, the output signal of the conversion table is zero. Accordingly, the calculating circuit 3055 produces the minimum value as intact in the form of the value of K. When the difference is large, the output value of the conversion table 3054 is not zero, the calculating circuit 3055 subtracts the difference from the minimum value and produces the result of the subtraction as the value of K. A conversion table 3056 provides the values to be removed from the colors Y, M, and C in accordance with the K value. In cooperation with the conversion table 3056, an additional calculating circuit 3059 subtracts the values as defined by the K value from the process colors Y, M, and C. AND gates 3057 and 3058 operate for the signal K, and the signals of Y, M, and C after UCR processing in accordance with the signals in the mono color mode and the full color mode. The selectors 3052 and 3050 are used for selecting any of the toner signals Y, M, C, and K by the process color signals. A color is thus reproduced by the mesh points of Y, M, and C. Accordingly, the curves and tables that are empirically formed are used for the removal of Y, M, and C and for determining the generation ratio K.

In the color image forming apparatus incorporating the present invention, the IIT reads an image of an original while the original image is being scanned by the CCD. When the data is used intact, the resultant data is faded data. The mesh points are used for image reproduction. Accordingly, Moire occurs between the mesh point period of the printed matter and the sampling period of 16 dots/mm. The same phenomenon occurs between the mesh point period generated by the machine and that of the original. The spatial filter module 306 is provided to remove the above fading and the Moire phenomenon. For the Moire removal, a low-pass filter and for edge emphasis, a high-pass filter are used.

Figure 36G:
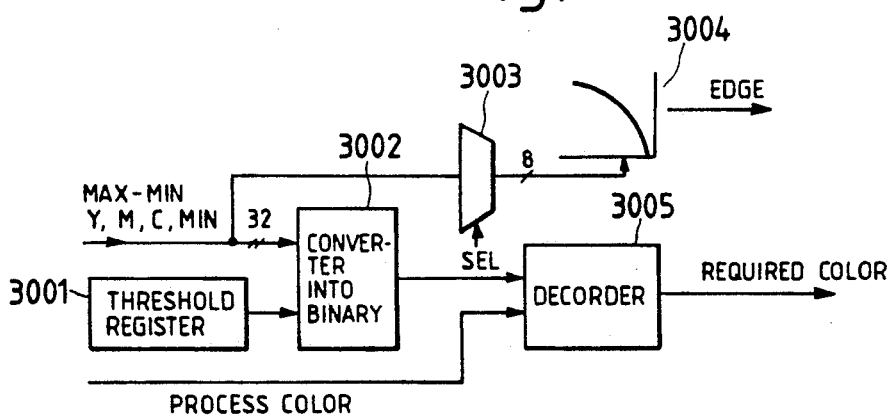

In the spatial filter module 306, as shown in FIG. 36(g), a selector 3003 selects one of the input signals Y, M, C, Min and Max-Min. A conversion table 3004 converts it into data signals approximately indicative of reflectivity. Use of this type of data makes it easy to pick up the edge data. In this instance, the selected color signal is Y. A threshold register 3001, a 40-bit digitizer 3002, and a decoder 3005 separates the color signals Y, M, C, Min, and Max-Min into eight colors, Y, M, C, K, B, G, R, and W (write), for each pixel. A decoder 3005 recognizes the hue in accordance with the digitized data signal, and produces a 1-bit data indicative of necessary process color or not.

Figure 36H:
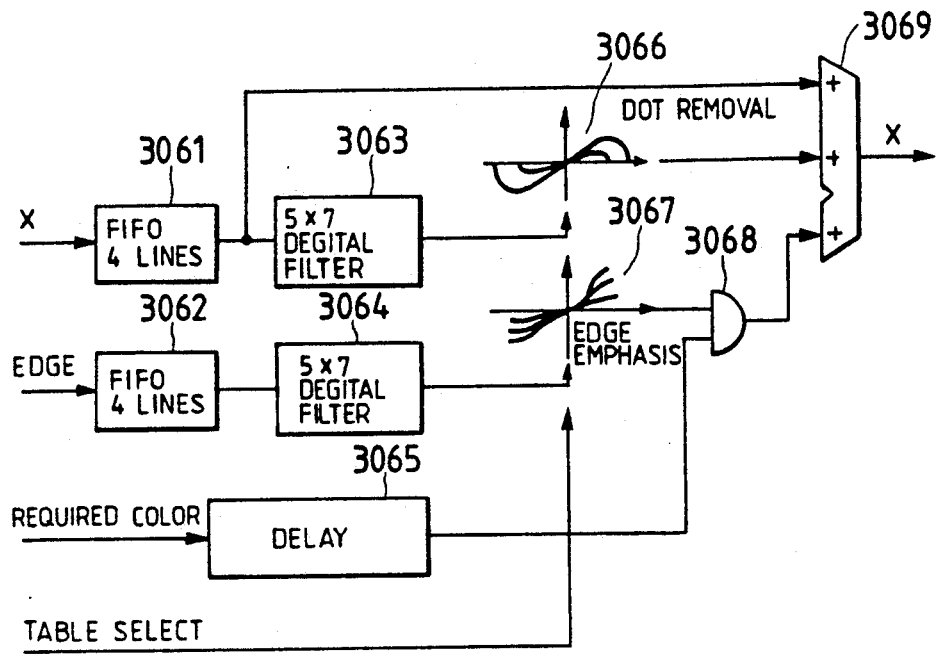
Figure 36J:
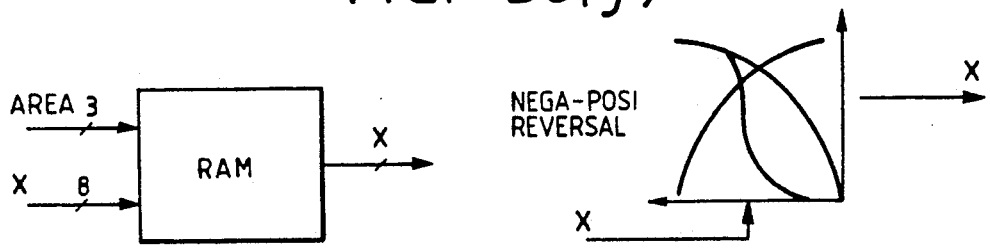
Figure 36K:
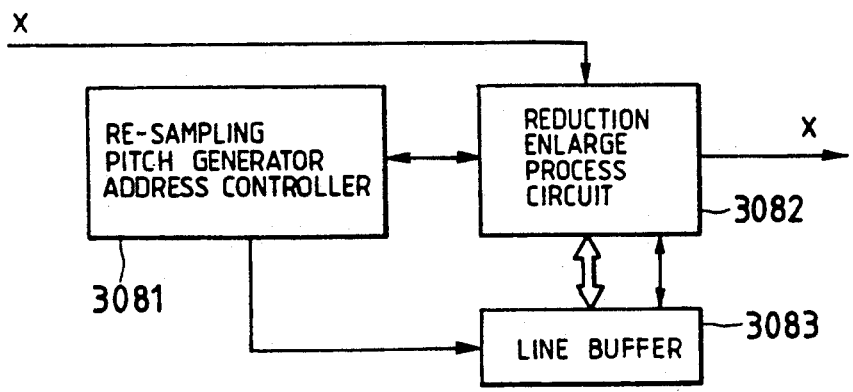

The output signal of the circuit of FIG. 36(g) is applied to a circuit of FIG. 36(h). In FIG. 36(h), a FIFO 3061, a 5×7 digital filter 3063, and a modulation table 3066 cooperate to generate the mesh-point removal data. A FIFO 3062, a 5×7 digital filter 3064, a modulation table 3067, and a delay circuit 3065 cooperate to generate edge emphasis data by using the output data of the output circuit of FIG. 36(g). The modulation tables 3066 and 3067 are selectively used in accordance with the selected copy mode, such as photograph copy, character only copy, and photo/character copy.

Figure 36I:
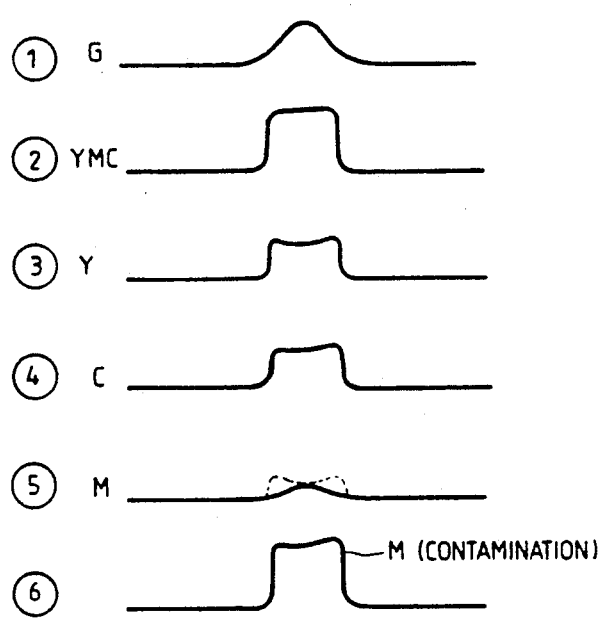

In respect with the edge emphasis, when a green character as shown in FIG. 36(i) (1) is reproduced in the form of a character (2), the colors Y and C are emphasized at the edges as indicated by waveforms (3) and (4), but the color M is not emphasized as indicated by a solid line of waveform (5). The switching for this is carried out by the AND gate 3068. In this case, if waveform (5)

indicating the color M is emphasized as indicated by the broken line, M is emphasized at the edges as shown in a waveform (6) and accordingly the color purity is lost (contamination of M). To switch the emphasis by the AND gate 3068 for each process color, the delay circuit 3065 synchronizes the FIFO 3062 with the 5×7 digital filter 3064. When a fresh green character is reproduced by using conventional image processing. the magenta M is emphatically mixed into the green character and the color purity is lost. To solve this, the spatial filter module, when recognizing green, outputs the colors Y and C in an ordinary manner, but outputs the magenta M for edge emphasis.

The IOT exercises the copy cycles four times using process colors of Y, M, C, and K in accordance with an on/off signal derived from the IPS (in the case of the full color copy). With this, reproduction of a full color original is realized. Actually, however, to exactly reproduce the colors theoretically obtained through the signal processing, delicate and careful adjustment is required to take the characteristics of the IOT into consideration. The TRC conversion module is used to improve the color reproduction. An address conversion table containing various combinations of Y, M, and C which is accessed with 8-bit image data is stored in the RAM, as shown in FIG. 36(j). With use of such a table, functions such as density adjustment, contrast adjustment, negative/positive inversion, color balance adjustment, character mode, and transparent composition, may be exercised in accordance with an area signal. The bits 0 to 3 of the area signal are assigned to the upper four bits of the RAM address. In an out-of-area mode, the above functions may be appropriately combined. In this instance, the RAM has a memory capacity of 2K bytes (256 bytes×8 planes), and eight conversion tables. During the IIT carriage return, a maximum of 8 conversion tables are stored for every cycle of Y, M, and C. These tables are selectively used in accordance with an area designation and the copy mode used. If the memory capacity of the RAM is increased, there is no need for storing the tables during every cycle.

Figure 36L:
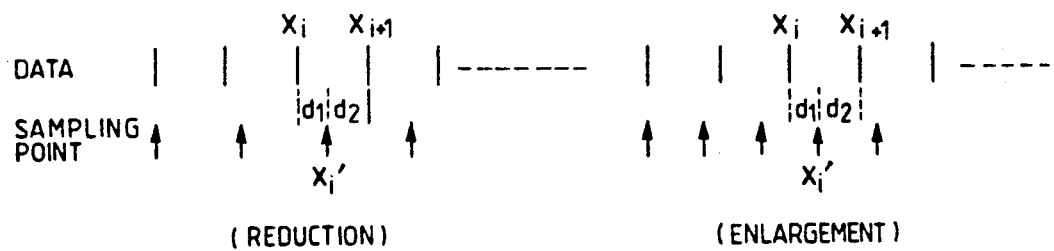
Figure 36M:
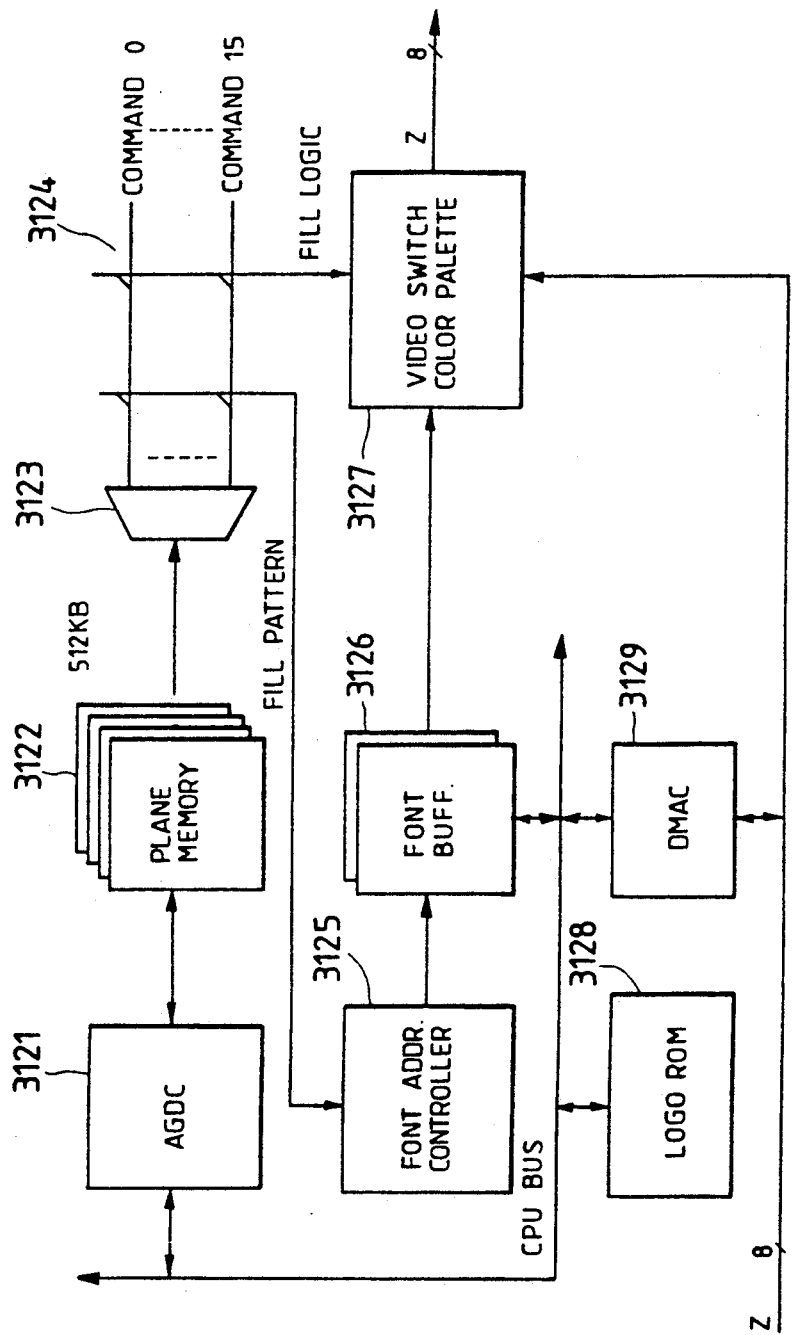

The reduction/enlargement module 308 exercises the reduction/enlargement processing by a reduction/enlargement processor 3082 during the period that data X is temporarily stored in a line buffer 3083 from which it is transferrered, as shown in FIG. 36(k). A resampling generator/address controller 3081 generates a sampling pitch signal and a read/write address for the line buffer 3083. The line buffer 3083 serves as a ping-pong buffer of two lines in which line data is read out of one of the lines, while at the same time the next line data is written into the other line. The reduction/enlargement processing in the main scan direction is digitally processed by the reduction/enlargement module 3082. For the reduction/enlargement in the vertical scan direction, the scan speed of the IIT is appropriately varied. The scan speed is varied in the range from 2 times to ¼ time, to vary the magnification from 50% to 400%. In digital processing, when the data is transferred to and from the line buffer 3083, the reduction is based on a thinout interpolation, while the enlargement is based in an additional interpolation. When the data lies between the adjacent sampling points, interpolation data is obtained by weighing the in-between data in accordance with the distances of that data to the data located on both sides, as shown in FIG. 36(l). If the data is $X_i'$, for example, the following calculation is made, $$(X_i \times d_2) + (X_{i-1} \times d_1)$$

where $d_1 + d_2 = 1$. and $d_1$ and $d_2$ are distances from a sampling point to the data $X_i$ and $X_{i+1}$ on both sides of the data $X_i'$.

In the reduction processing. data is loaded into the line buffer 3083 while interpolating the data. At the same time, the reduced data in the previous line is read out of the buffer, and sent to the succeeding stage. In enlargement processing, the data is loaded into and temporarily stored in the line buffer, while the data is interpolated for enlargement while reading the previous line data out of the line buffer. When the interpolation for enlargement is conducted at the time of writing, a clock frequency must be increased in accordance with magnification. Such an enlargement process, however, allows the same clock to be used for both the read and write operations. Further, shift image processing in the main scan direction is possible by reading data at a midpoint between one read timing and the next read timing or by delaying the read timing. The repetitive processing is possible by repeatedly reading data. The mirror image processing is also possible when data is read out in the reverse direction.

A screen generator 309 converts a gradation toner signal of each process color into an on/off or binary toner signal. In the screen generator, the digitizing processing and the error diffusion processing are conducted by comparing a threshold matrix with the gradated data. The IOT receives the binary toner signal, and turns on and off a laser beam to reproduce a halftone image. In this case, the laser beam is elliptically shaped in cross section with its geometry of about 80 μm long and about 60 μm wide. These figures are selected so as to satisfy the recording density of 16 dots/mm.

Figure 36N:
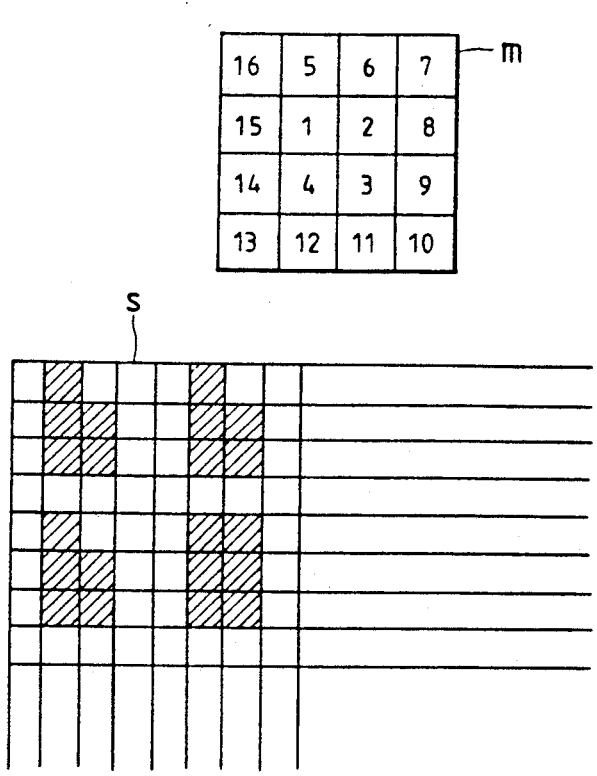

How to express gradation will first be described. and the description to follow is directed to forming halftone cells each of 4×4, for example, as shown in FIG. 36(n). To form the cells, the screen generator sets up a threshold matrix "m" corresponding to such a halftone cell. Then, it compares the matrix with the gradated data. If the value of data is "5," the screen generator generates signals that are turned on in the squares of the matrix "m" whose figures are less than "5."

Figure 36O:
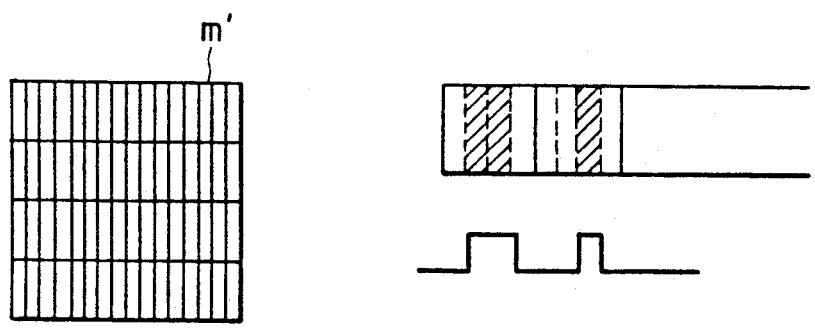

The 4×4 halftone cell of 16 dots/mm is generally called a mesh point of 100 psi and 16 gradations. If an image is depicted by such mesh points, the image reproduction is poor. In the present invention, to increase the gradations, the 16 dots/mm pixel is further divided into four in the vertical direction (main scan direction). Accordingly, the laser beam is turned on and off at distances of ¼ unit, viz., at 4-times the frequency, as shown in FIG. 36(o). The gradation attained is four times that of conventional gradation expressing methods. To this end, a threshold matrix "m'" as shown in FIG. 36(o) is set up in the present invention. Further, if a submatrix method is used, the number of lines will effectively be increased.

Figure 36P:
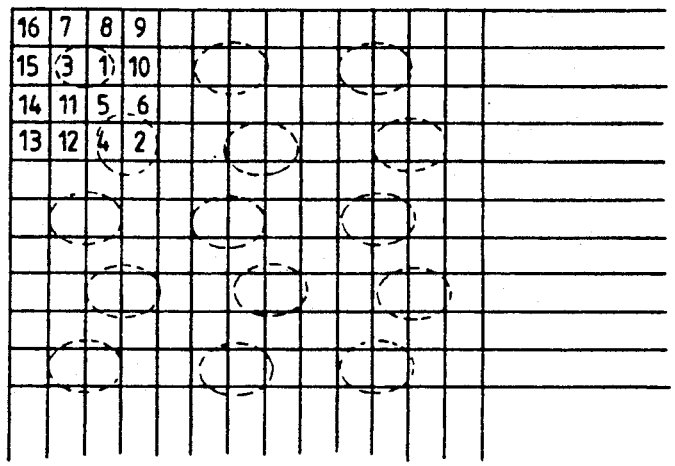
Figure 36Q:
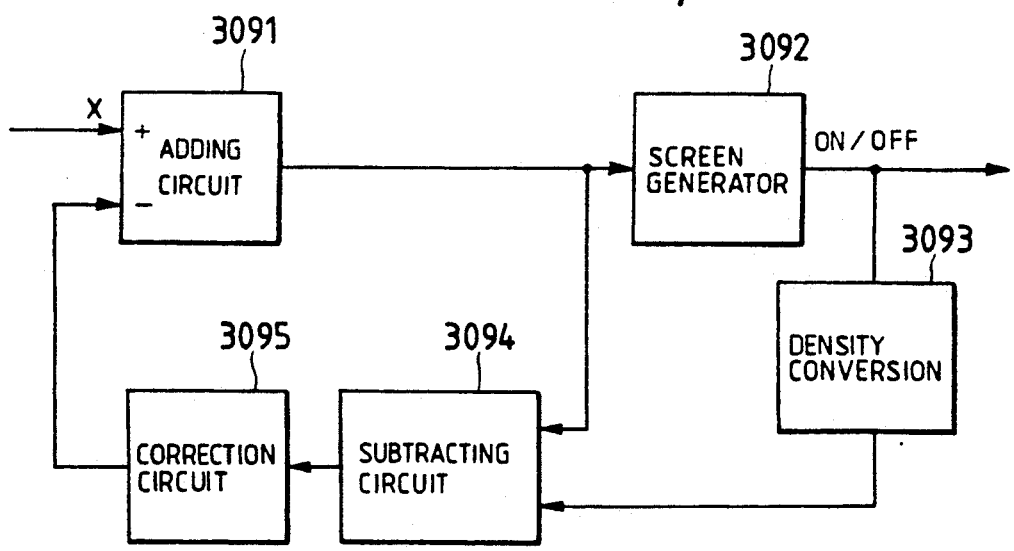

The above instance uses the threshold matrices "m" of the type in which the center portion of each halftone cell is used as a sole growth nucleus. In the submatrix method, a pixel consists of a plurality of unit matrices. Each matrix has two growth nuclei or more, as shown in FIG. 36(p). If such a screen pattern design method is used, the number of lines and the gradation may be changed in accordance with bright or dark portions, in such a way that 141 psi and 64 gradations are used for bright portions, and 200 psi and 128 gradations, for dark portions. Such a pattern may be designed while visually judging smoothness in gradation, definition, graininess, and the like.

When the halftone image is reproduced by using the above dot matrix method, the gradation or gray level and the resolution contradictorily coexist. For example, if the gray level is increased, the resolution becomes poor. On the other hand, if the resolution is increased, the gray level is decreased. If small threshold data matrices are used, the actually outputted image suffers from quantification error. The error diffusion processing is to improve the gradation reproducibility in such a manner that the quantification errors (the on/off or binary signal generated by a screen generator 3092) and the input gradation signal are detected by a density converting circuit 3095 and adder 3091, and are fed back by using a correction circuit 3095 and an adder 3091. For example, the corresponding position of the previous line and the pixels on both sides of it are convoluted through a digital filter.

The screen generator changes over the threshold error and a feedback coefficient for the error diffusion processing every original or area in accordance with the type of image, such as halftone images and character images. In this way, the reproduction of images of high gradation and high definition is improved.

In the area image control module 311, seven rectangular areas and a priority order can be set in an area generator. Control data relating to the respective areas are set in a switch matrix. The control data includes data of color change and a color mode indicative of monochromatic color or full color, modulation select data of photograph, characters, and the like, select data of TRC, select data of the screen generator, and the like. The control data is used for controlling the color masking module 302, color conversion module 304, UCR module 305, spatial filter 306, and TRC module 307. The switch matrix may be set by software.

The edit control module executes outline-drawing processing in which an original bearing a circular figure, such as a circular graph, not a rectangular figure is read, and a specified area of indefinite configuration is painted with specified color. As shown in FIG. 36(m), a CPU bus is clustered with an AGDC (advanced graphic digital controller) 3121, font buffer 3126, logo ROM 3128, and DMAC (DMA controller) 3129. The CPU writes an encoded 4-bit area command into a plane memory 3122 through the AGDC 3121, and the font is loaded into the font buffer 3126. The plane memory 3126 consists of four memory planes. Each point on an original can be set by 4 bits of planes 0 to 3 in such a manner that for "0000," a command 0 is used to output an original. A decoder 3123 decodes the 4-bit data into commands 0 to 15, and a switch matrix 3124 converts the commands 0 to 15 into commands to make jobs of fill pattern, fill logic, and logotype. A font address controller 3125 generates an address of a font buffer 3126 in accordance with a pattern such as mesh point shade and hatching shade, by using a 2-bit fill pattern signal.

A switch circuit 3127 selects one of document data X, font buffer 3126 and color palette in accordance with a fill logic signal of the switch matrix 3124 and the contents of the original data X. The fill logic is used to fill only the background of an original with a color mesh, to change the color in a specific portion of the image to another color, to mask or trim a specific portion of the image, and to fill specific image portions with a color.

As seen from the foregoing description, in the IPS, the read signals from the IIT are subjected to END conversion, and the color masking process. The read signals are further subjected to edge suppress and color change, and the under color removal process. A tusche color is generated. The read signals are then converted into the process colors. In the case of the processings, such as spatial filter, color modulation, TRC, and reduction/enlargement, it is better to use the process color data rather than to use the full color data because the amount of processed data is small, and hence the number of the used conversion tables may be reduced to $\frac{1}{3}$. Accordingly, more varieties of the conversion tables may be used to improve the reproducibility of colors, gradation, and definition.

Figure 37A:
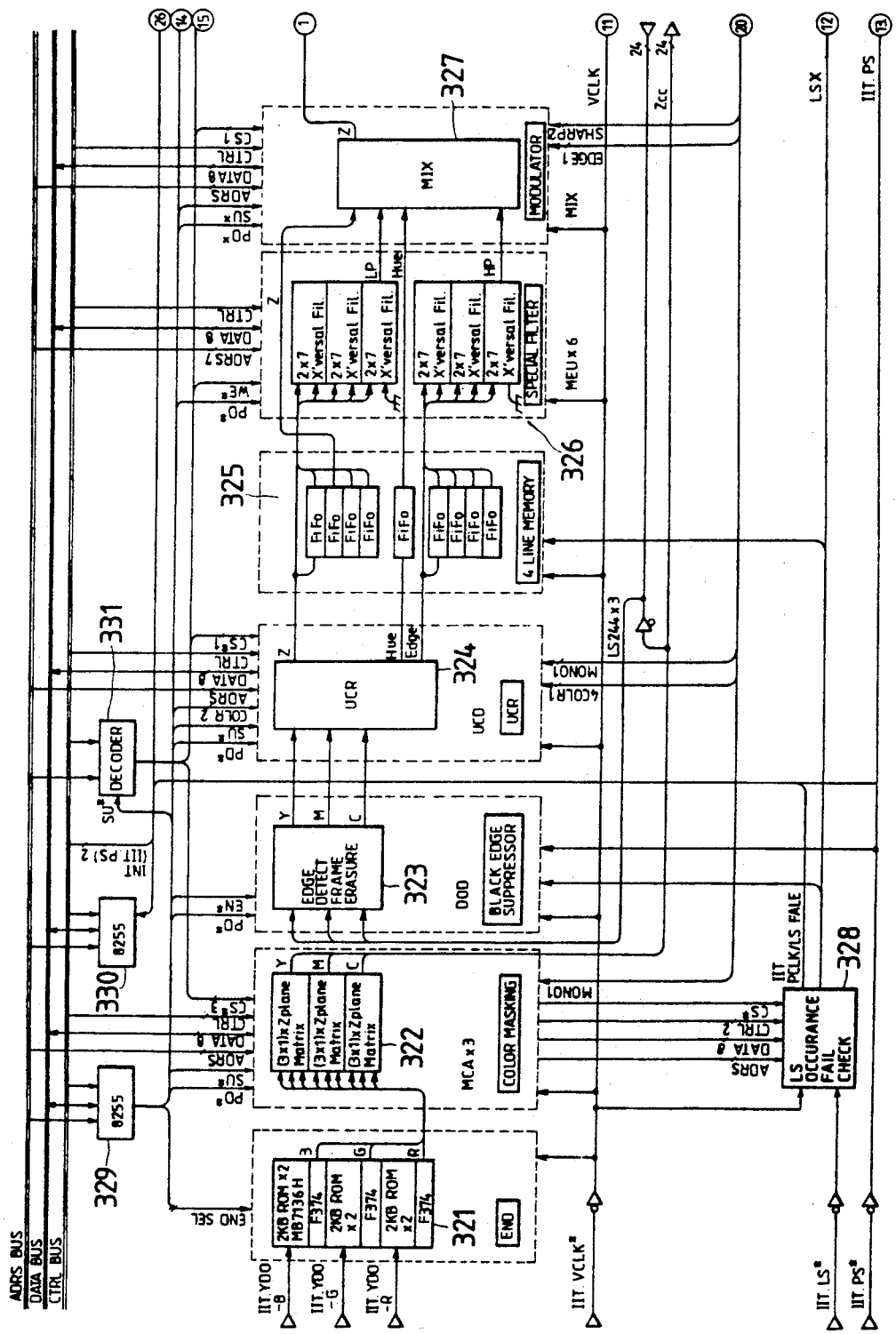
Figure 37B:
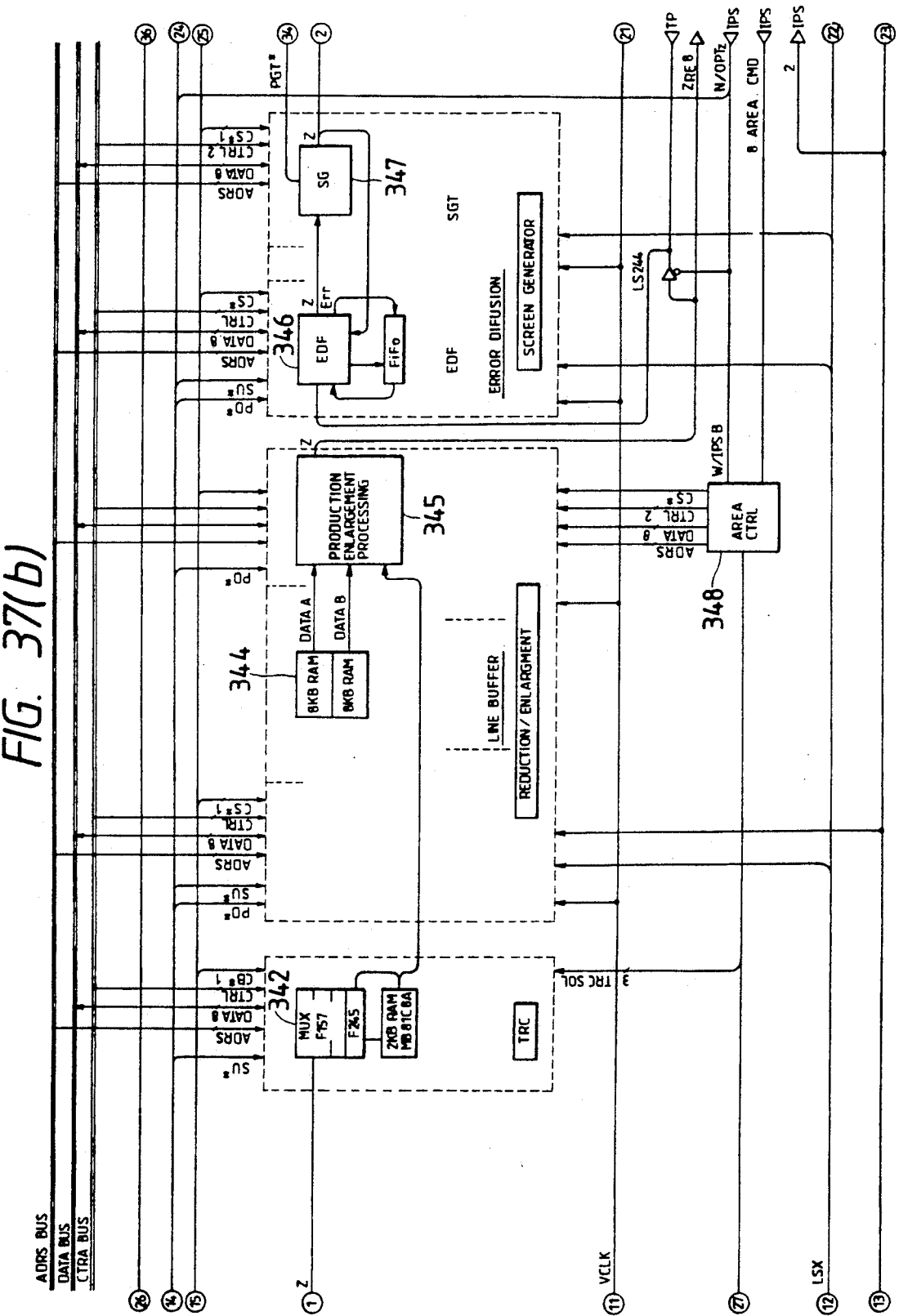
Figure 37C:
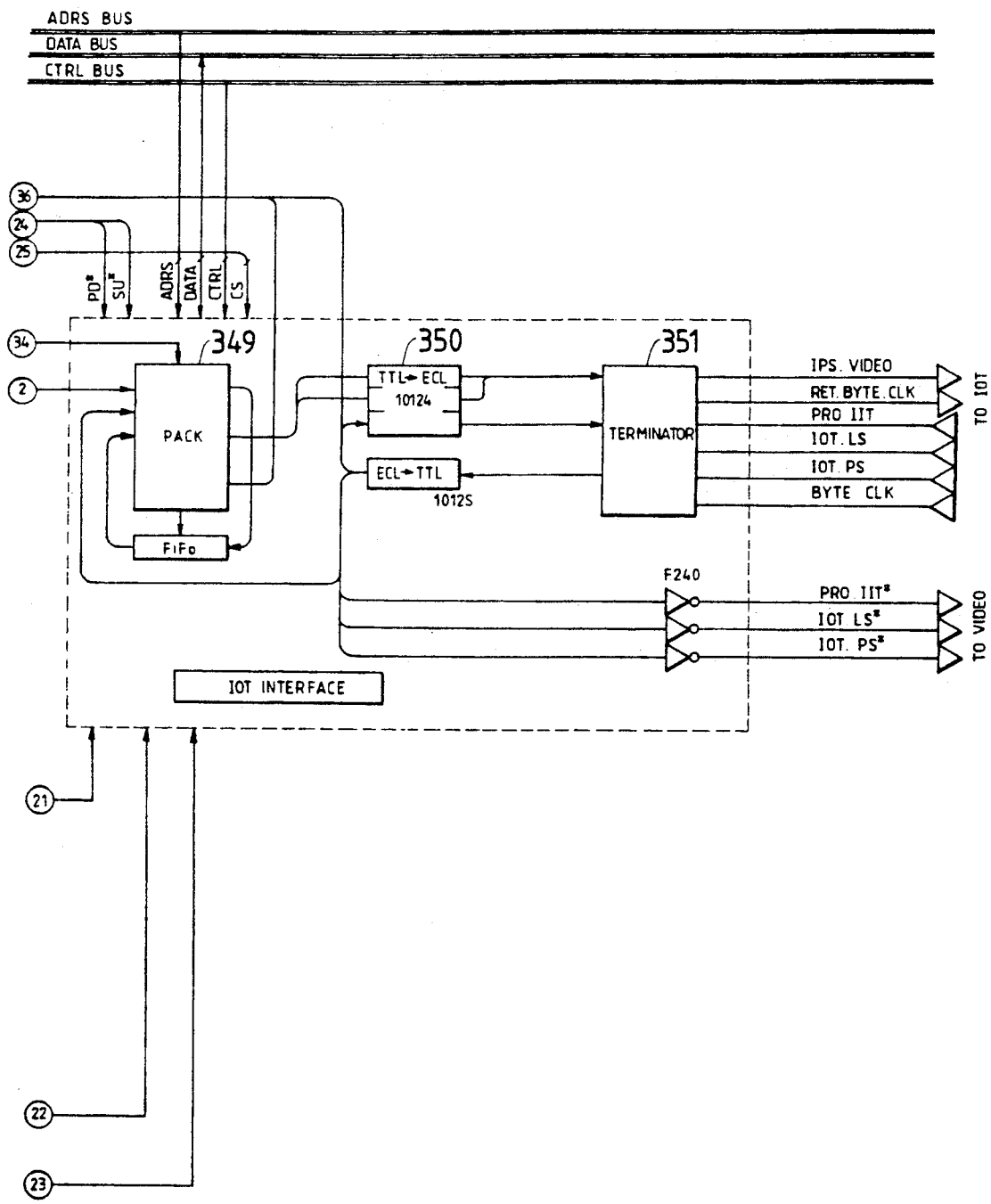

FIGS. 37(a) to 37(d) show a hardware configuration of the IPS. The circuitry of the IPS is divided into two circuit boards IPS-A and IPS-B. The circuit board IPS-A contains circuitry for exercising the basic functions of the color image forming apparatus, such as reproductions of colors, gradation, and definition. The second circuit board IPS-B contains circuitry for exercising applications and professional work, such as edit work. An arrangement of the circuitry contained in the first circuit board IPS-A is as shown in FIGS. 37(a) to 37(c). A circuit arrangement contained in the second circuit board IPS-B is as shown in FIG. 37(d). During the course of using the copier as the color image forming apparatus of the preferred embodiment, there will inevitably occur user demands for additional and new applications and profesional work. The copier may flexibly cope with such demands by merely modifying and altering only the circuitry of the second circuit board IPS-B, because the basic functions of the copier are secured by the circuitry of the first circuit board.

The IPS board is coupled with CPU buses including an address bus ADRSBUS, data bus DATABUS, and control bus CTRLBUS. The board is also coupled with video data B, G, and R from the IIT, video clock IIT VCLK as a sync signal, line sync signal (the main scan direction and the horizontal sync) IIT IS, and page sync (vertical scan direction, vertical sync) IIT PS.

The video data is pipeline processed in the stage after the END converting unit. Accordingly, the video data is delayed by a delay amounting to the number of clocks required for the respective processing stages in the pipeline processing. A line sync generator/fail check circuit 328 is provided for generating and distributing horizontal syn signals to meet a delay, and for the fail check of the video clock and the line sync signal. Therefore, the line sync signal generator/fail check circuit 328 is coupled with the video clock IIT VCLK and the line sync signal IIT IS. To change the settings of the circuit 328, it is coupled with the CPU buses (ADRSBUS, DATABUS and CTRLBUS), and a chip select signal CS.

The video data B, G, and R from the IIT are applied to the ROM 321 in the END converting unit. The END conversion table may be loaded into a RAM, for example, under control of the CPU. Actually, however, when use of the copier progresses it is unlikely that the END table must be altered when the image data is being processed. For this reason, two 2K byte ROMs may be used for each of the END conversion tables of B, G, and R. That is, a LUT (look-up table) system using the ROMs and 16 conversion tables may be provided and selectively used by a 4-bit select signal ENDSel.

The END converted data signal generated by a ROM 321 is coupled with a color masking unit made up of a calculation LSI 322 having several planes of a 3×2 matrix for each color. The calculation LSI 322 is coupled with the CPU buses, and the coefficients of the matrices may be set in the calculation LSI 322 from the CPU. The LSI 322 is coupled with a set-up signal SU and a choice select signal CS. These signals are used for connecting the calculation LSI 322 that processed the image signals to the CPU buses so as to allow the CPU to reprogram the settings in the LSI 322. A 1-bit select signal MONO is coupled with the calculation LSI 322 for selection of the matrices. The LSI 322 further receives a power down signal PD. When no scan is made in the IIT, viz., no image processing is performed, the internal video clock is stopped by the power down signal PD.

Those signals of Y, M, and C that have been converted from the color image signals B, G, and R by the LSI 322, are applied to a color change LSI 353 in the second circuit board IPS-B shown in FIG. 37(d). Here, the colors of these signals are changed, and applied to a DOD LSI 323. The color change LSI 353 contains four color change circuits each including a threshold register for setting the unchanged colors, color palette for setting changed colors, and a comparator. The DOD LSI 323 contains an original edge detector, black edge suppressor, and the like.

The black edge suppressed data signal outputted from the DOD LSI 323 is applied to an UCR LSI 324. This LSI contains an UCR circuit, black generating circuit, and necessary color generators.

The LSI 324 produces a process color X corresponding to the toner color, necessary colors (Hue), and edge signal (Edge). Accordingly, this LSI also receives a process color designating signal COLR and color mode signals (4COLR, MONO).

The line memory 325 consists of two types of FIFOs. The first FIFOs are used for storing the data of 4 lines in order to transfer the signals of the process color X, necessary colors Hue, and Edge to a 5×7 digital filter 326. The second FIFOs are for adjusting the delays by the first FIFOs. The process color X and edge Edge signals of 4 lines are stored, and a total of five lines of those data signals are transferred to the digital filter 326. The data signal of the necessary color Hue is delayed by the FIFO, to synchronize it with the output data signal line of the digital filter 326, and then is transferred to a MIS LSI 327.

The digital filter 326 consists of a pair of 5×7 filters (low-pass filter LP and high-pass filter HP) consisting of three 2×7 filter LSIs. One of the 5×7 filters is used for processing the process color X, and the other, for processing the Edge data signal. The MIS LSI 327 applies the mesh-point removal and the edge emphasis to these output data signals by using the conversion tables, and these processed data signals are mixed into the process color X. The LSI 327 receives an EDGE signal and a Sharp signal for switching the conversion tables one to another.

The TRC 342 consists of a RAM of 2K bytes containing eight conversion tables. The conversion tables may be reprogrammed during the return period of the carriage before each scan. A 3-bit select signal TRSel is used for selecting any of those conversion tables. The data processed by the IRC 342 is transferred to a reduction/enlargement LSI 345 by a transceiver. In the reduction/enlargement unit, RAMs 344 of 8K bytes constitute a ping-pong buffer (line buffer). The LSI 343 generates resampling pitches, and the addresses for the line buffer.

The output data of the reduction/enlargement unit returns by way of an area memory portion in the second circuit board of FIG. 37(b). An EDF LSI 346 contains a FIFO retaining the data of the previous line, and performs error diffusion processing by using the previous line data. A signal X after error diffusion processing is outputted to an IOT interface by way of an SG LSI 347 in a screen generator unit.

In the IOT interface, the signals generated from the SG LSI 347 which are received in the form of 1-bit on/off signals are packed into an 8-bit data signal, and sent in parallel to the IOT.

In the second circuit board shown in FIG. 37(d), the data signals actually flowing in the board are for the 16 dots/mm record density. Because of this, a reduction LSI 354 reduces the data $\frac{1}{4}$ and digitizes them, and finally stores them into an area memory. An enlargement decode LSI 359 contains a fill pattern RAM 360. When reading the area data out of the area memory to generate a command, the LSI 359 expands the data into 16 dots/mm data. By using the expanded data, it generates a log address, color palette, and filter pattern. A DRAM 356, consisting of four planes, stores coded area data of 4 bits. An AGDC 355 is a controller exclusively used for controlling the area commands.

Figure 38:
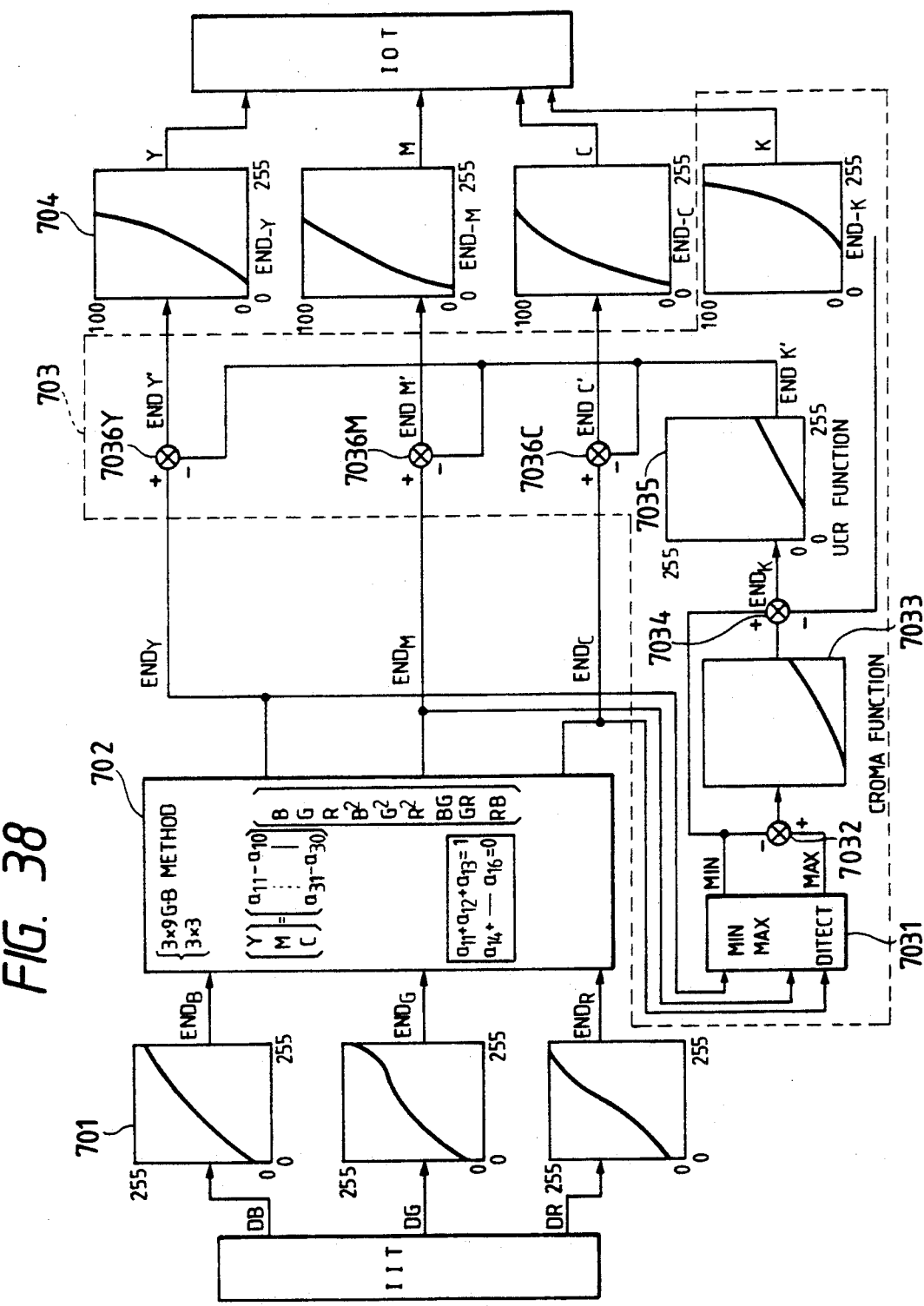
FIG. 38 shows in block form a gray balance and color correction system.

FIG. 38 shows a schematic block diagram including the color balance and the color correction systems. The color balance and the color correction systems shown in FIG. 38 are included in the overall system of the IPS that has been described with reference to FIGS. 35 to 37.

As shown in FIG. 38, the color balance and the color correction systems are made up of an END conversion circuit 701, color masking circuit 702, UCR circuit 703, and TRC circuit 704. The END conversion circuit 701 corrects variances of the spectrum of the illuminating light source of the IIT, characteristics of the dichroic mirror, and the color characteristics of the photo sensors, color filters, lenses, etc. The END conversion circuit 701 further compensates for variances of the film transmittances due to the negative/positive inversion and replacement of films by different makers. Through the above corrections, the circuit 701 provides the separated color signals ENDB, ENDG, and ENDR that are well gray balanced.

The color masking circuit 702 conducts the calculations by matrices based on the gray balancing method, such as 3×3, 3×6 and 3×9, in accordance with a proportion of the separated color signals ENDB, ENDG, and ENDR that are derived from the END conversion circuit 701. With the above matrix operation, in the full color mode, the color masking circuit 702 produces a trio of color toner signals ENDY, ENDM, and ENDC that are gray balanced. In the mono color mode, it produces a luminance signal. Also in the four pass color mode, the UCR 703 generates black K on the basis of the proportion of color toner signals ENDY, ENDM, and ENDC. Further, it subtracts the quantities of these toner signals as defined by the generated black K from the color toner signals ENDY, ENDM, and ENDC.

In the generation of the K, a max/min. detector 7031 detects the maximum values and the minimum values of those color toner signals ENDY, ENDM, and ENDC. A subtractor 7032 subtracts those maximum and minimum values one from the other, to obtain the difference between them. A value obtained through a conversion by a chroma function 7033 is made in accordance with the difference, and is subtracted from the minimum value in a subtractor 7034. In under color removal, a value obtained by converting the K by a 0CR function 7035 is subtracted from the toner signals ENDY', ENDM, and ENOC in subtrators 7036Y, 7036M and 7036C.

In the three pass color mode and the mono color mode, the generation of K and the UCR process of the toner signals ENDY, ENDM, and ENDC are not performed. Accordingly, control by-passes the UCR 703. The TRC circuit 703 determines the values of pixel data produced in response to the input pixel data on the basis of the TRC curve. The TRC circuit 704 adjusts density, contrast, and color balance, and makes the inversion by varying the TRC curve.

In the gray balance control of the preferred embodiment, the separated color signals from the IIT are subjected to the END conversion process for gray balance, and to color masking. In this way, the toner signals are formed. Further, the gray balance method is applied to the color masking process. In the UCR process, the black K is generated and the UCR process executed by using equal quantities. In this way, for gray the toner signals ENDY', ENDM' and ENDC' are constantly controlled so as to have equal quantities. When the toner signals ENDY', ENDM', and ENDC' have equal quantities, the TRC adjusts the toner signals Y, M, and C so that the IOT produces the gray. In this way, the gray balance control is conducted in the image processing system, and the reproduction of the gray in the output system is improved.

The END conversion circuit 701 and the TRC circuit 704 comprise memories storing conversion tables of the LUT type containing conversion values. The TRC circuit 704 is reprogrammable by the CPU. The color masking circuit 702 performs matrix operations. Basically, the color masking circuit 702 is arranged such that the product values are stored in the LUT conversion tables and accordingly, mere addition and subtraction of the values read out of the tables are required, viz., multiplication is not required. Use of such LUT conversion tables makes the conversion of nonlinear characteristics possible. Accordingly, the theoretical conversion values and the empirical conversion values as well may be set in the tables. The values in the memory may be altered by the CPU as well as the TRC circuit 704. Accordingly, the CPU contains basic parameters, and at the time of copy start or carriage return (back scan) of the IIT, it computes the data to be written into the memories of the TRC 704 and the color masking circuit 702, and writes it into the memories.

To execute the data writing, some conditions exist; the type of an original, viz., photograph, character, or photograph/character, and when the film projector is used, the contents of the film used. A signal for selecting these conditions is used. For the END conversion circuit 701, the CPU produces the condition select signal. For the TRC circuit 704 and the color masking circuit 702, the edit control section produces the same.

The description to follow is an elaboration of the END conversion, TRC and color masking for gray balance control.

The END conversion circuit 701 and the TRC circuit 704 consist of memories storing conversion tables of the LUT type containing conversion values. The TRC circuit 704 is reprogrammable by the CPU. The color masking circuit 702 performs matrix operations. Basically, the color masking circuit 702 is arranged such that the product values are stored in the LUT conversion tables and accordingly, mere addition and subtraction of the values read out of the tables are required, viz., the multiplication is not required. Use of such LUT conversion tables makes the conversion of nonlinear characteristics possible. Accordingly, the theoretical conversion values and the empirical conversion values as well may be set in the tables. The values in the memory may be altered by the CPU as well as the TRC circuit 704. Accordingly, the CPU contains basic parameters, and at the time of copy start or the carriage return (back scan) of the IIT, it computes the data to be written into the memories of the TRC 704 and the color masking circuit 702, and writes it into the memories. To execute the data writing, some conditions exist; the type of an original, viz., photograph, character, or photograph/character, and when the film projector is used, the contents of the film used. A signal for selecting these conditions is used. For the END conversion circuit 701, the CPU produces the condition select signal. For the TRC circuit 704 and the color masking circuit 702, the edit control section produces the same.

The description to follow is a further elaboration of the END conversion, TRC and color masking that are for the gray balance control.

Figure 39:
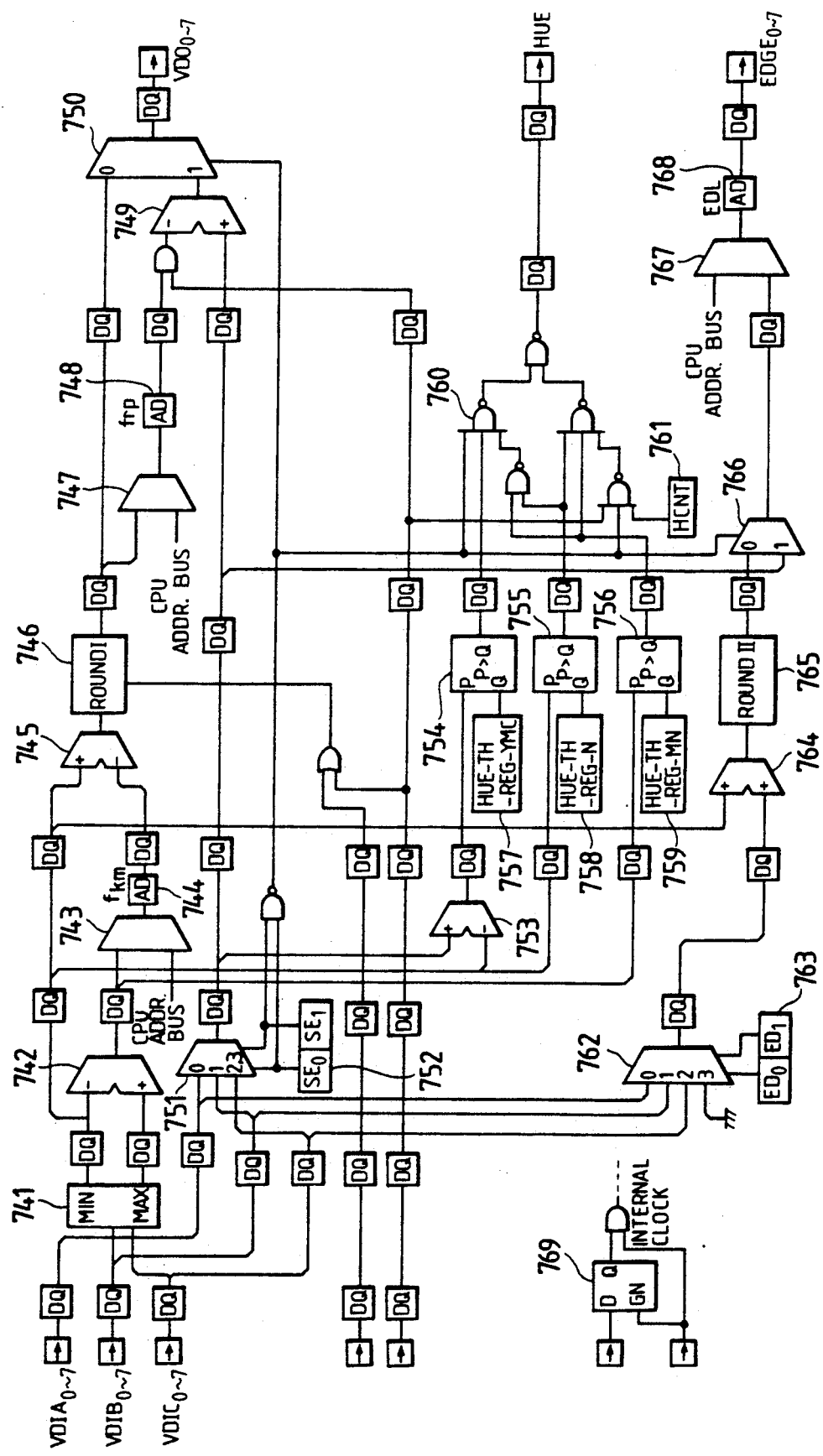
FIG. 39 is a diagram for showing an example of a circuit arrangement of the UCR circuit, the hue detection circuit, and the edge signals producing circuit.
Figure 40:
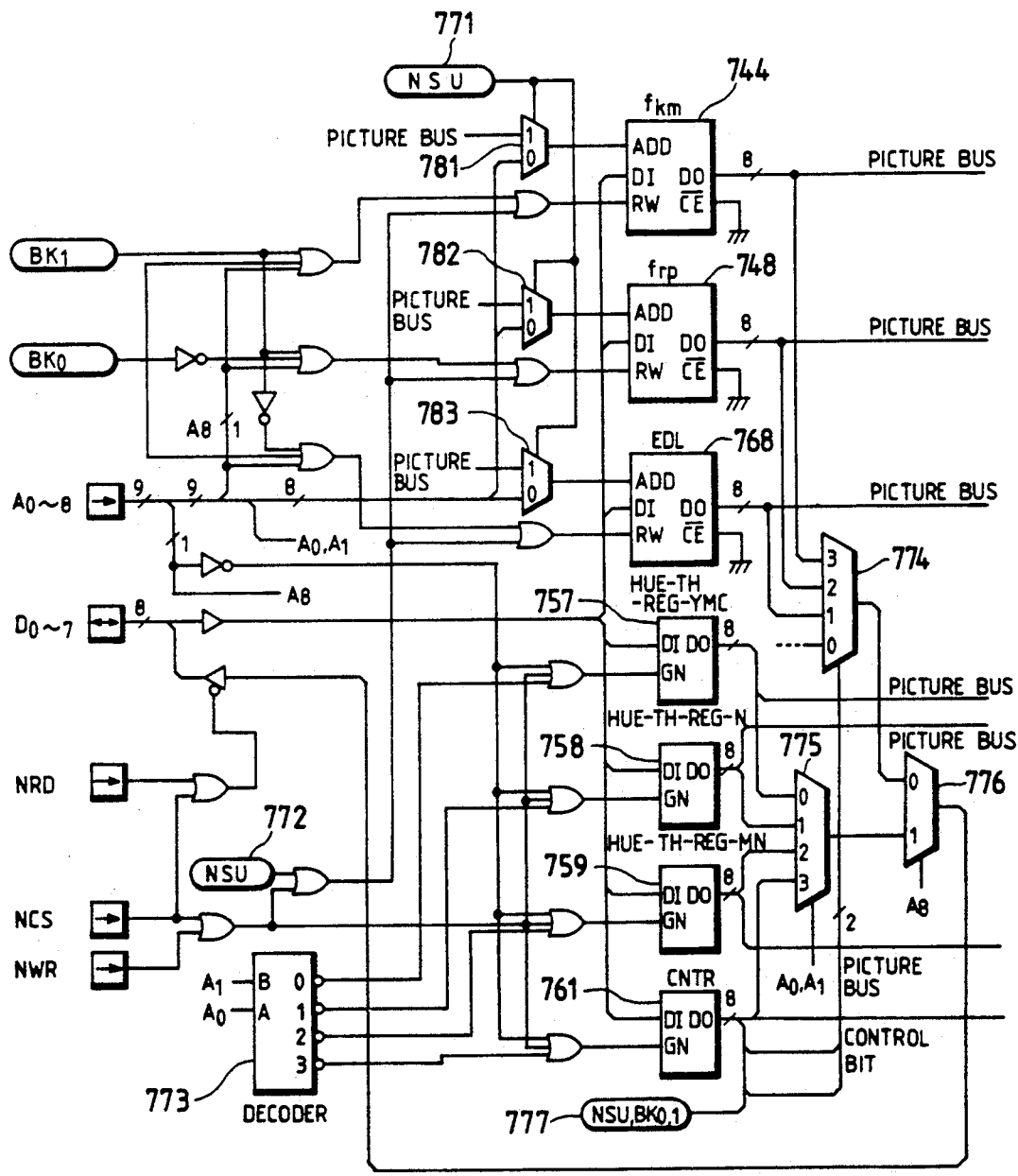
FIG. 40 is a diagram for showing a circuit arrangement for controlling data write into the interal RAM.

FIG. 39 shows a sample arrangement of the UCR circuit, a hue detection circuit, and an edge signals producing circuit; and FIG. 40 illustrates a circuit arrangement for controlling writing the data into an internal RAM.

A required color signal HUE and an edge detection signal EDGE, used in dot removal (smoothing out) process and edge emphasis processing, are used by the space filter of the UCR circuit as shown in FIG. 35. In the preferred embodiment, as shown in FIG. 39, the hue detection circuit and the edge signals producing circuit are incorporated within one LSI in which the UCR circuit resides because signals resident in the UCR circuit can be utilized for the hue detection circuit and the edge signals producing circuit.

In FIG. 39, the UCR circuit consists of the upper portion of the circuit, the hue detection circuit includes a subtractor 753, comparators 754–756, a gate circuit 760 while the edge detection signal producing circuit comprises a lower row after a selector 762.

In the UCR circuit, maximum and minimum values detector 741 detects the maximum and minimum values of the toner signals Y, M, and C (VDIA 0 to 7, VDIB 0 to 7, VDIC 0 to 7) and a subtractor 742 produces the difference between the maximum value and the minimum value. The output of the subtractor 742 addresses a K adjusting conversion table ($f_{km}$) 744 to read out data therefrom, which in turn is subtracted by the subtracted 745 from the minimum output value generated by the maximum and minimum value detector 741, thereby producing the K toner signal. The K toner signal is used to address the under color removal conversion table 748 to read the value for the under color removal adjustment therefrom, which is subtracted by the subtracter 749 from the toner signals Y, M, and C.

To the subtracter 749 is applied any one of the toner signals Y, M, and C selected in accordance with the content of developing color select bits SE1, SE0 by means of a selector 751. The developing color select bits SE1, SE0 specify which of the color data (i.e., Y, M, C, or K) to be directed to the succeeding stages of the UCR. The selector 751 selects Y by 0,0, M by 0,1, and C by 1,0 and the selector 750 selects K by 1,1. The relationship between the developing color select bits SE1, SE0 and the picture data VDO 0-7 (Y, M, C, K) generated in the full color FULL and in the monocolor MONO is shown in the table below.

| FULL | MONO | SE 1,0 | | | |
|------|------|--------|--------|--------|---|
|      |      | 00     | 01     | 10     | 11 |
| 0    | 0    | Y      | M      | C      | 0 |
| 0    | 1    | Y      | M      | C      | K |
| 1    | 0    | $Y_{uc}$ | $M_{uc}$ | $C_{uc}$ | K |
| 1    | 1    | $Y_{uc}$ | $M_{uc}$ | $C_{uc}$ | K |

In some cases, the output of the subtracter 745 becomes a negative value. Therefore, a rounding circuit 746 turns the output of the subtracter 745 to 0 as well as turns the K value to 0 in the three-colors mode. Before the full color signals are applied to the subtracter 749, they are ANDed with the under color removal adjustment value to set the under color removal adjustment value to zero so that the under color removal is not effected except in the full color mode.

In the UCR circuit, K is produced first to effect the under color removal, thereafter the developing color signals are extracted. This greatly simplifies and shortens the process as compared to prior art algorithms where black is produced and subsequently is subjected to under color removal and then developing colors are selected. For example, with one prior art process, a delay time long enough for about 20 and several clocks were required while in the preferred embodiment of the present invention black is produced concurrently with selection of developing colors and thereafter the under color removal is carried out, requiring a delay time of only seven clocks. Thus, a smaller clock delay is required for black production and the under color removal and the amount of processing and the number of gates required are reduced since only the developing colors are subjected to under color removal, thereby enabling a higher processing rate, a compact size, and a lower cost of the circuits when fabricating the circuits in an LSI. Further, extracting and using signals being processed for UCR permit complete processing of hue detection and production process of the edge detection signal.

In the under color removal, the value to be removed from the toner signals is determined in accordance with the K value and the under color removal is carried out on the basis of the value to be removed. Carrying out the under color removal in accordance with the value of K imposes a problem that the weight of black is lost due to insufficient density of black, particularly in a range in which K is large, i.e., very close to black.

The preferred embodiment employs a curve in which the output of an under color removal adjustment conversion table 748 increases with an increasing value of K while abruptly reducing the output value (the amount of under color removal) in a range where the value of K becomes large. In other words, muddiness in colors of high saturation is eliminated, while also enhancing reproducibility.

In the hue detection circuit, a HUE threshold register 757 of YMC holds values with which the respective inputs Y', M', and C' (values resulted from subtracting the minimum value from the Y, M, and C by the subtractor 753) are to be compared and a comparator 754 compares the contents of the register 757 and the respective values Y', M', and C'. The values of the respective inputs Y', M', and C' which are lower than the contents of the register indicate that the signal components of that color are weak relative to each other while higher values indicate strong components. A HUE threshold register 758 is a register having a value N to which a minimum value is to be compared and the comparison between the two is carried out by a comparator 755. The value of K is small if the minimum value is small, and the value of K is large if the minimum value is large.

A HUE threshold register 759 is a register having a value MN to which the difference between the maximum and the minimum values is to be compared and that comparison between the content of the register 759 and the difference between the maximum and the minimum is effected by the comparator 756. A small difference between the maximum and the minimum values indicates that the color is close to gray. The outputs of these comparators are logically processed by a gate circuit 760 to produce a hue detection signal HUE. A HUE output control bit 761 determines whether Y, M, and C are to be emphasized or whether only K is to be emphasized.

Assuming that the output of the comparator 754 is $H_A$, the output of the comparator 755 is $H_N$, the output of the comparator 756 is $H_M$, and these outputs are 1 if the inputs to the comparators are greater than the content of the registers and are 0 if not greater than the contents of the registers, the output of the gate circuit 760 or hue detection signals HUE are given as follows.

| HCNT | FULL | $H_N$ | $H_M$ | SE 0,1 | | | |
|------|------|-------|-------|--------|--------|--------|---|
|      |      |       |       | 00     | 01     | 10     | 11 |
| x    | x    | x     | 1     | $H_A$  | $H_A$  | $H_A$  | 0 |
| x    | x    | 0     | 0     | $H_A$  | $H_A$  | $H_A$  | 0 |
| x    | 0    | 1     | 0     | 1      | 1      | 1      | 1 |
| 0    | 1    | 1     | 0     | 1      | 1      | 1      | 1 |
| 1    | 1    | 1     | 0     | 0      | 0      | 0      | 1 |

(x: don't care)

Edge detection signals are produced either by a minimum signal in the K producing circuit plus an arbitrary signal selected by a selector 762 from the toner signals Y, M, C, or a developing color signal.

A rounding circuit 765 carries out a process in which when the result of addition by the adder 764 exceeds "FF," the result is interpreted as being "FF."

The selector 762 is controlled by the content of the edge data control bits $ED_0$, $ED_1$. Y is selected when the edge data control bits are 00, M is selected when 01, C is selected when 10, and the output of the selector 762 is added to the minimum value by the adder 764. However, none of Y, M, and C is selected when the edge data control bits are 11, in which case the minimum value is the only output of the added 764. The selector 766 selects either the developing color signal or the output signal of the adder 764; it selects the developing color signal if the developing color signal is other than K in that process, and the output of the adder 764 if the developing color is K. The output of the selector is used as an address to read out a conversion table 768 for producing the edge detection signal.

The minimum value of the toner signals Y, M, and C is the largest value that can be simply converted into K as previously described. In order to prevent the degradation of saturation of the colors, for example, muddiness that is caused by addition of K when the saturation is high, a value derived from the K adjusting conversion table 744 is subtracted from the minimum value in accordance with the difference between the maximum value and the minimum value. The minimum value before subtraction is used to produce the edge detection signals and is further added as an arbitrary color of the toner signals Y, M, and C as required, thereby improving precision in edge detection of K.

Within an LSI shown in FIG. 39 are comprised HUE threshold registers (757-759) and control registers (not shown) that can be accessed by a CPU to write into or to read from the data at any time, respective bits of which are assigned control conditions for operation within the LSI. The HUE threshold registers 757-759 have already been described. The control registers include eight control bits, i.e., internal RAM bank selection bits $BK_0$, $BK_1$ and an internal RAM set up bit NSU in addition to the developing color select bits $SE_0$, $SE_1$, a HUE output control bit HCNT, and edge data control bits $ED_0$, $ED_1$, which have been described. The internal RAM is of a three-page structure having banks 0, 1, and 2, and being accessed by internal RAM bank selection bits $BK_1$, $BK_0$ to select the respective banks below.

| $BK_0$ | $BK_1$ | FUNCTION |
|---|---|---|
| 0 | 0 | this selects BANK 0 (LUT 744) |
| 0 | 1 | this selects BANK 1 (LUT 748) |
| 1 | 0 | this selects BANK 2 (LUT 768) |
| 1 | 1 | NOT USED |

When the CPU is to access an internal RAM selected by the internal RAM bank selection bit $BK_0$, $BK_1$, it is required to set the internal RAM set up bit NSU to a logic 0. When the internal RAM set up bit NSU becomes 0, the address of the internal RAM is supplied to the address bus while at the same time reading from/writing into the internal RAM are made possible. FIG. 40 illustrates a circuit arrangement for this case, in which selectors 781-783 control selections of the address.

Figure 41:
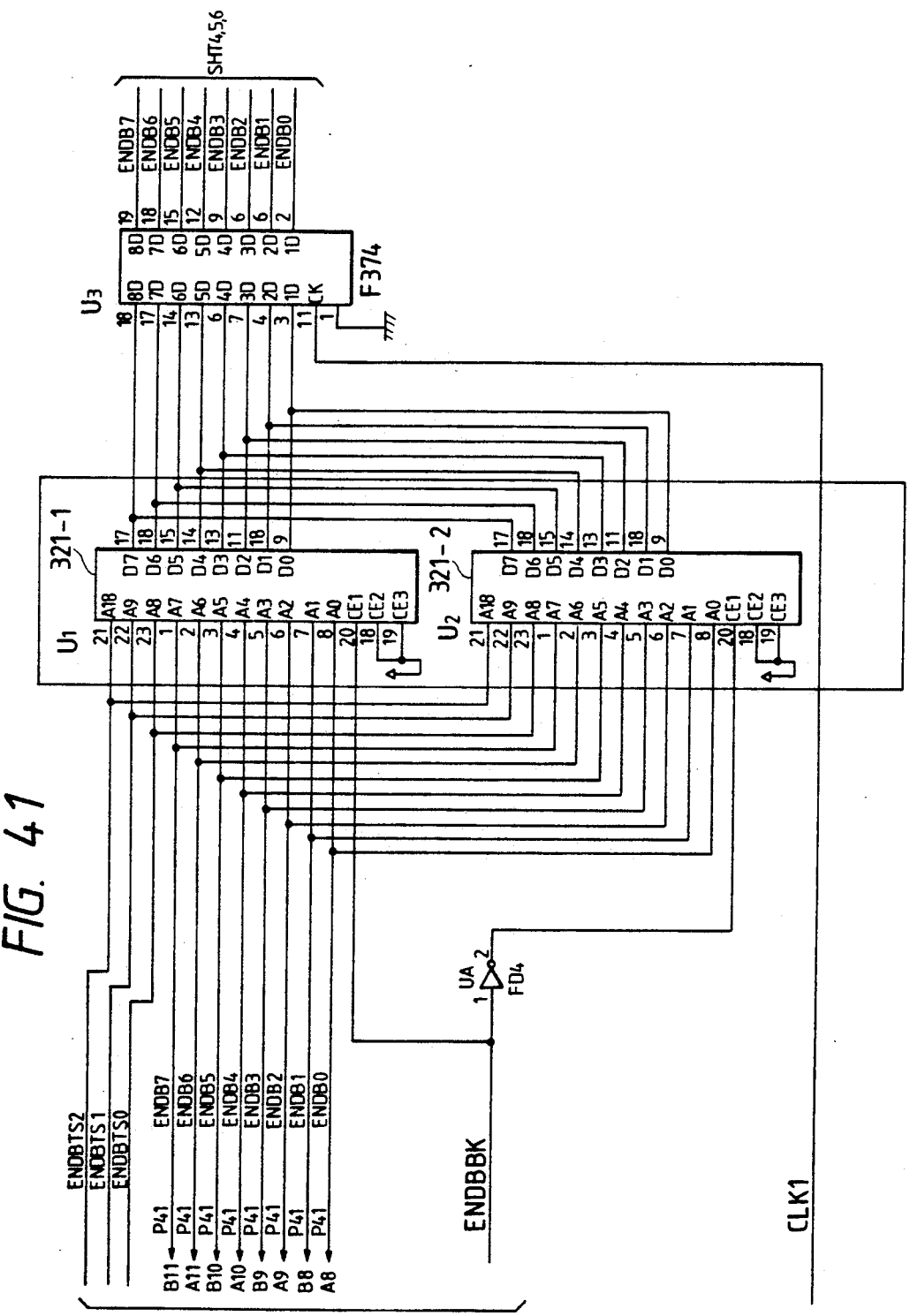
FIG. 41 is a configuration of an END conversion board.
Figure 42:
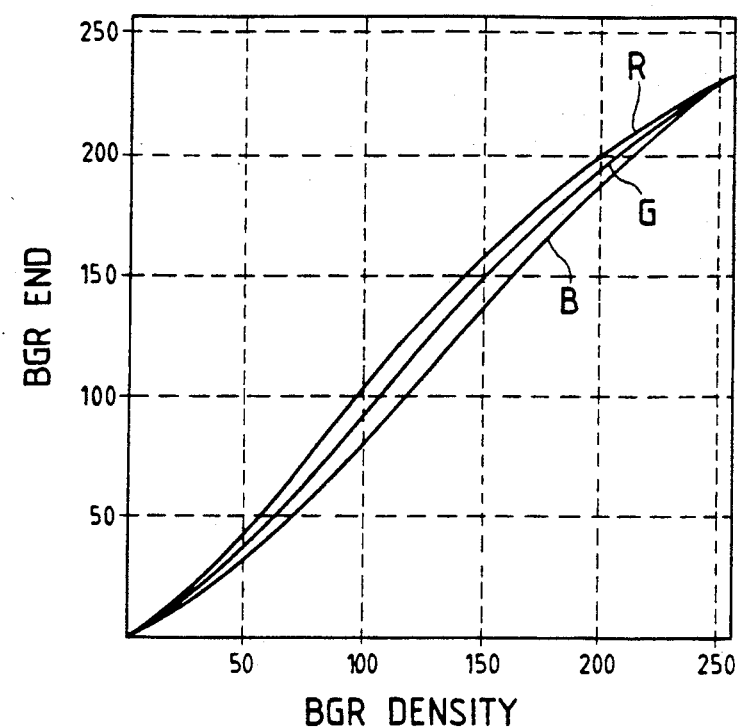
FIG. 42 is a graph showing END conversion curves.

FIG. 41 shows a circuit arrangement of an END conversion circuit board. FIG. 42 is a graph showing a typical END conversion curve. The circuit arrangement of the END conversion PCB in FIG. 41 represents one of the color separation signals B, G, and R, and includes two ROMs (321-1, 321-2) of two K bytes for the respective signals and a buffer F374. Within each of the two ROMs 321-1, 321-2 are stored conversion data of 256×8-bits on the basis of the END conversion curve as shown in FIG. 42. One of the eight pages is selected by a selection signal $END_{sel}$ of four bits. Thus, a conversion data of eight bits is read out by an address made up of an input data of eight bits and is outputted through a buffer F374.

The conversion data consists of three pages for ordinary copy (characters, print, and intermix of these two), photographing, and generation copy, 11 pages for the film projector, and one page for auxiliary purposes. The selection signals $END_{sel}$ for the respective copy modes are produced by the CPU. Being converted through the ROMs 321-1, 321-2, the color separation signals B, G, R will become of the same value.

Figure 45:
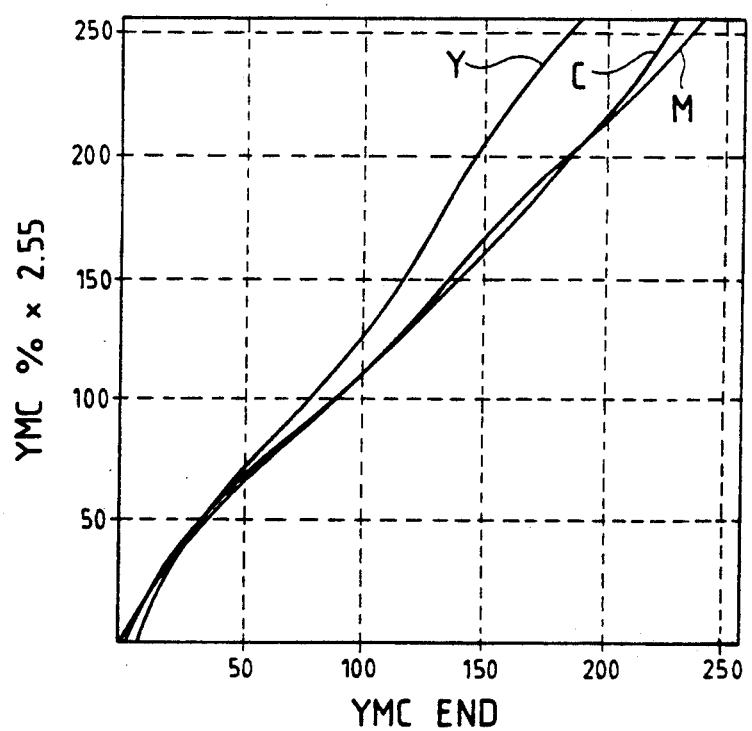
FIG. 45 is a graph showing typical TRC curves.
Figure 43:
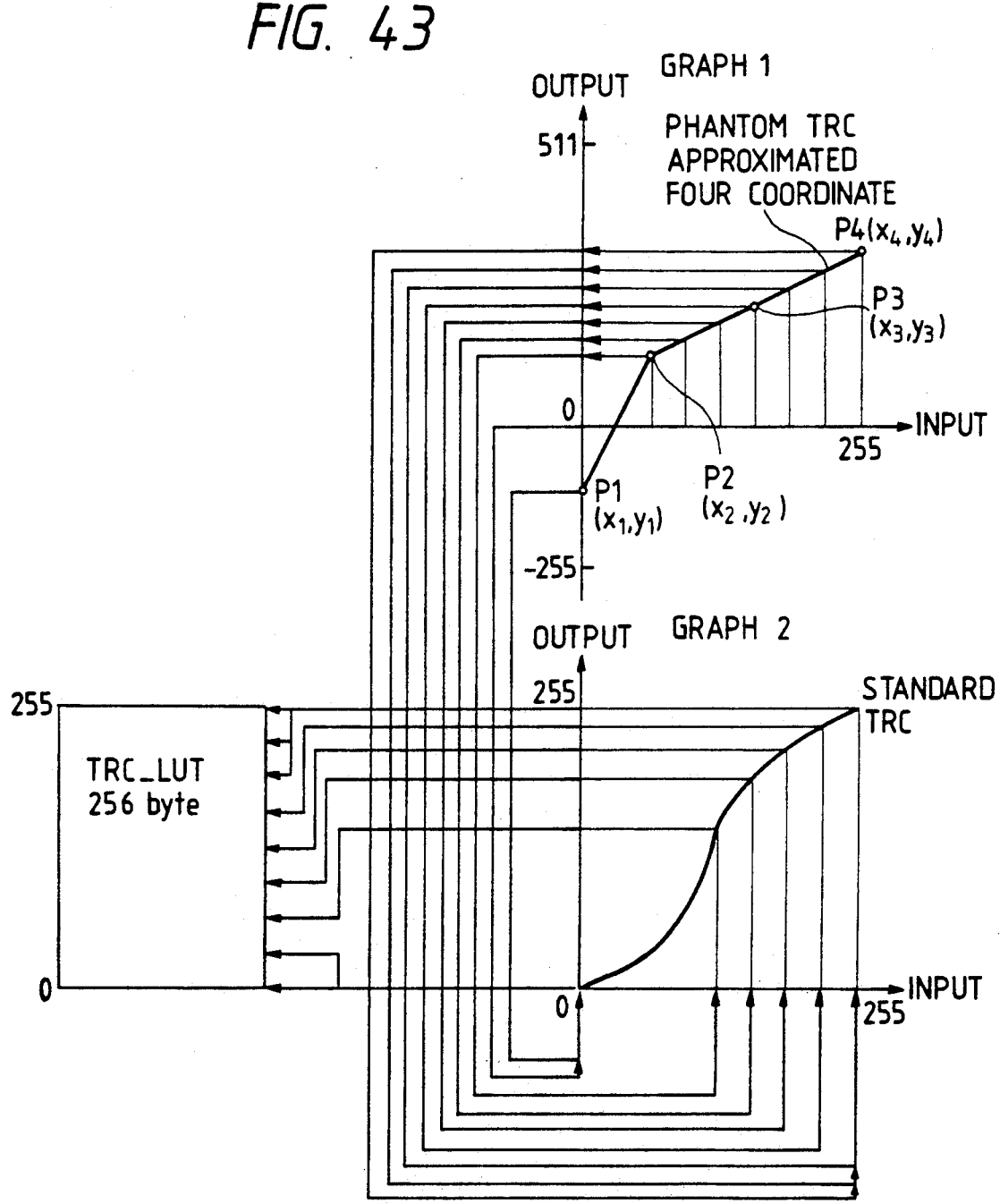
FIG. 43 is an explanatory diagram showing a basic algorithm for generating a TRC conversion table.

FIG. 43 shows a fundamental production algorithm of TRC conversion table; FIGS. 44(a) through 44(f) illustrate the production process of the TRC conversion table; and FIG. 45 is a diagram for showing an example of the TRC curve.

The TRC is used to adjust density, contrast, and color balance using a LUT as a conversion table and is provided with a standard TRC curve and coordinates data for polygon approximation, which are used to produce the TRC curve which in turn is stored into the RAM of the LUT. The polygon approximation data consists of four points 0, $X_1$, $X_2$, and 255 on an X-axis as seen in a graph 1 of FIG. 43 which are read out from the memory to find the values for the corresponding Y-axis. The values of the Y-axis thus obtained are converted by the standard TRC curve (graph 2). The converted values are stored into the RAM of LUT.

The polygon approximation data consisting of four points 0, $X_1$, $X_2$, and 255 can be used to set conversion characteristics in three regions, i.e., bright region, dark region, and intermediate region. This allows effective production of a desired TRC conversion curve by means of a small data amount. The TRC curve is produced by the TSUKIATE METHOD using the polygon approximation data and the standard TRC curve, thus the table can be produced in a simple and easy way. The number of data used for producing the table may be more than four points. For example, employing more than ten set points may, of course, result in a more accurate approximation curve.

Figure 44:
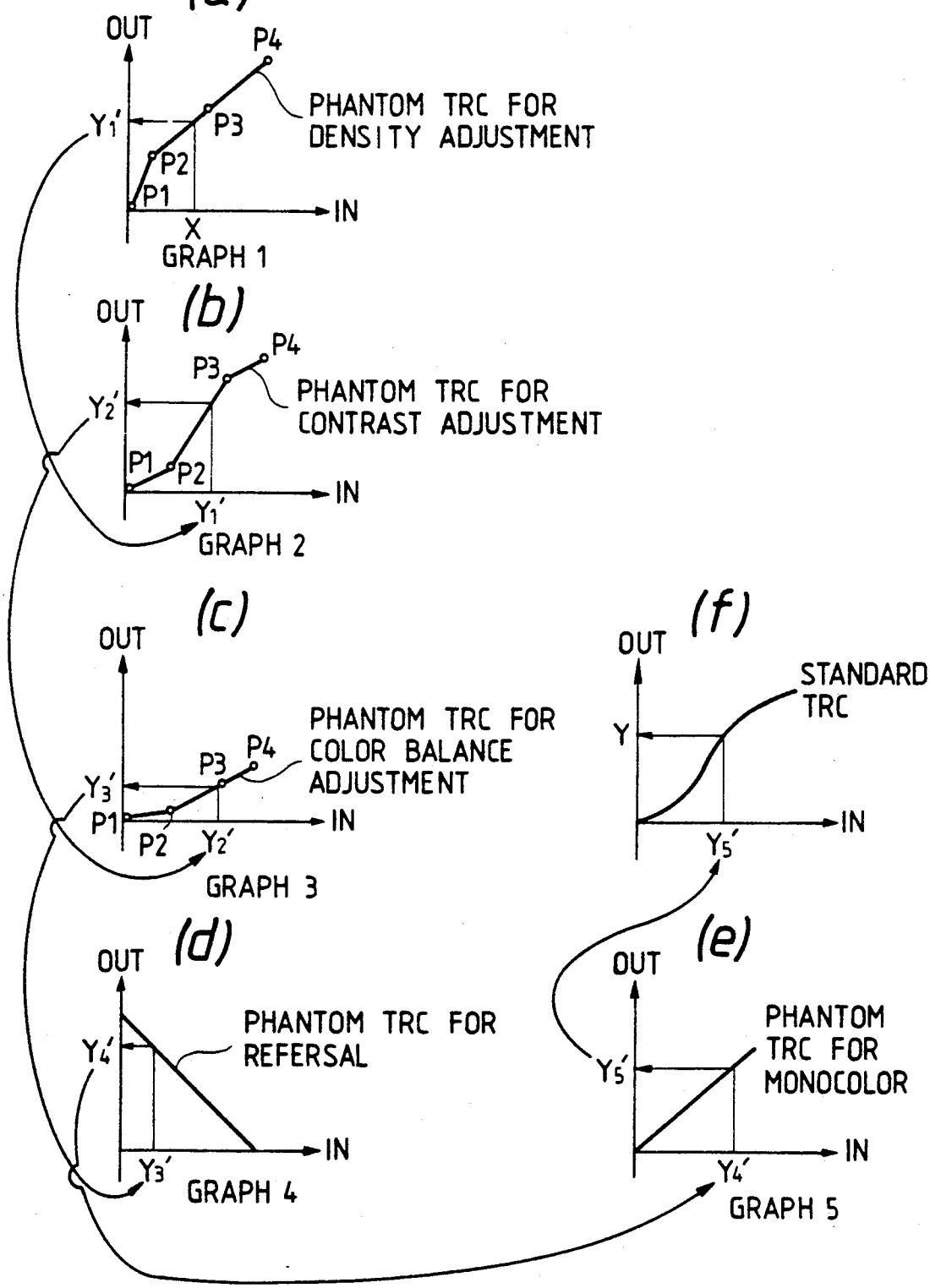
FIGS. 44(a) to 44(f) are diagrams for explaining processes to prepare a TRC conversion table.

The polygon approximation data includes, as shown in FIGS. 44(a) through 44(f), data for density adjustment, data for contrast adjustment, color balance adjustment, data for reversal, and data for monocolor. For example, when determining a data to be written into address X of the LUT, a value of $Y_1'$ of OUT corresponding to X value of IN is derived from a phantom TRC for density adjustment as shown in FIG. 44(a) and then a value of $Y_2'$ of OUT is derived from a phantom TRC for contrast adjustment as shown in FIG. 44(b). By carrying out similar processes using the phantom TRC in FIGS. 44(c)-44(e), a value $Y_5'$ is derived and then the $Y_5'$ is used as IN to read out Y of OUT as shown in FIG. 44(f). This value Y corresponds to the value X. The CPU writes the value Y into the LUT using the value X as an address. The above polygonal approximation data contains different items of data which correspond to the toner signals Y, M and C, and the types of images, photograph, character, and photograph/character. A total of eight TRC curves, one normal TRC curve and seven TRC curves for the every-area control, are generated for each toner signal and stored into the LUT. In the full color copy mode, if at the time of carriage return, the TRC curve of its toner signal is written into the LUT, the writing of eight TRC curves suffices. If such TRC writing is not carried out every carriage return, 32 TRC curves must be written into the LUT at the time of copy start. An example of TRC conversion curves expressed in 256 gray levels is illustrated in FIG. 45.

Figure 46:
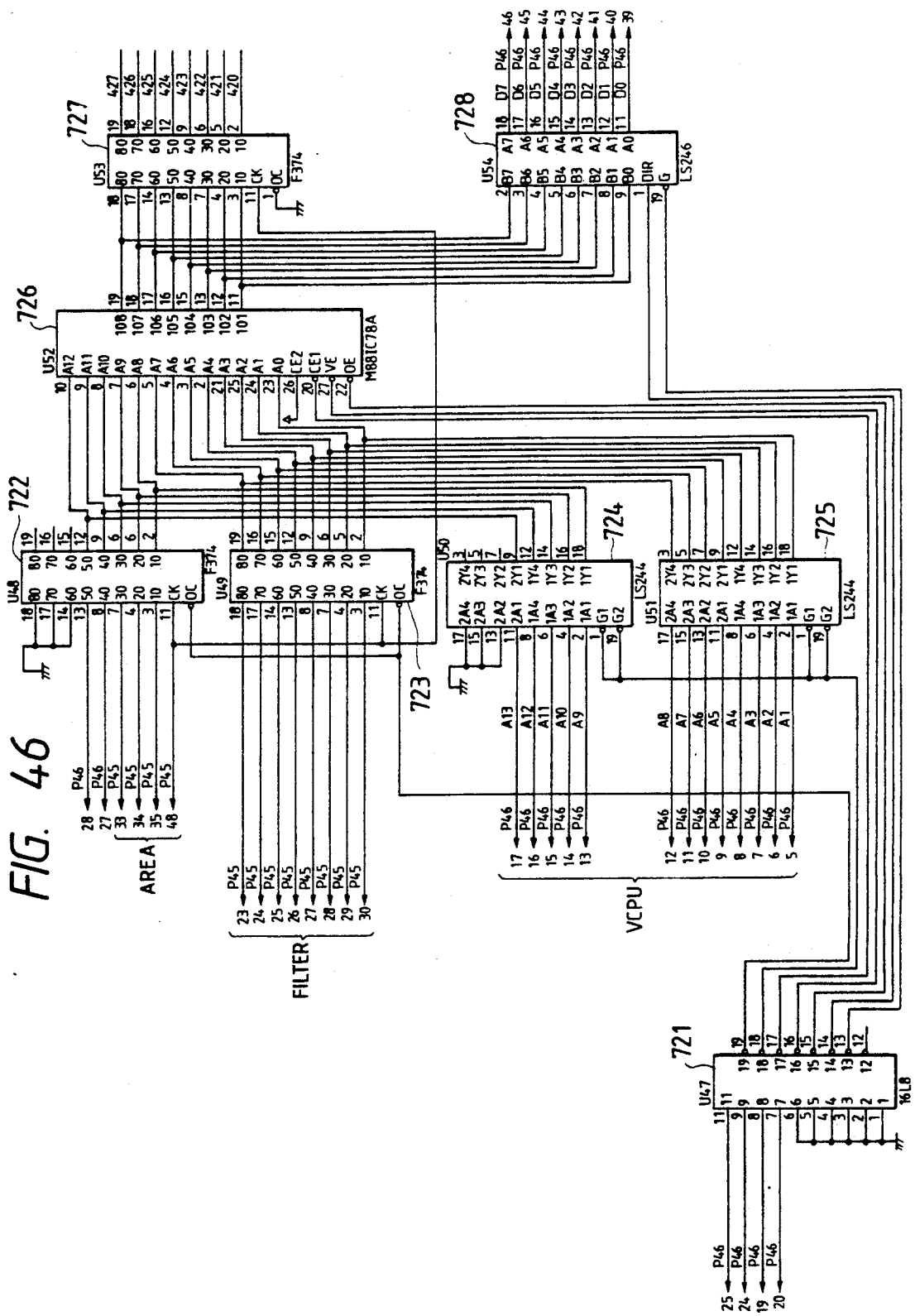
FIG. 46 shows an arrangement of a TRC circuit using LUTs.

FIG. 46 shows a specific arrangement of the TRC circuit constructed with LSIs. In FIG. 46, a latch circuit 722 latches a 5-bit area signal. A latch 723 latches image data of 8 bits. Buffers 724 and 725 holds the address signals of the CPU. A decoder (PAL) 721 decodes a control signal. A RAM 726 is a memory for storing TRC curves. Its output data is outputted through a latch 727. Data read/write for the RAM by the CPU is performed through a bidirectional data bus controller 728. With such an arrangement, in a normal mode for processing image data, the TRC curves stored in the RAM 726 are switched by an area signal, and the image data latched in the latch 723 is converted and is generated by the latch 727. In an access mode of the CPU, the TRC curve selection and the addressing are performed through the buffers 724 and 725. The read/write control is performed through the decoder 721. The data read/write operation by the CPU for the RAM 726 is performed through the bidirectional data bus controller 728.

In place of storing 256 bytes/color of the standard TRC in the ROM, an alternative is allowed in which only the coefficients of an approximately polygomial of higher degree are stored, and in actual use, the CPU generates the TRC curve using the coefficients stored. The alternative can reduce the necessary memory capacity, and provides an easy alteration of the standard TRC curve.

Figure 47:
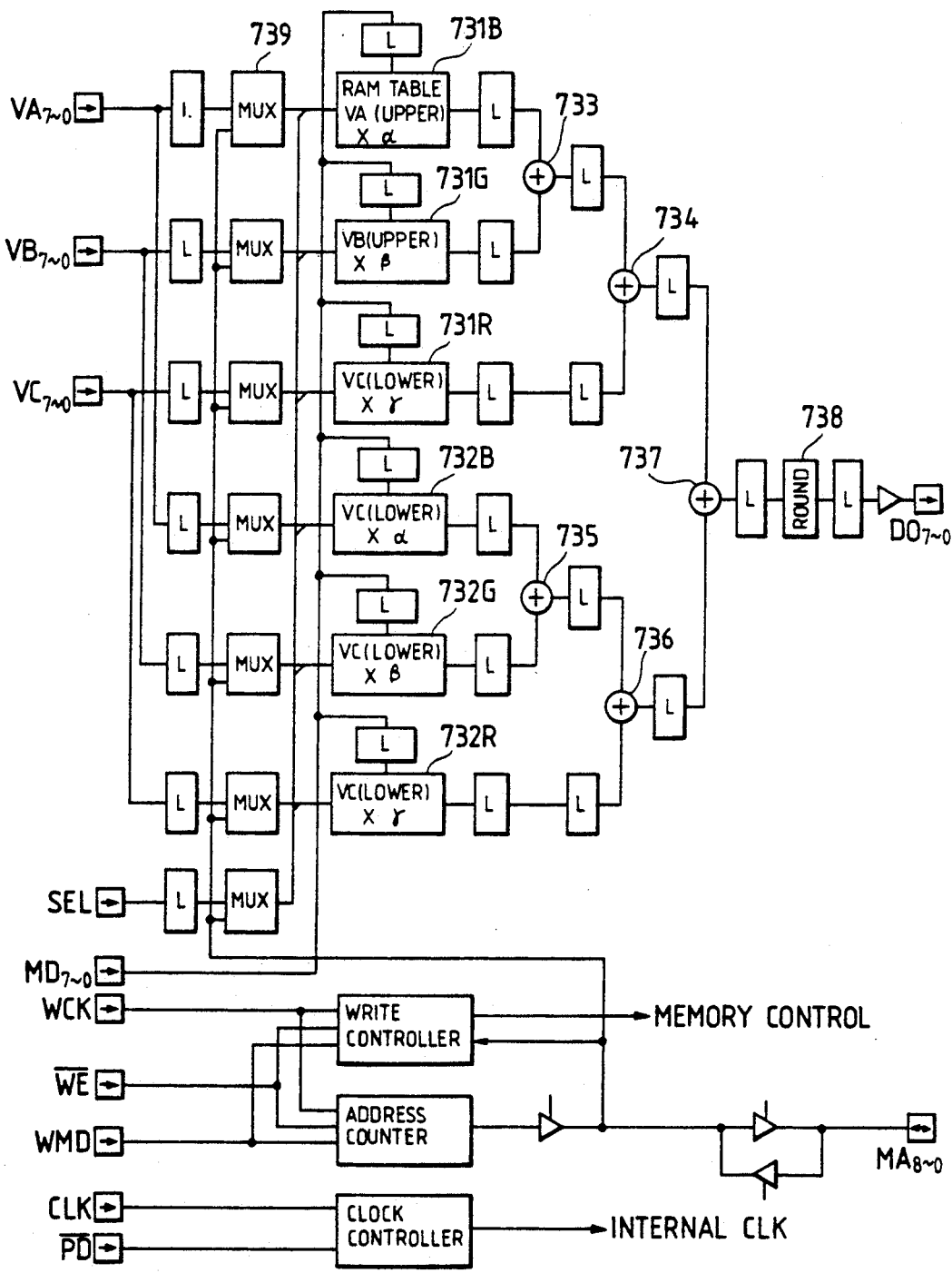
FIG. 47 is a block diagram showing a color masking circuit.

FIG. 47 shows an arrangement of the color masking circuit.

The color masking circuit of the preferred embodiment is provided with RAM tables (LUT) of the upper 4 bits and the lower 4 bits for recording the separated color signals B, G and R of 8 bits. The addition of the values read out from these RAM generates the toner signals Y, M and C from the separated color signals B, G and R. The circuit arrangement for one color is illustrated in FIG. 47. The RAM table 731B is addressed by the upper four bits of the separated color signal B; The RAM table 731G, by the upper four bits of the separated color signal G; The RAM table 731R, by the upper four bits of the separated color signal R. An adder 733 adds together the values read out of the RAM tables 731B and 731G. An adder 734 adds together the output value of the adder 733 and the value read out of the RAM table 731R.

The RAM table 732B is addressed by the lower four bits of the separated color signal B. The RAM table 732G is addressed by the lower four bits of the separated color signal G. The RAM table 732R is addressed by the lower four bits of the separated color signal R. The values read out of those RAM tables 732B, 732G, and 732R are added by adders 735 and 736.

Figure 48:
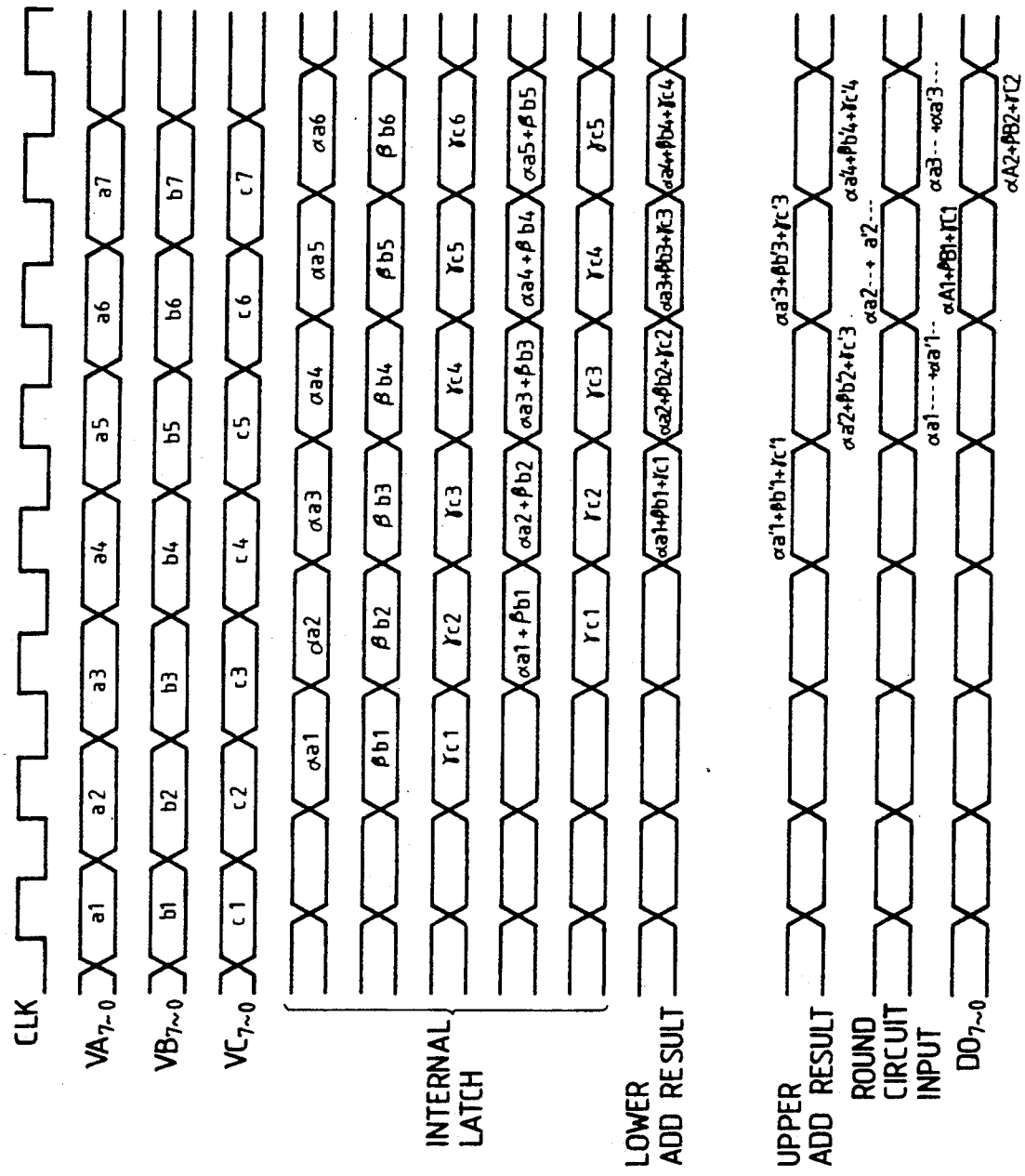
FIG. 48 shows a timing chart of an internal operation by the pipeline system.

An adder 737 adds the sum obtained from the upper four bits and the sum obtained from the lower four bits. The result of the addition by the adder 737 is applied to a round circuit 738. In the rounding circuit 738, the 13-bit data in the internal calculation are rounded into an 8-bit data. The rounded 8-bit data is outputted as a toner signal Y, for example. Like circuits are provided for the remaining toner signals M and C. Usually, the RAM table contains two planes, one for full color and the other for mono color. A timing chart of the internal calculation of the pipeline type is shown in FIG. 48. The data expression for the internal calculation is illustrated in FIG. 49.

The timing chart shown in FIG. 48 describes the following pipeline processings. Description will be given on the pipeline processings of input data al, bl, and cl. The low-order bits data al, bl, and cl are read out of the RAM tables 732B, 732G and 732R. These are added by the adder 735, and the addition result al+bl is latched. At the next clock, the adder 736 calculates to produce al+bl+cl (addition result of the high-order bits), and the addition result is latched. At the same time, the adder 734 calculates to produce al′+bl′+cl′ (addition result of the low-order bits), and the result is latched. At the next step, the adder 737 operates to produce al+bl+cl+al′+bl′+cl′ (input to the rounding circuit). The rounding circuit 738 rounds this value, and outputs the data Al+Bl+Cl of the color masking circuit.

Figure 49:
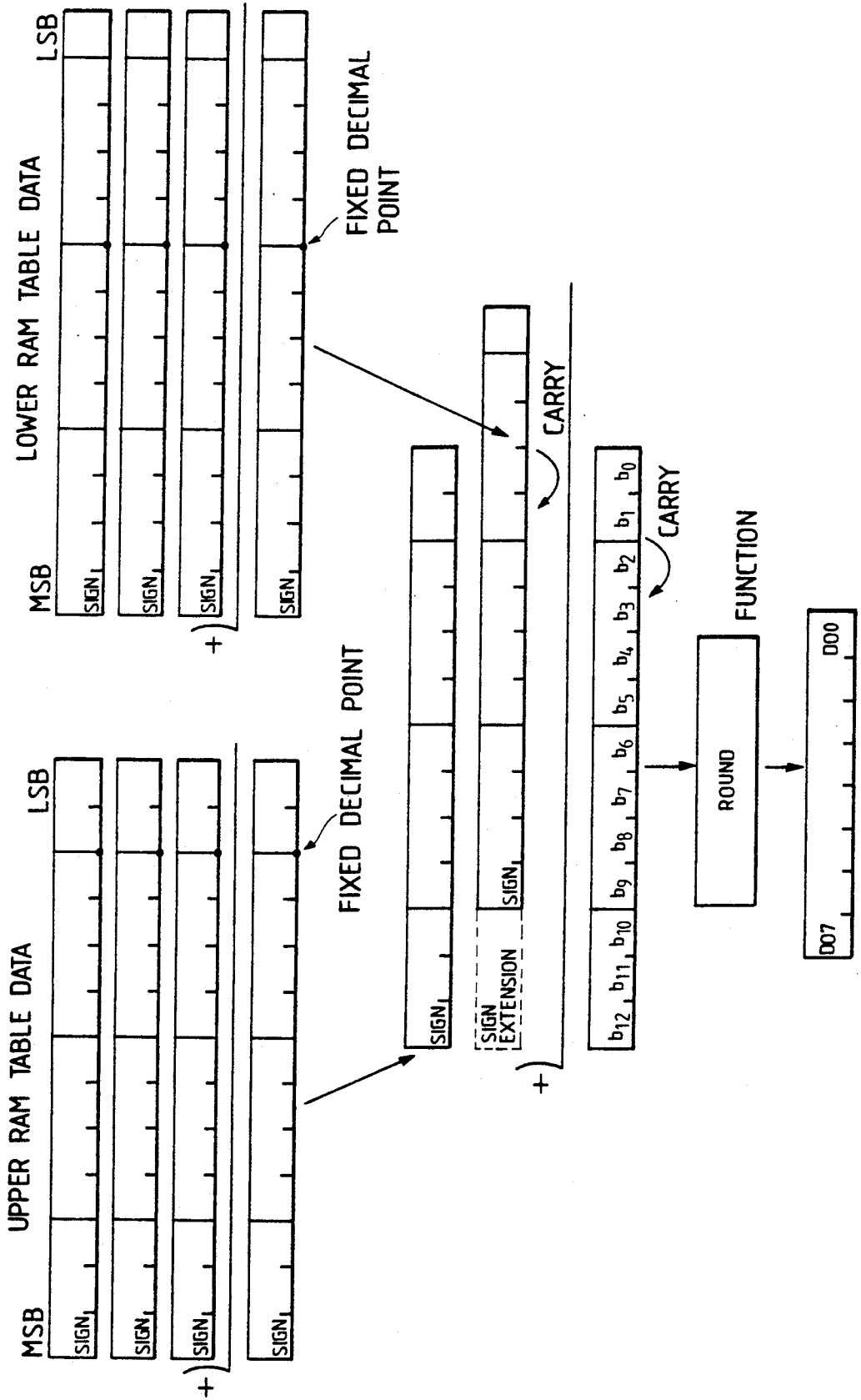
FIG. 49 shows explanatory diagrams illustrating a method of expressing data in the internal operation.

As shown in FIG. 49, the high-order RAM table data consisting of 2 bytes is formatted such that the lower 2 bits are located in decimal places, and the MSB consists of a sign bit. The low-order table data consisting of 2 bytes is formatted such that the lower 5 bits are located in decimal places, and the MSB consists of sign bits. Accordingly, the upper and the low-order data are shifted one from the other so as to position at the decimal point, and those items of data are added to carry. When the sum is negative, it is rounded to zero. When it exceeds "FF", it is rounded to be "FF".

Such an arrangement of the table consisting of two blocks of bits, the upper 4 bits and the lower 4 bits, results in a small table size of 16. Therefore, the memory capacity can be remarkably reduced. Accordingly, the number of gates of the LSI is reduced, leading to reduction of size and cost of the LSI. For example, if the 8-bit data is used as intact, the required table size is 256. This needs a memory capacity much larger than the table arrangement consisting of two bits blocks. The above discussion is for only one color. Actually, however, three colors are used, and hence the memory capacity required is greatly increased. It is evident that in the case of the $3 \times 3$ matrix, a multiplication circuit system, instead of the multiplication LUT, may be used.

In the circuit as mentioned above, the toner signals are generated by using only the addition calculation. Accordingly, the sum values outputted as the toner signals Y, M and C must satisfy the matrix, such as matrices given below.

For the $3 \times 3$ matrix, $$\begin{pmatrix} Y \\ M \\ C \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} B \\ G \\ R \end{pmatrix}$$

For the $3 \times 6$ matrix, $$\begin{pmatrix} Y \\ M \\ C \end{pmatrix} = \begin{pmatrix} a_{11} \cdots a_{16} \\ a_{21} \cdots a_{26} \\ a_{31} \cdots a_{36} \end{pmatrix} \begin{pmatrix} B \\ G \\ R \\ B^2 \\ G^2 \\ R^2 \end{pmatrix}$$

To this end, the multiplication results of the input data and the coefficients for the input data of the separated color signals B, G and R are prestored in the RAM tables 731B, 731G, 731R, 732B, 732G, and 732R. In this case, if the coefficients of the matrix are arbitrarily selected, the reproduced gray is not the original gray. To cope with this, the present invention employs a gray balance method (G. B. method), and the coefficients are selected as follows.

$$\left. \begin{array}{l} a_{11} + a_{12} + a_{13} \\ a_{21} + a_{22} + a_{23} \\ a_{31} + a_{32} + a_{33} \end{array} \right\} = 1$$

-continued $$\left.\begin{array}{l}a_{14} + a_{15} + a_{16}\\ a_{24} + a_{25} + a_{26}\\ a_{34} + a_{35} + a_{36}\end{array}\right\} = 0$$

Thus, the coefficients are selected so that when the separated color signals B, G and R have equal values, the toner signals Y, M and C must also have equal values.

The square term in the 3×6 matrix, together with the first degree term, is stored in the conversion table. For example, $a_{11}B + a_{14}B^2$ is stored in the B conversion table. In this way, the conversion values can be obtained by only the addition operations. When a matrix of 3×9 or more is used, terms BG, GR, ... are contained. In this case, the coefficients are $a_{ij}BG$, ..., and hence the values of the conversion tables of B and G must be multiplied, but the following relations hold $$\{B^2 + G^2 - (B-G)^2\}/2$$

or $$\{(B+G)^2 - (B^2 + G^2)\}/2.$$

Therefore, the matrix operation is possible, without using multipliers, by using the above conversion tables, adders (subtractors) for the B and G, and conversion tables storing the sums (differences) by the adders. The combination of the adders and conversion tables provides a higher color masking operations than the arrangement using the multipliers.

The CPU is used for setting the conversion values in the RAM tables 731B, 731G, 731R, 732B, 732G, and 732R. The CPU contains the coefficients that are made to correspond to the upper four bits and the lower four bits. A total of nine types of coefficients are provided for the full color, B, G and R coefficients for each of the Y, M, and C. For the mono color, three types of coefficients B, G, and R are provided, these three coefficients being prepared for all the Y, M and C. The coefficient consists of 2 bytes, in order to secure the number of bits free from overflow.

When the start key is operated and the copier starts its copying process, an operator selects the coefficients in accordance with the type of an original, i.e., photograph, character, print, or the combination of these, and mono color. Using the coefficients, the products are obtained and stored into the LUT conversion tables. The calculation using the storage area of 2 bytes will inevitably be attendant with overflow. The storage are a of 2 bytes + 2 bytes, a total of 4 bytes, is used, enabling 0 to 15 times calculations. At the time of the setting of it, the discarding and the rounding of the least significant 1 byte are applied to the data values, and the processed data is written into the LUT.

The data write into the RAM tables 731B, 731G, 731R, 732B, 732G, and 732R are under control of a RAM table write clock WCK, a RAM table write mode select signal WMD, and RAM table write enable signal NWE. With a RAM table write address MA 8 to 0, RAM table write data is written into the tables.

In the copier of the preferred embodiment, the VCPU controls an image data processing system including the IIT and the IPS. As already described, in each stage of processing the image data, the conversion tables (LUT) are used providing flexible processing for conversion and correction of the image data. When the LUT is used, nonlinear conversion and corrections may flexibly be set. Further, if the calculated values are prestored in the table, calculated values may be obtained by merely reading out the necessary values from the table, without calculations. A plurality of tables may be provided and be selected in accordance with the type of image. If so, the conversion and correction of the image data may be conducted in accordance with photograph, character, print or the combination of them, ensuring improved reproduction of the images peculiar to those types of originals. The use of the conversion tables reduces the number of gates and the required storage capacity of the conversion and correction circuits. Further, using the input data as an address, desired data is read out of the table. This improves processing speed. The VCPU controls the setting of data in the tables and its related operations, and further controls the image data processing system of the IIT.

Figure 50A:
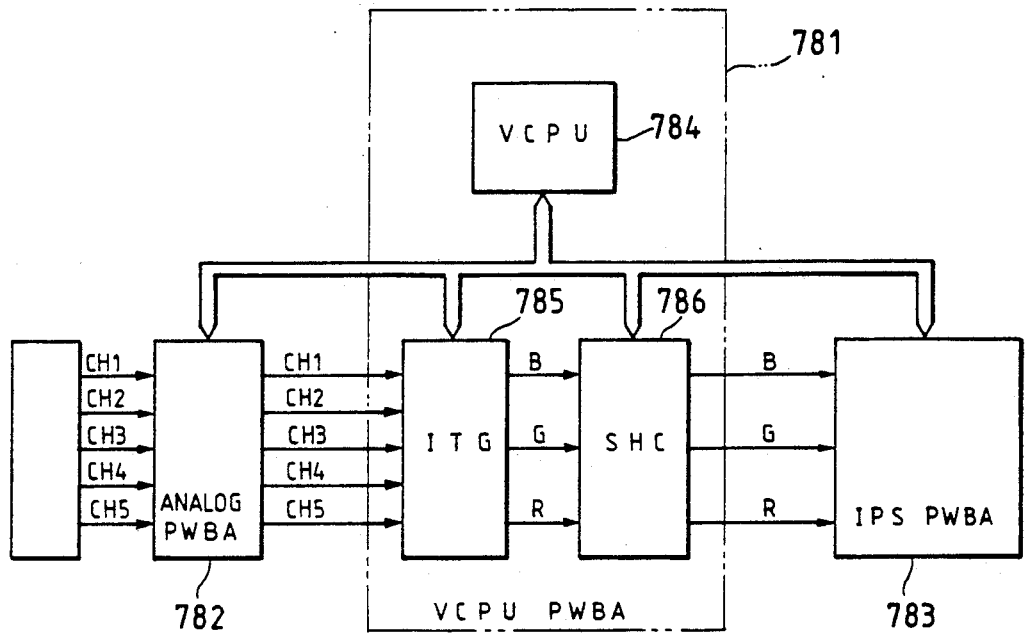
FIGS. 50(a) and 50(b) are block diagrams showing a control system by a VCPU and a timing chart showing a memory write control.
Figure 50B:
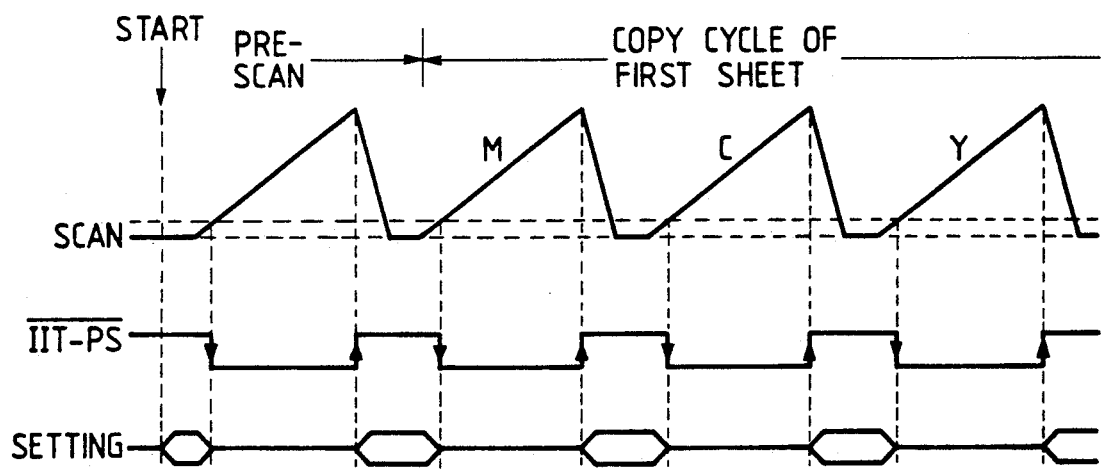

FIGS. 50(a) and 50(b) show a configuration of a control system by the VCPU, and memory write control. As shown, a VCPU (VCPU PWBA) 781 follows an analog board (ANALOG PWBA) 782 as viewed in the flow of image data. It contains an ITG (IIT timing generator) 785 and an SHC (shading correction circuit) 786, in addition to a VCPU 784. As described above, the VCPU 784 controls the setting of data in various tables and its related operations, the ITG 785, the SHC 786, and the analog board 782.

The analog board 782 receives the separated color signal (video signals) of the five layer elements of the CCD sensor from the IIT sensor board, and applies these signals to corresponding A/D converters (235 in FIG. 19) through amplifiers. These converters convert analog data signals into digital data signals GBRGBR . . . and send them to the ITG 785. The VCPU 784 adjusts the amplification of the gain adjusting amplifiers and the offset adjusting amplifiers. The combinations of the gain adjusting amplifiers and the offset adjusting amplifiers are provided in the channels 1 to 5 corresponding to the five layer elements of the CCD sensor, respectively. The VCPU 784 selects the gain adjusting DAC and the offset adjusting DAC of each channel. Accordingly, provided between the VCPU board 781 and the analog board 782 is an interface including DAC select signals, channel select signals for channels 1 to 5, write signals, and the address bus and data bus.

The ITG 785 of the VCPU board 781 controls the delay setter for zigzag correction (236 in FIG. 19) and the separation/composition circuit (237 in FIG. 19). The VCPU 784 controls these circuits through the register settings. The delay setting circuit corrects the mounting displacements of the five-layer CCD sensors in the vertical scan direction. The separation/composition circuit, containing line memories, separates the digital data GBRGBR retains the digital data of one line, and composes the color signals of each channel. Therefore, the ITG785 includes a register PS-DLY for storing a zigzag correction value amount for magnification, register IPS-IS-GENLH for storing a delay correction value of the IPS pipeline, register REGI-ADJUST for setting a main scan directional register correction value, register IS-SIZELH for storing the pixels in the effective display area in the main scan direction, register DV-GEN for storing a zigzag correction adjusting value, and register DARK for setting a DARK output timing adjusting value. The VCPU store the data into these registers through the address bus and the data bus. At the power on of the copier, "4" corresponding to 100% is set in the register PS-DLY, as the zigzag correction value. At the start, a zigzag correction value corresponding to a selected magnification is determined and set in that register. The ITG 785 is provided with two hot lines, WHTREF and WHTIN, and it posts the SHC on the timing of the data fetching through the hot lines.

The SHC 786 receives the image data of the individual colors from the ITG 785, and executes the pixel displacement correction and the shading correction. Accordingly, the SHC includes a register CTRL-REG for storing a pixel displacement correction system, register ADJ-G for storing a density adjust value in terms of shading, registers ADLREG and ADH-REG for storing the read/write pixel addresses of the SRAM (240 in FIG. 19), and data register DATA-REG of an SRAM. The pixel displacement correction is based on the arithmetic means on the pixel data. In this correction, any of the following items is selected in accordance with the contents of the register CTRL-REG, $$d_n = D_n \text{ (not corrected)}$$

$$d_n = (D_{n-1} + 2D_n)/3$$

$$d_n = (2D_{n-1} + D_n)/3$$

where $D_n$ is input data at the n-th pixel, and $d_n$ is output data.

In the shading correction, the SHC calculates a difference between the input image data and the reference data stored in the SRAM, and produces it. The reference data of the SRAM is such that before a scan, the white reference plate is read and it is subjected to the color displacement correction, and stored into the SRAM. The density adjustment is carried out in such a way that the value set in the register ADJ-REG is added to the input image data.

The data flow in the SHC 786 is set to in accordance with the scan mode, e.g., a copy scan mode and a color detect scan mode. In the copy scan mode, when the WHTREF is applied at the start of a scan, the density of the white reference plate is read, and the reference data of the white reference plate is written into the SRAM. At the start of the next scan, the density data of the image of the origonal (whose pixel displacement is removed by correction) is shading corrected by reference to the data in the SRAM.

In the sample scan mode, the IIT carriage is moved to a color detect specified point. When a WHTREF signal arrives, the original read density data is written into the SRAM, and then the data of the specified pixel is read out of the SRAM into the RAM of the VCPU 784.

The color detection is performed in the following sequence. After 50 msec. since the IIT carriage has moved to the specified point, a WHTREF is issued for the ITG 785, and is written into the SRAM in synchronism with a line sync signal IPS-IS of the IPS. At the next line sink signal IPS-IS, the ITG 785 issues a WHTINT signal, and the pixel data at the specified point is transferred to the RAM of the VCPU 784. The period of 50 msec provided is equal to a time period that the vibration of the IIT carriage settles down and the carriage comes to a standstill. The color detection is directed for the five pixels as counted from the specified point in the main scan direction, and five pixels in the vertical scan direction. Accordingly, five pixels that consist of the pixel at the specified point and the succeeding four pixels are read out of the SRAM storing the image data of one line in the main scan direction, and are written into the RAM of the VCPU 784. Further, the IIT carriage is shifted four times pulse by pulse, and the image data is read out with the image data unit of five points. The above color detection sequence is for the case of a single specified point. In the case of a plurality of specified points, a similar sequence of operations is applied to each of these specified points.

The VCPU 784 sets the data in the TRC conversion tables and in the multiplication table for color masking. The timings for data setting come before the prescan and the copy scan as shown in FIG. 50(b). Before the prescan, predetermined data are stored into each table in accordance with the type of the prescan. Before the copy scan, predetermined data are set in the respective tables in accordance with the developing colors, M, C, and the like. The TRC table is prepared by using the standard TRC curves and polygonal lines approximation curves, as already mentioned. The set data is calculated in the previous scanning, and is written into the memory during the back scan of the carriage. In this way, the period occupied by the TRC setting operation during the back scan period of the carriage is minimized. The gray balance control according to the preferred embodiment of the present invention further involves the END conversion table select (generation of a select signal ENDSel of the ROMs 321-1 and 321-2 in FIG. 41).

Figure 51A:
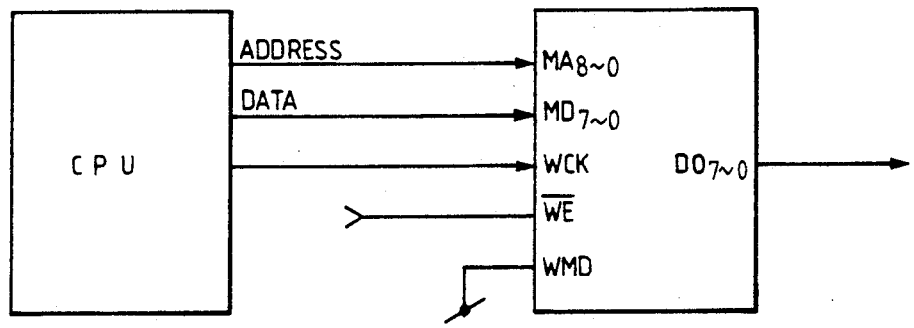
FIGS. 51(a) and 51(b) are diagrams showing write circuits for the RAM table.
Figure 51B:
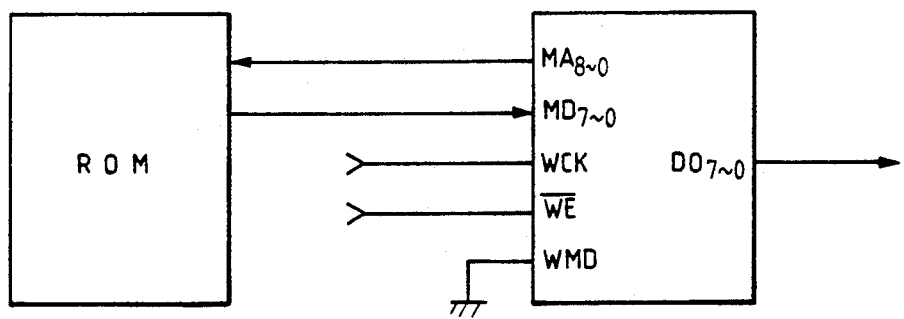
Figure 52A:
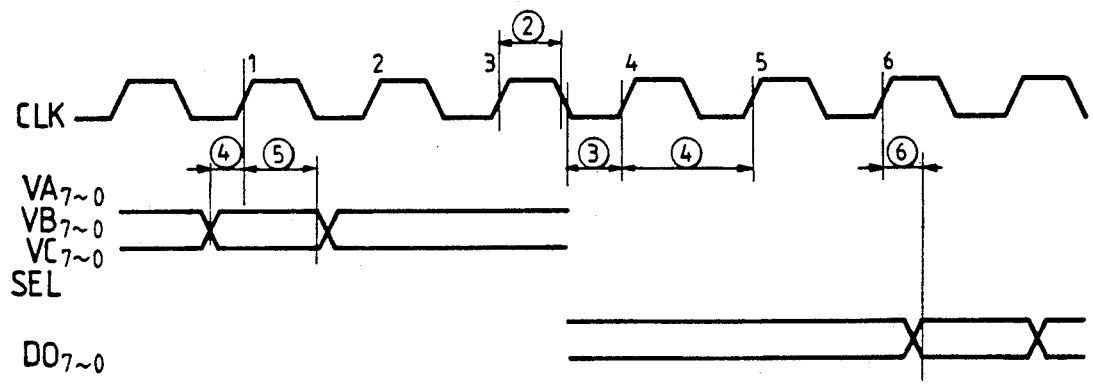
FIGS. 52(a) through 52(c) are timing charts showing an access operation for the RAM table.
Figure 52B:
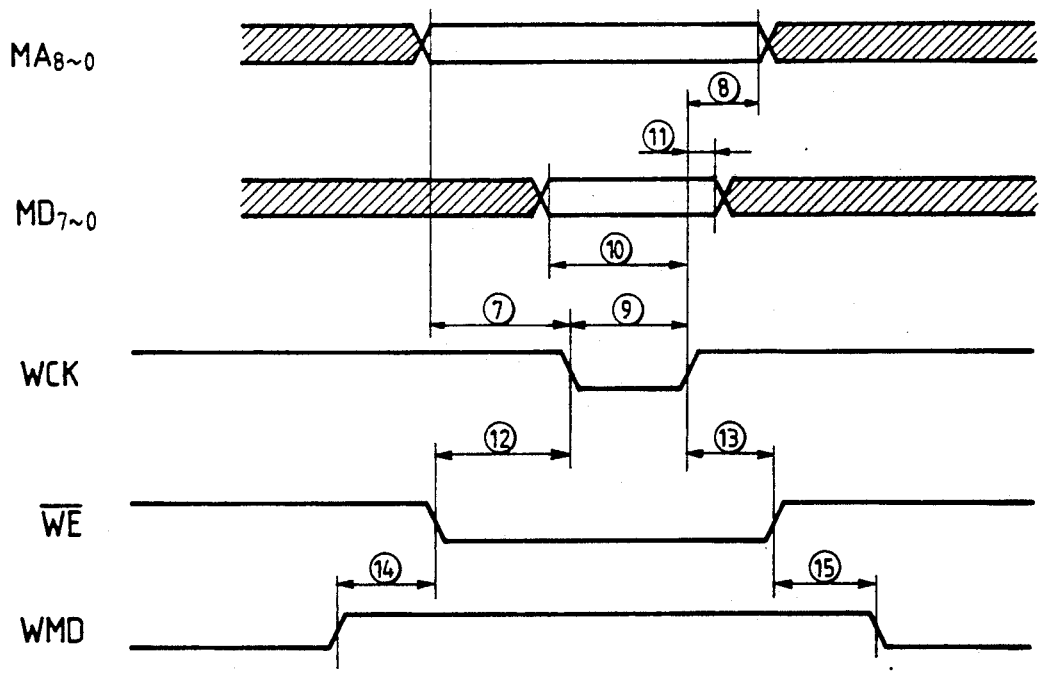
Figure 52C:
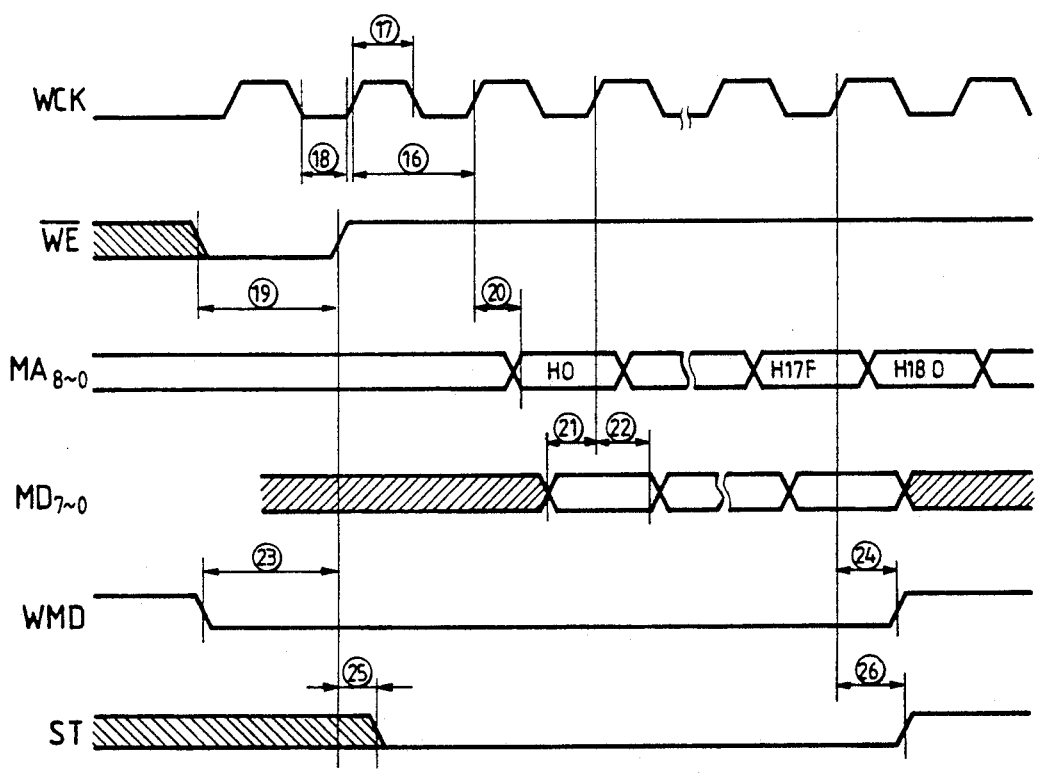

FIGS. 51(a) and 51(b) show configurations of the RAM table write circuits. FIG. 51(a) shows a configuration of the same in a slave mode (write from the CPU), and FIG. 51(b) a configuration of the same in a master mode (write from the ROM). FIGS. 52(a), 52(b), and 52(c) show timing charts to access the RAM table. FIG. 52(a) shows the timing chart in a normal mode, FIG. 52(b) a timing chart in a slave mode, and FIG. 52(c) a timing chart in a master mode.

The data write to the RAM table is carried out from the VCPU (FIG. 51(a)), but alternatively it may be made from the ROM (FIG. 51(b)). In FIGS. 52(a), 52(b), and 52(c), (4) indicates an image data setup time $t_{DS}$; (5) a image data hold time $t_{DH}$; (6) an output image data delay time $t_{DOF}$; (7) a memory address setup time $t_{MAS}$; (8) a memory address hold time $t_{MAH}$; (10) and (21) memory data setup times $t_{MDS1}$ and $t_{MDS2}$; (11) and (12) memory data hold times $t_{MDH1}$ and $t_{MDH2}$; (12) a memory write enable setup time $t_{MSW}$; (13) a memory write enable hold time $t_{MWH}$; (14) and (23) memory write mode setup times $t_{WMS1}$ and $t_{WMS2}$; (15) and (24) memory write mode hold times $t_{WMH1}$ and $t_{WMH2}$; and (20) a memory address delay time $t_{MAP}$.

In the access in the normal mode, as shown in FIG. 52(a), at the hold time $t_{DH}$ following the elapse of the setup time $t_{DS}$, the image data is held and after the delay time $t_{DOP}$ it is generated. When data is written into the table in the slave mode, as shown in FIG. 52(b), the memory write mode signal WMD goes high, and after the setup time $t_{WMS1}$, the memory write enable signal NEW goes low. Subsequently, after the setup time $t_{MWS}$ the memory write click signal WCK goes low. In this way, data MD7 to MD0 are written into the specified addresses MA8 to MA0. When data is written into the RAM table in the master mode, and when the memory write clock signal WCK rises and the memory address delay time $t_{MAP}$ elapses, the addresses MA8 to MA0 for reading out the RAM are designated and data MD7 to MD0 are read out. After the data hold time $t_{MDH2}$ following the setup time $t_{MDS2}$, the data write operation is performed.

Figure 53:
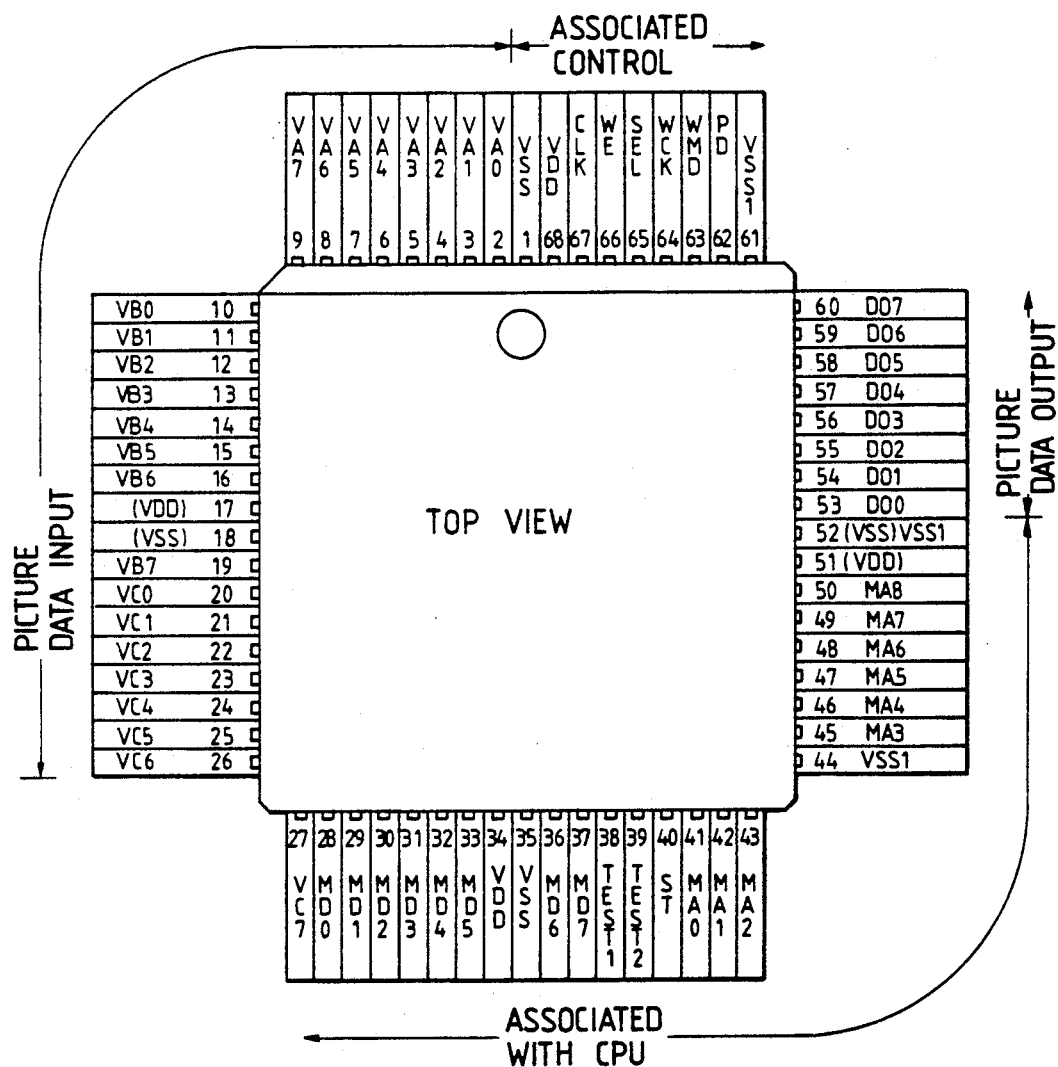
FIG. 53 shows a pin layout of an LSI.

FIG. 53 shows a pin layout of an LSI. As shown, pins are laid out on the top and bottom sides, and the right and left sides of the LSI. These pins are arranged and grouped so as to obtain easy layout and connections with other LSIs and parts when the LSI is mounted to a printed circuit board. As shown, the pins concerning the inputting of the image data protrude from the left side of the LSI; the pins concerning the image data outputting from the right side; the pins concerning the CPU interface from the bottom; and the pins concerning the controls from the top.

The IPS is divided into functional blocks. These blocks are fabricated into LSIs. These different LSIs are laid out along with the data flow from the IIT to the IOT, as shown in FIG. 37. In the case of the LSI with the pin layout shown in FIG. 37, the image data flows from the left side to the right side. The LPU bus is disposed in the lower side, and the control signal lines are disposed in the upper side. The LSIs are arrayed sequentially along with the flow of the image data. Therefore, when the LSI is turned upside down, with respect to the sides of the LSI having the pins for the CPU interface and the pin control, it matches the pin layout of FIG. 37. Thus, if the pin layouts of the LSIs are designed to be uniform, the packaging density may be improved, and further the required wiring length may be reduced. The later feature leads to reduction of noise trouble.

As seen from the foregoing description, in the color image forming apparatus, the separated color signals in the optical system are subjected to an END conversion process. With this feature, the gray balanced image data may be color corrected and color changed in the succeeding color masking process. Also, in the color masking process, the color correction and the color change are effected by using the gray balance method. The color image signals after color masking processing are transferred to the TRC. Therefore, the TRC may make the tone correction in accordance the requirements of the IOT. It is noted that the conversion tables of the LUT type are used in the series of gray balance controls. With use of the conversion tables, desired set values may be obtained by merely reading data out of the memory with the image data as the address. This simplifies the conversion process and realizes a high speed conversion process. Additionally, the conversion values of the nonlinear characteristics may be readily set. The reproduced color images are fresh and pure. Furthermore, since the setting of the conversion tables is made easy, the conversion characteristics may readily be changed in accordance with the types of originals and the intentions of the image recordings.

What is claimed is:

1. A picture forming apparatus for reproducing original images comprising:
    means for separating a signal corresponding to an original image into a plurality of color signals;
    means for converting said plurality of color signals into a plurality of recording signals wherein each of said recording signals corresponds to a different color of coloring material used by the picture forming apparatus to reproduce the original image;
    means for determining a minimum recording signal having a minimum value;
    means for determining a maximum recording signal having a maximum value;
    means for subtracting the minimum recording signal from the maximum recording signal to produce a difference value; and
    removal means for performing under color removal on a recording signal in accordance with said difference value.

2. A picture forming apparatus according to claim 1, wherein the means for separating includes
    means for separating into a plurality of unbalanced color signals; and
    means for balancing an unbalanced color signal.

3. A picture forming apparatus according to claim 2, wherein the means for balancing includes
    a table for generating a color signal in response to the unbalanced color signal.

4. A picture forming apparatus according to claim 1, further including
    spatial filter means including
        means for low pass filtering one of the recording signal to produce a low pass filtered signal;
        a modulation memory, having an address input responsive to the low pass filtered signal, and output;
        means for adding the recording signal and the output of the modulation memory.

5. A picture forming apparatus according to claim 1, wherein the means for converting includes
    means for converting in accordance with a multiplication of the plurality of color signals by a matrix of coefficients, the coefficients selected so that the plurality of recording signals have equal value when the plurality of color signals have equal value.

6. A picture forming apparatus according to claim 1, further including a black color conversion table for storing a plurality of black color conversion values corresponding to the amount of black toner to be used in reproducing the signal image; and
    means for selectively retrieving a black color conversion value from said black color conversion table in accordance with said difference value, wherein the degree of under color removal by said removal means is determined by said black color conversion value.

7. A picture forming apparatus according to claim 6, further including a color removal table for storing color removal values, and wherein said removal means performs under color removal by selectively retrieving from said color removal table a color removal value corresponding to said black color conversion value and subtracts said color removal value from each of said recording signals to produce under color processed signals.

8. A picture forming apparatus according to claim 7, wherein said recording signals correspond with coloring materials of the colors yellow, magenta, and cyan.

9. A picture forming apparatus according to claim 7, wherein said color removal values stored in said color removal table increase with increasing values of said black color conversion value and decrease in a high degradation region of the original image.

10. A picture forming apparatus according to claim 7, wherein said removal means includes means for subtracting said color removal value from a selected one of said recording signals to perform under color removal on said selected one of said recording signals.

11. A picture forming apparatus according to claim 7, further including
- a hue correcting circuit for correcting the hue of a reproduction of an original image in accordance with the minimum value, the difference value, and the recording signal; and
- edge detection means for performing image smoothing and edge emphasizing in the reproduction of the original image in accordance with the minimum value, and the recording signal.

12. A picture forming apparatus according to claim 11, wherein said recording signals correspond with coloring materials of the colors yellow, magenta, and cyan.

13. A picture forming apparatus according to claim 11, wherein the hue correcting circuit includes
- means for subtracting the minimum value from a recording signal to generate an adjusted recording signal;
- means for comparing the adjusted recording signal with a first threshold to generate a first comparison signal;
- means for comparing the minimum value with a second threshold to generate a second comparison signal;
- means for comparing the difference value with a third threshold to generate a third comparison signal; and
- means, responsive to the first comparison signal, the second comparison signal, and the third comparison signal, for generating a hue correction signal.

14. A picture forming apparatus for reproducing original images comprising:
- means for separating a signal corresponding to an original image into a plurality of color signals;
- means for converting said plurality of color signals into a plurality of recording signals wherein each of said recording signals corresponds to a different color of coloring material used by the picture forming apparatus to reproduce the original image;
- means for determining a minimum recording signal having a minimum value;
- means for determining a maximum recording signal having a maximum value;
- means for subtracting the minimum recording signal from the maximum recording signal to produce a difference value;
- a hue correcting circuit for correcting the hue of a reproduction of an original image in accordance with the minimum value, the difference value, and the recording signal, including
  - register means for storing a hue threshold value,
  - a comparator for comparing said hue threshold value and said difference value and for producing a hue control signal having a first value if said hue threshold value is less than said difference value and a second value if said hue threshold value is greater than said difference value, and
  - a hue emphasizing circuit for receiving said recording signals and said hue control signals and for outputting a hue emphasis signal for controlling the hue during reproduction of an original signal;
- removal means for performing under color removal on a recording signal in accordance with said difference value, including
  - a black color conversion table for storing a plurality of black color conversion values corresponding to the amount of black toner to be used in reproducing the signal image,
  - means for selectively retrieving a black color conversion value from said black color conversion table in accordance with said difference value, wherein the degree of under color removal by said removal means is determined by said black color conversion value, and
  - means for performing under color removal by selectively retrieving a color removal value from a color removal table corresponding to said black color conversion value and subtracting said color removal value from each of said recording signals to produce under color processed signals; and
- edge detection means for performing image smoothing and edge emphasizing in the reproduction of the original image in accordance with the minimum value, and the recording signal.

15. A picture forming apparatus according to claim 14, wherein said edge detection means comprises:
- memory means for storing edge detection values;
- means for selectively adding one of said recording signals and said minimum value to produce a black recording signal; and
- means responsive to said recording signals and said black recording signal for accessing said memory means and causing said memory means to output an edge detection value.

* * * * *